US011545746B1

(12) United States Patent
Reda et al.

(10) Patent No.: US 11,545,746 B1
(45) Date of Patent: Jan. 3, 2023

(54) ANTENNA LATTICE WITH UNEQUAL SPACING FOR SINGLE-PANEL FULL-DUPLEX SATELLITE USER TERMINALS

(71) Applicant: UTVATE Corporation, San Francisco, CA (US)

(72) Inventors: Amin Reda, Oakland, CA (US); Siamak Ebadi, San Francisco, CA (US); Eric David Kwiatkowski, San Francisco, CA (US); Elahehsadat Torabi, Albany, CA (US); Stefan William Turkowski, Oakland, CA (US); Andrea Pabst, San Mateo, CA (US); Andres Felipe Osorio, Emeryville, CA (US)

(73) Assignee: UTVATE Corporation, San Francisco, CA (US)

( * ) Notice: Subject to any disclaimer, the term of this patent is extended or adjusted under 35 U.S.C. 154(b) by 0 days.

(21) Appl. No.: 17/699,074

(22) Filed: Mar. 18, 2022

(51) Int. Cl.
*H01Q 3/22* (2006.01)
*H04B 1/00* (2006.01)
*H04L 5/14* (2006.01)

(52) U.S. Cl.
CPC ............ *H01Q 3/22* (2013.01); *H04B 1/0064* (2013.01); *H04L 5/1461* (2013.01)

(58) Field of Classification Search
None
See application file for complete search history.

(56) References Cited

U.S. PATENT DOCUMENTS

| 11,005,519 B1* | 5/2021 | Turkowski | H04B 7/0408 |
| 2016/0233588 A1* | 8/2016 | Bily | H01Q 5/42 |
| 2018/0115068 A1* | 4/2018 | Sazegar | H01Q 5/48 |
| 2019/0049577 A1* | 2/2019 | Iida | H01Q 21/08 |
| 2019/0207322 A1* | 7/2019 | Ding | G01S 7/03 |
| 2020/0388935 A1* | 12/2020 | Lee | H04L 27/2634 |
| 2021/0226334 A1* | 7/2021 | Reda | H01Q 3/32 |
| 2021/0226693 A1* | 7/2021 | Ebadi | H04B 7/0617 |
| 2021/0313680 A1* | 10/2021 | Turpin | H04B 17/27 |

FOREIGN PATENT DOCUMENTS

| DE | 102021100694 A1 * | 12/2021 |
| KR | 20190093684 A * | 8/2019 |
| KR | 20200140026 A * | 12/2020 |

\* cited by examiner

*Primary Examiner* — Jamaal Henson
(74) *Attorney, Agent, or Firm* — Cognition IP, P.C.; Edward Steakley

(57) ABSTRACT

A full-duplex User Terminal Panel (UTP) including one or more User Terminal Modules (UTM) having a plurality of Tx antenna elements. Each of the Tx antenna elements spaced apart from one another by a distance dTx. The full-duplex UTP further includes a plurality of Rx antenna elements. Each of the Rx antenna elements are spaced apart from one another by a distance dRx. Furthermore, the Tx antenna elements may be spaced according to a Tx lattice dTx, such that the Tx lattice dTx spacing arrangement provides grating lobe-free scanning in an elevation plane at a Tx frequency range. The Rx antenna elements are spaced according to an Rx lattice dRx, such that the Rx lattice dRx spacing arrangement provides grating lobe-free scanning in an elevation plane at a Rx frequency range.

28 Claims, 54 Drawing Sheets

ANTENNA LATTICE WITH UNEQUAL SPACING FOR SINGLE-PANEL FULL-DUPLEX SATELLITE USER TERMINALS

TECHNICAL FIELD

Aspects of the disclosure are related to the field of full-duplex beam-scanning antenna systems, and, more particularly, to lattice configuration of the antenna elements.

BACKGROUND

The wireless revolution has resulted in ever-increasing demands on our limited wireless spectrum. Enabling full-duplex satellite communications from a single panel for transmitting and receiving, as compared to dual aperture full-duplex or half-duplex panels, promises to improve the use of the limited wireless spectrum, and increase satellite communications throughput while maintaining the same antenna footprint. As used herein, the term single-panel full-duplex describes simultaneous data transmission and reception from a single aperture. In other words, a full-duplex single-panel antenna system is capable of simultaneous bi-directional data transmissions from the same physical aperture. Dual-panel full-duplex antenna system is capable of simultaneous bi-directional data transmissions from two separate apertures: Tx aperture and Rx aperture. Half-duplex devices can only transmit in one direction at a time, where data can move in two directions, but not at the same time. Furthermore, scanning a beam for a range of elevation angles introduces different geometrical requirements for Tx and Rx portions of the antenna element lattice (grid). Meeting the performance requirements of radiating in the Tx and Rx frequency ranges as well as permitting the scanning in both Tx and Rx frequencies enables a reliable operation of full-duplex communication.

When in receive mode, a single-panel full-duplex antenna system's G/T is one of the most important figures of merit. G is the gain of the antenna system and T is the system noise temperature. The higher the G/T, the better the sensitivity of the system.

When in transmit mode, a single-panel full-duplex antenna system's effective isotropic radiated power (EIRP) is one of the most important figures of merit. EIRP is the total power in watts (or dBW, dBm, etc.) equivalent to an amount of power that has to be radiated by a (theoretical) isotropic antenna to give the same radiation intensity. EIRP is specified and measured in the direction of the antenna's main beam and helps in determining the number of antenna elements required, given a certain radio frequency integrated circuit (RFIC) conducted output power.

Polarization of an antenna system in a given direction is defined as the polarization of the wave transmitted or radiated by the antenna system. Polarization of a radiated wave is defined as the property of an electromagnetic (EM) wave describing the time-varying direction and relative magnitude of the electric field vector; specifically the figure traced as a function of time by the end point of the field vector at a fixed location in space, and the sense in which it is traced, as observed along the direction of propagation. Common polarizations used are circular polarization (CP) and linear polarization (LP). Examples of CP are: right-hand CP (RHCP), and left-hand CP (LHCP); wherein RHCP and LHCP are orthogonal polarizations. Examples of LP are: vertical LP and horizontal LP; wherein vertical LP and horizontal LP are orthogonal polarizations. For a receiving antenna to be able to capture the entire radiation incident on it from a transmitting antenna, the radiation and receiving antenna must have the same polarization.

Polarization control is the ability to change the polarization of the antenna system through control of an RF signal (amplitude and phase) of two or more RFIC channels connected to an antenna element through two or more antenna ports of the antenna element Other means of polarization control may include the use of an RF switch.

Fixed LP and CP may be implemented through the use of a single antenna port connected to a single RFIC channel. Other fixed CP may be implemented through connecting two antenna ports to a single RFIC channel through a microwave circuit such as a 90 degrees hybrid (or quadrature hybrid), ring hybrid. Wilkinson power divider, or a T-junction power divider.

Scanning an antenna beam is when the main beam of an antenna can be adjusted to point in a desirable direction, such as an Elevation angle of 45 degrees. By controlling the phases at the individual antenna element level through an RFIC, one can steer the beam of a phased array antenna such as the beam of a Tx antenna and/or an Rx antenna of a full-duplex single-panel. Typical applications require a scanning range in the elevation plane, as an example an Elevation range of 50 degree, starting with an Elevation angle of 90 degrees (directly above, or pointing to sky) to an Elevation angle of 40 degrees. Furthermore, it is assumed that the scanning range covers a full Azimuth range of 0 degrees to 360 degrees.

SUMMARY

191 In some embodiments, a full-duplex User Terminal Panel (UTP) includes one or more User Terminal Modules (UTM)s. Each of the UTMs may include two or more unit cells. Each of the each unit cell may include a transmit (Tx) antenna element having a plurality of Tx antenna element port, and a receive (Rx) antenna element having a plurality of Rx antenna element ports. A center of a first Tx antenna element of a first unit cell has a distance x to a center of a first Tx antenna element of a second unit cell. Each of the Tx antenna elements transmit via a first frequency range, and each of the Rx antenna elements receive via a second frequency range. The first frequency range is different than the second frequency range. A center of a first Rx antenna element of the first unit cell has a same distance (e.g., equidistant) to a center of a first Rx antenna element of the second unit cell. The distance x is a value such that a grating lobe-free scanning in an elevation plane at the second frequency range is achieved. Each of the UTMs may also include at least one Tx radio frequency integrated circuit (RFIC) configured to transmit a radio frequency (RF) signal. The Tx RFIC includes one or more Tx channels that are connected individually to one of the plurality of Tx antenna element ports. Each of the UTMs may also include at least one Rx RFIC configured to receive an RF signal. The Rx RFIC includes one or more Rx channels that are connected individually to one of the plurality of Rx antenna element ports.

In some embodiments, a full-duplex User Terminal Panel (UTP)includes one or more User Terminal Modules (UTM)s, each UTM having a plurality of Tx antenna elements. Each of the Tx antenna elements spaced apart from one another by a distance dTx. The full-duplex UTP further includes a plurality of Rx antenna elements. Each of the Rx antenna elements are spaced apart from one another by a distance dRx, The distance dRx is greater than the distance dTx. Furthermore, the Tx antenna elements are spaced according to a Tx lattice dTx, such that the Tx lattice dTx spacing arrangement provides grating lobe-free scanning in an elevation plane at a Tx frequency range. The Rx antenna elements are spaced according to an Rx lattice dRx, such that the Rx lattice dRx spacing arrangement provides grating lobe-free scanning in an elevation plane at a Rx frequency range. The full-duplex UTP further includes one or more Tx radio frequency integrated circuit (RFIC) and one or more Rx RFIC configured to transmit a radio frequency (RF) signal and receive an RF signal, respectively. The Tx RFIC includes one or more Tx channels and the Rx RFIC includes one or more Rx channels, such that each of the Tx channels are connected individually to one of the plurality of Tx antenna element ports and each of the Rx channels are connected individually to one of the plurality of Rx antenna element ports.

In some embodiments, a full-duplex User Terminal Panel (UTP) includes one or more UTMs. Each of the UTMs are configured with 4 sub-UTMs. Each sub-UTM has a plurality of Tx antenna elements that are spaced apart from one another by a distance dTx. Each sub-UTM has a plurality of Rx antenna elements that are spaced apart from one another by a distance dRx, where the distance dRx is greater than the distance dTx. The Tx antenna elements are spaced according to a Tx lattice dTx, and the Rx antenna elements are spaced according to an Rx lattice dRx. The Tx lattice dTx spacing arrangement provides grating lobe-free scanning in an elevation plane at a Tx frequency. The Rx lattice dRx spacing arrangement provides grating lobe-free scanning in an elevation plane at a Rx frequency. Each UTM may include at least one Tx radio frequency integrated circuit (RFIC) configured to transmit a radio frequency (RF) signal. The Tx RFIC includes one or more Tx channels that are connected individually to one of the plurality of Tx antenna element ports. Each UTM may include at least one Rx RFIC configured to receive an RF signal. The Rx RFIC may include one or more Rx channels that are connected individually to one of the plurality of Rx antenna element ports. The sub-UTMs are configured in a quadrant such that each sub-UTM is rotated 90 degrees from each other in a clockwise manner.

One or more embodiments described herein, among other benefits, solve one or more of the foregoing problems in the art by providing single-panel full-duplex antenna systems, and lattice configuration that enables the simultaneous Rx and Tx operation of the antenna system, including beam scanning.

In one embodiment, a single-panel antenna system includes a plurality of User Terminal Modules (UTMs) comprised of sequentially rotated (SQR) sub-UTMs, the smallest repeating structure that is configured for both Tx and Rx antenna lattice. The SQR configuration is key to achieving an important key performance metric called the Axial Ratio (AR) of the single-panel full-duplex antenna system. A good AR ensures that the antenna system maintains polarization purity and is therefore capable of achieving communication at a maximum allowable data rate.

The example single-panel full-duplex antenna system also includes a multilayered Printed Circuit Board (PCB) which contains RF routing from the Radio Frequency Integrated Circuit (RFIC) to the antennas, digital routing for the RFICs and power routing for the RFICs on the UTM.

In some embodiments, a full-duplex single-panel antenna system utilizes a plurality of full-duplex antenna elements. A full-duplex antenna element comprises a Tx antenna element and an Rx antenna element. In other embodiments, a full-duplex antenna element comprises a wide band antenna element that covers a Tx frequency band and an Rx frequency band, two or more antenna ports; wherein at least one of the two or more antenna ports is used for the Tx frequency operation and at least one of the two or more antenna ports is used for the Rx frequency operation.

In some embodiments, a full-duplex single panel user terminal is referred to as a flat panel antenna (FPA).

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1:
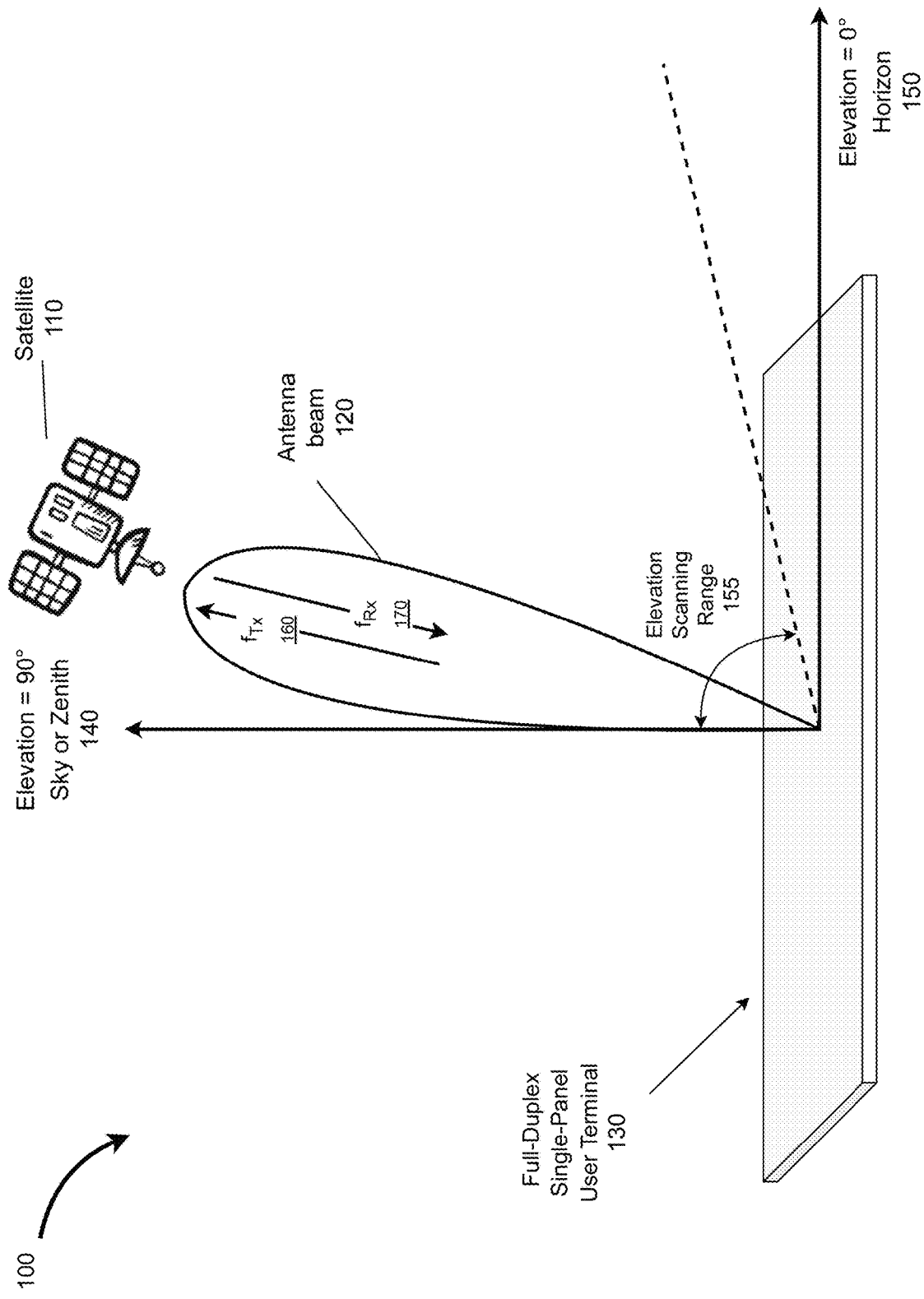
FIG. 1 illustrates a general overview of a full-duplex communication between a full-duplex single-panel user terminal and a satellite, according to some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include systems, processes, apparatuses, machine-implemented methods, computing devices, or computer readable medium.

As used herein, a user terminal can also be referred to as an antenna system or UTP. A single-panel full-duplex user terminal can also be referred to as a single-panel full-duplex antenna system. Additionally, a single-panel full-duplex user terminal can be referred to as a single-aperture full-duplex user terminal, single-aperture full-duplex antenna system, or a single-aperture full-duplex panel.

In a full-duplex satellite communication scenario, at least some of the power of the Tx signal can be coupled into the receive portion of the circuitry. Transmitted signals are typically transmitted at fairly high power levels. Received signals, however, are typically received at much lower power levels than that of the transmitted signals' power levels. The coupled Tx signal power into the Rx signal chain can be greater than a noise floor of the LNA of the Rx signal, thereby interfering with the Rx signal being reliably received. Furthermore the coupled Tx signal power into the Rx signal chain can affect the linear (a.k.a. small-signal) region of the LNA. Reducing Tx/Rx coupling (or improving the Tx/Rx isolation) can improve the integrity of the received signal during full-duplex operation. One or more embodiments described herein, among other benefits, solve one or more of the foregoing problems in the art by providing full-duplex antenna systems and isolation methods to reduce coupling from a Tx signal path onto an Rx signal path, and to thereby enable full-duplex communication and in certain scenarios enhance full-duplex communication.

In one embodiment, a full-duplex antenna system includes a controller circuit, a transmit signal path including one or more elements each including a distribution network, a Tx RFIC including one or more power amplifiers (PA), one or more filters, one or more Tx antenna element ports of a Tx antenna element operating at a Tx frequency band to transmit an outgoing signal to a satellite. The example full-duplex antenna system further includes an Rx signal path in the one or more elements, the Rx signal path including a distribution network, an Rx RFIC including one or more LNAs driven by an Rx antenna element port of an Rx antenna element operating at an Rx frequency band to receive an incoming signal from the satellite. The Rx frequency band is separated by a frequency guard band from the Tx frequency band, and the filters together with the isolation methods described between the Tx and Rx signal paths provides sufficient isolation to reduce coupling between the Tx signal path and the Rx signal path to allow the satellite antenna to operate in full-duplex.

In some embodiments, the incoming signal from a satellite is referred to as an incoming analog signal or incoming RF signal and the outgoing signal to a satellite is referred to as outgoing analog signals or outgoing RF signal. In other embodiments, the incoming signal from a satellite is referred to as a downlink signal and the outgoing signal to a satellite is referred to as an uplink signal.

FIG. 1 illustrates a full-duplex single-panel user terminal panel (UTP) 100 communicating with a satellite 110 using a transmit frequency (a.k.a., uplink) $f_{Tx}$, 160 and a receive frequency (a.k.a. downlink) $f_{Rx}$, 170 simultaneously. According to some embodiments, $f_{Tx}$ and $f_{Rx}$ are different frequency bands. As an example the Ka band used in satellite communications uplink uses frequencies between 27.5 GHz and 30 GHz and the downlink uses frequencies between 17.7 GHz and 20.2 GHz, employing a Tx frequency to Rx frequency ratio of 3:2

It is to be noted that antenna beam 120 is an illustration of the transmit frequency antenna beam and receive frequency antenna beam. In reality the Tx antenna beam and the Rx antenna beam may be separate.

The satellite 110 location may be directly above the full-duplex single-panel user terminal 130 at an elevation angle (EL) of 90 degrees which is directly up towards the sky 140, at EL:=0 degrees towards the horizon ISO, or anywhere in between. The full-duplex PAsingle-panel user terminal may be capable of a certain elevation scanning range 155. The satellite 110 may be a low earth orbit (LEO) satellite, a geostationary earth orbit (GEO) satellite, or medium earth orbit (MEO) satellite.

The full-duplex single-panel UTP may be on a static object such as a roof of a house or on a moving platform such as a train, bus, or an airplane.

Figure 2:
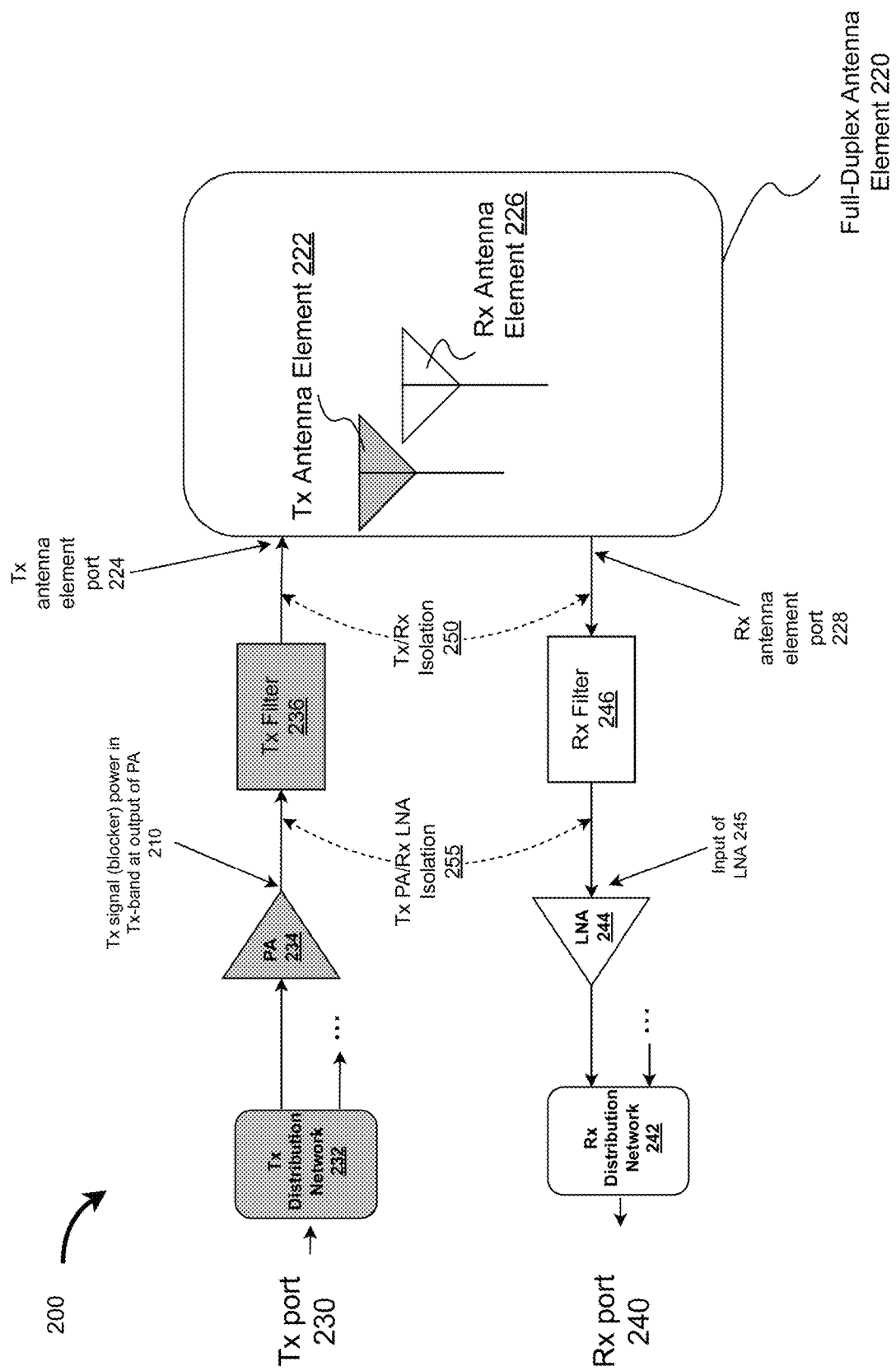
FIG. 2 depicts a block diagram illustrating a full-duplex single-panel user terminal for use in full-duplex communication, according to some embodiments.

FIG. 2 is a block diagram illustrating the Tx and Rx signal chains leading to a full-duplex antenna element 220, for use in full-duplex communication 200, according to some embodiments.

Transmit/Receive Signal Paths: As shown, antenna element block diagram 200 includes a transmit signal path, which includes, connected in order, a Tx port 230 (to receive an analog input from a modem of a user device), a Tx distribution network 232 (the Tx distribution network may be referred to as a Tx splitter), PA 234, a Tx Filter 236, connected to a Tx antenna element 222 via a Tx antenna element port 224. As used herein, the Tx port 230 is an analog input from a user device such as a transceiver into the antenna system. Also shown is a receive signal path includes, connected, in order, Rx antenna element 226, connected via Rx antenna element port 228 to an Rx Filter 246, which drives LNA 244, which drives RF distribution network 242 (the Rx distribution network may also be referred to as an Rx combiner), which drives an Rx port 240 to provide as an analog output to a user device such as a transceiver. Tx filter 236 and Rx filter 246 may be either a surface mount (SMT) filter or a PCB-based filter. 1851 As used herein, the PA 234 is a Tx RFIC with one or more Tx channels, and the LNA 244 is an Rx RFIC with one or more Rx channels.

In some embodiments, the one or more Tx distribution network in the Tx signal path is also referred to as a corporate network. In other embodiments, the one or more Rx distribution networks in the Rx signal path may be referred to as a corporate network.

As used herein an antenna port is a physical interface on the antenna that allows for exchange of RF energy between the antenna and the RF signal path. As an example, the Tx antenna port 224 is a physical interface that allows for energy to be transferred from the PA into the Tx antenna element. An antenna port is an integral part of the antenna element and may be connected with another RF device through an RF transition (not shown) or through an RF coaxial connector (also not shown), such as sub-miniature push-on (SMP), subminiature push-on micro (SMP-M), subminiature push-on sub-micro (SMP-S).

As shown in block diagram 200, a Tx/Rx isolation 250 is the isolation level between a Tx antenna port and an Rx antenna port. Furthermore, Tx PA/Rx LNA isolation 255 is the isolation between the PA 234 and the LNA 244. It is to be noted that when deriving full-duplex isolation specifications, both Tx/Rx isolation 250 and Tx PA/Rx LNA isolation 255 have to conform to said full-duplex specifications.

The full-duplex antenna element 220 as used herein contains at least one Tx antenna element 222 and one Rx antenna element 226. In other embodiments, not shown, more than one Tx or Rx antenna elements may be used. In other embodiments, also not shown, a full-duplex single-panel user terminal contains more Tx antenna elements than Rx antenna elements. To support additional Tx antenna elements, additional Tx signal paths may be used.

In other embodiments, not shown, a full-duplex single-panel user terminal contains more Rx signal chains than Tx signal chains. In order to support additional Rx signal chains, an Rx antenna element is used in lieu of a full-duplex antenna element.

Figure 3:
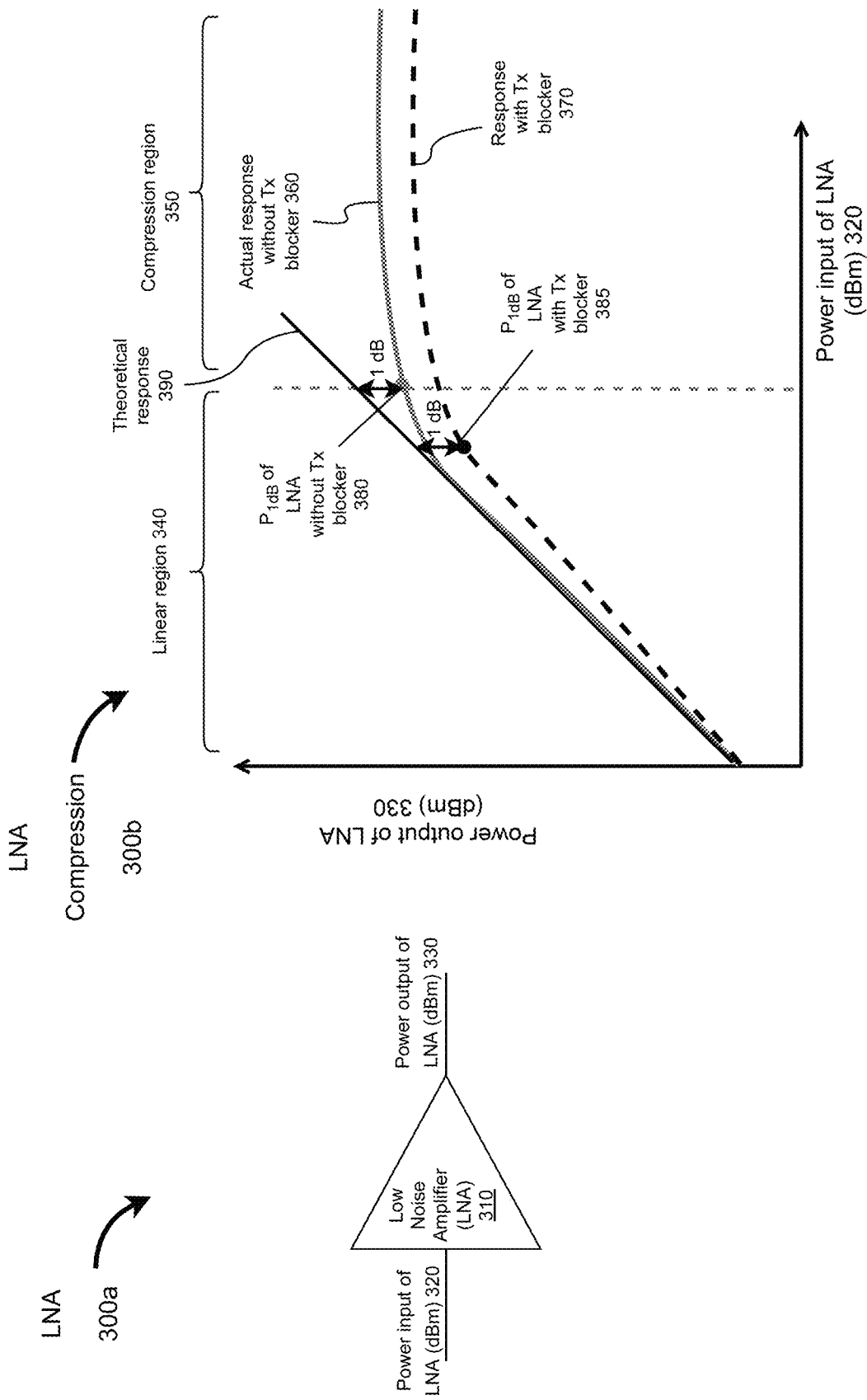
FIG. 3A depicts a Low Noise Amplifier (LNA) 300a with an input and an output, according to some embodiments.
FIG. 3B is a graph illustrating the relationship between the power output of an LNA and the power input of the LNA, according to some embodiments.

FIG. 3A depicts an LNA 310 with a power input 320 and a power output 330.

$P_{1dB}$ compression point is an output power level at which the gain of the LNA decreases 1 dB from the theoretical response 390. Once an amplifier reaches this $P_{1dB}$ it goes into compression and exhibits non-linear behavior, producing distortion, harmonics and intermodulation products. Amplifiers such as LNAs should be operated below the compression point, in their linear region.

FIG. 3B is a graph that illustrates the power output of LNA 330 vs. power input of LNA 320. Shown are two regions that define the operation of the LNA: a linear region 340 and a compression region 350. Furthermore, the graph illustrates the potential response of the LNA with a Tx blocker 370 different from the actual response of the LNA without a Tx blocker 360. The Tx blocker power 210 (FIG. 2) represents an amount of power in the Tx-band at the output of the PA that could couple into the input of the LNA 245 (FIG. 2). When this happens, the $P_{1dB}$ of the LNA with Tx blocker 385 reduces from a value $P_{1dB}$ of LNA without Tx blocker 380.

A lower input $P_{1dB}$ such as depicted in Plan of the LNA with Tx blocker 385 means a reduced linear region of the LNA 340, which can cause the LNA to output a less desired (lower) Signal-to-Noise ratio (SNR). SNR is the ratio of RF signal to RF noise. The lower the SNR, the more noise is generated by the receiver.

Figure 4:
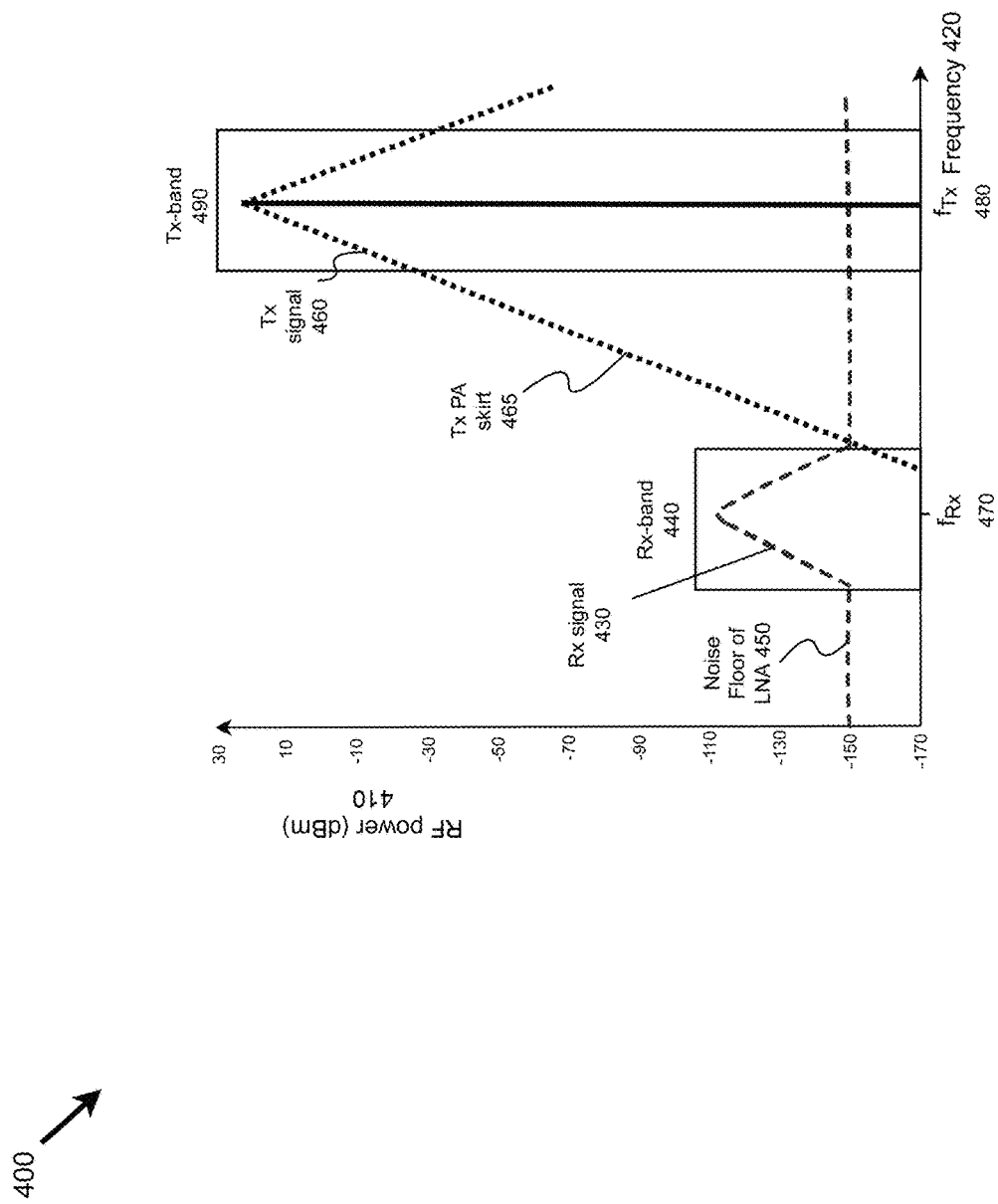
FIG. 4 is a graph illustrating the RF power vs. Frequency, according to some embodiments.

FIG. 4 is an example graph 400 that illustrates the RF power in dBm 410 vs. frequency 420. By design, the highest level of RF signal 430 in the Rx-band 440 happens at fa, 470 which is higher than a noise floor of LNA 450. In addition, the highest level of a Tx signal 460 in the Tx band 490 happens at $f_{Tx}$ 480. A Tx PA skirt power 460 is a byproduct of the Tx signal outside of the Tx-band and may affect the Rx signal within the Rx-band if the Tx PA skirt power is higher than the noise floor of the LNA 450.

As used herein, the Tx PA skirt power may also be referred to as Tx skirt.

Figure 5:
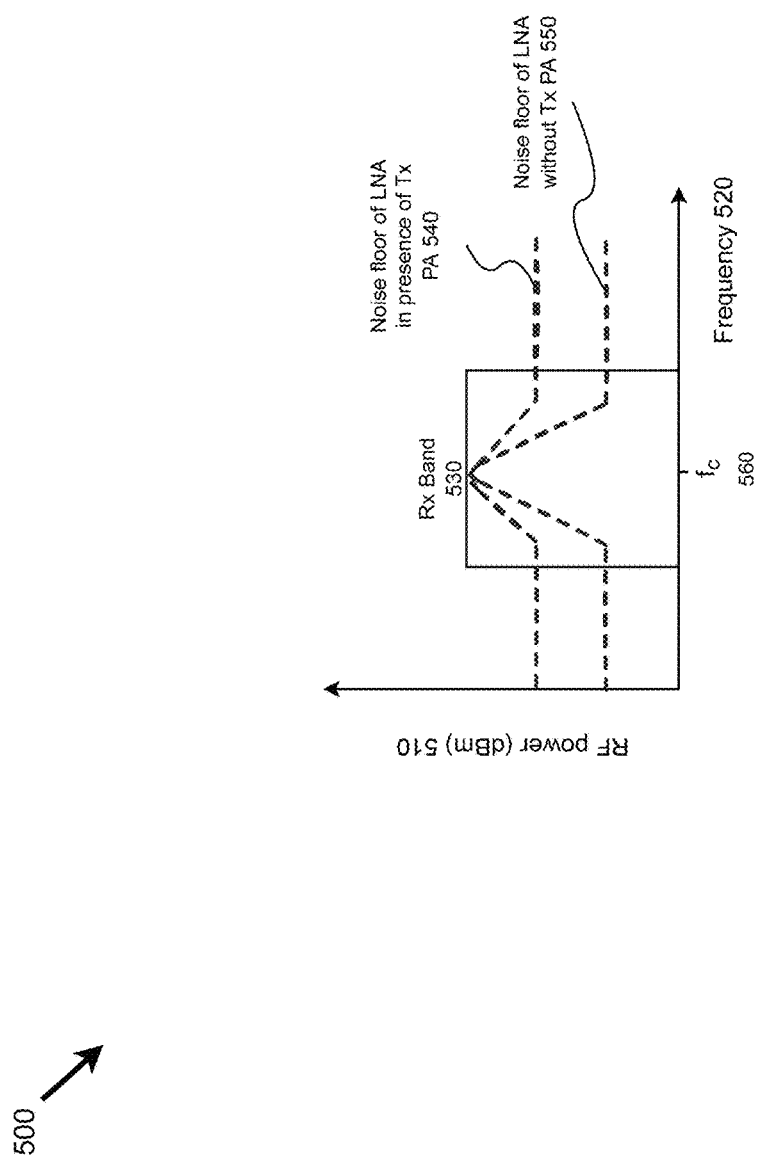
FIG. 5 is a graph illustrating the RF power and Noise floor vs. Frequency, according to some embodiments.

FIG. 5 is a graph 500 illustrating RF power 510 vs. Frequency 520. As shown, the noise floor of LNA without Tx PA 550 in the Rx-band 530 is at a lower level compared with the noise floor of LNA in presence of Tx PA 540 in the Rx-band 530. The increase of the noise power in the noise floor of LNA in presence of PA 540 is due to the noise power that the PA adds to the existing noise floor of LNA without Tx PA 550, in the Rx-band 530 which is centered around an Rx frequency $f_c$ 560.

Figure 6A:
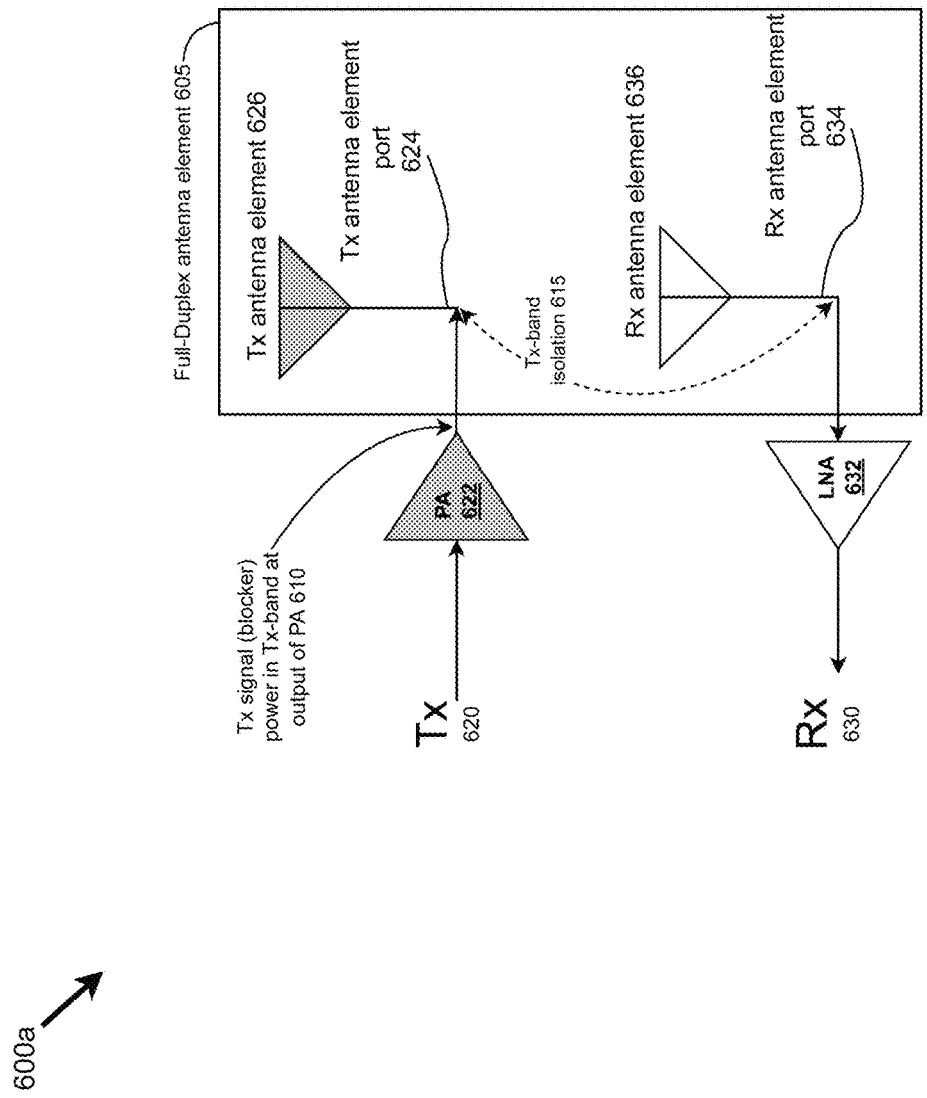
FIG. 6A-6C depict block diagrams illustrating the single-panel full-duplex user terminal for use in full-duplex communication, according to some embodiments.

FIG. 6A depicts a block diagram illustrating the single-panel full-duplex user terminal for use in full-duplex communication, according to some embodiments. Block diagram 600a shows a more simplified version of the block diagram 200 (FIG. 2). Block diagram 600a considers the Tx signal as a blocker and a source of Rx signal interference. Furthermore, Tx-band isolation 615 is one example of Tx/Rx isolation 250 (FIG. 2).

In order to operate in full-duplex mode, the Tx-band isolation 615 needs to be greater than the absolute value {Tx signal power ($P_{blocker}$) in the Tx band at the output of the PA 610 minus a power level in the Tx band that would contribute to compressing the LNA by 1 dB in the Rx band ($P_{1dB,blocker}$) 385 (FIG. 3B)}

$$\text{Tx-band isolation} > |P_{blocker} - P_{1dB,blocker}| \quad \text{Equation 1:}$$

Note that Equation 1 applies if $P_{blocker} > P_{1dB,blocker}$, otherwise Tx-band isolation is not needed.

Figure 6B:
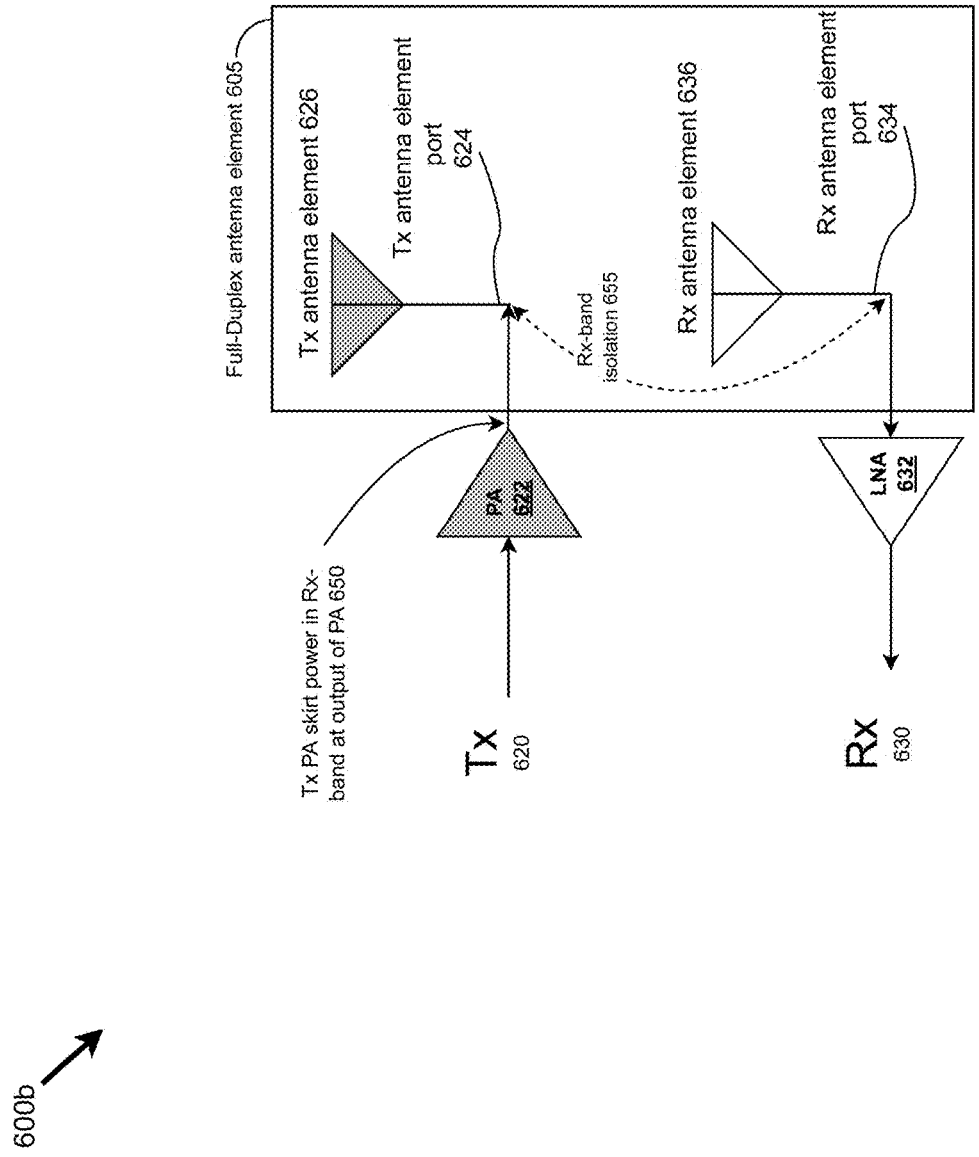

FIG. 6B depicts a block diagram illustrating the single-panel full-duplex user terminal for use in full-duplex communication, according to some embodiments. Block diagram 600b shows a more simplified version of the block diagram 200 (FIG. 2). Block diagram 600b considers the Tx PA skirt power in the Rx-band (FIG. 4) at the output of the PA 650 as a source of Rx signal interference. Furthermore, Rx-band isolation 655 is one example of Tx/Rx isolation 250 (FIG. 2).

In order to operate in full-duplex mode, the Rx-band isolation 655 needs to be greater than the absolute value of {Tx PA skirt power ($P_{skirt,PA}$) in the Rx band at the output of the PA 650 minus the noise floor of the LNA in the Rx band ($P_{noise\,floor,\,LNA}$)}

$$\text{Rx-band isolation} > |P_{skirt,PA} - P_{noise\,floor,LNA}| \quad \text{Equation 2:}$$

Note that Equation 2 applies if $P_{skirt,\,PA} > P_{noise\,floor,LNA}$, otherwise Rx-band isolation is not needed.

Figure 6C:
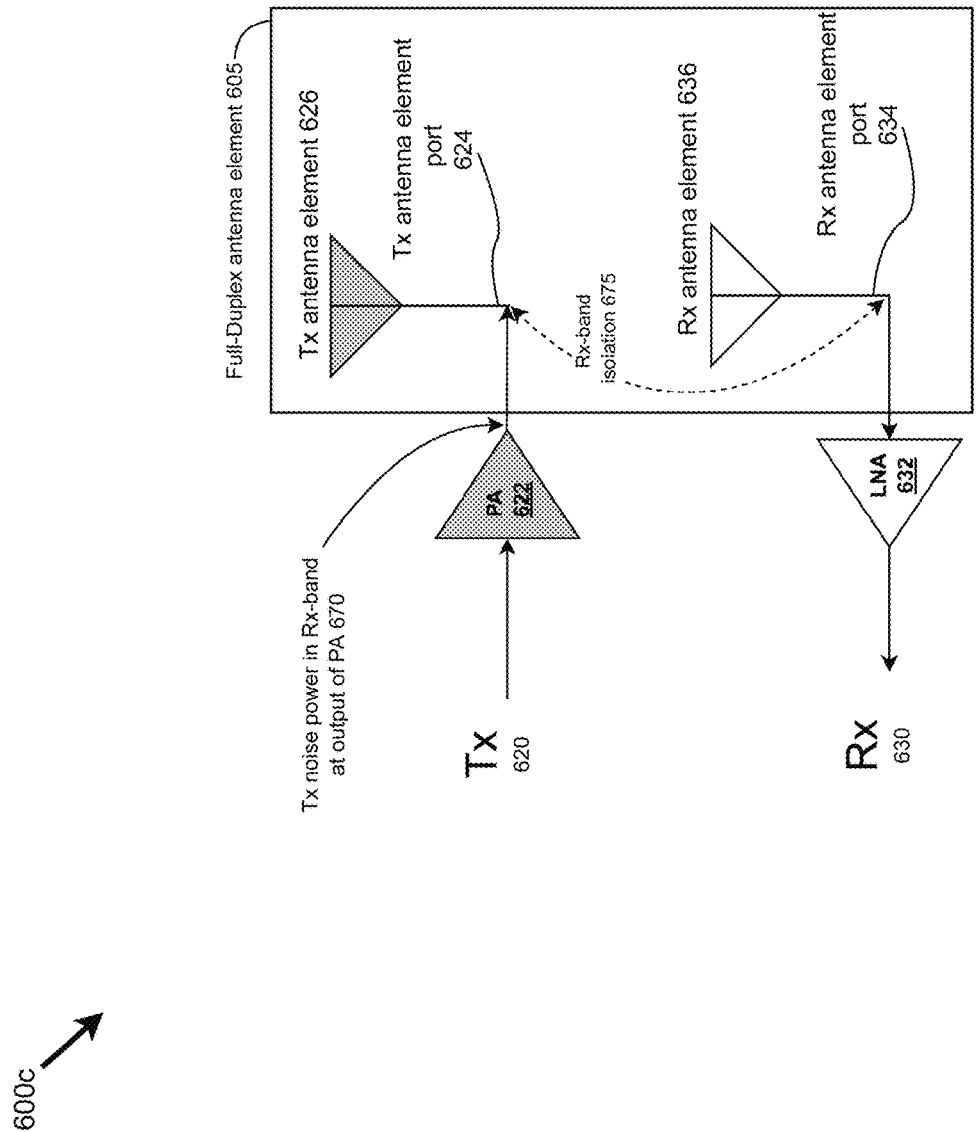

FIG. 6C depicts a block diagram illustrating the single-panel full-duplex user terminal for use in full-duplex communication, according to some embodiments. Block diagram 600c shows a more simplified version of the block diagram 200 (FIG. 2). Block diagram 600c considers the Tx noise power in the Rx-band at the output of the PA 670 as a source of Rx signal interference. Furthermore, Rx-band isolation 675 is one example of Tx/Rx isolation 250 (FIG. 2).

In order to operate in full-duplex mode, the Rx-band isolation 675 needs to be greater than the absolute value {Tx PA noise power ($P_{noise,PA}$) in the Rx band at the output of the PA 670 minus the noise floor of the LNA in the Rx band}

$$\text{Rx-band isolation} > |P_{noise,PA} - P_{noise\,floor,LNA}| \quad \text{Equation 3:}$$

Note that Equation 2 applies if $P_{noise,\,PA} > P_{noise\,floor,LNA}$; otherwise Rx-band isolation is not needed.

Figures 7A, 7B:
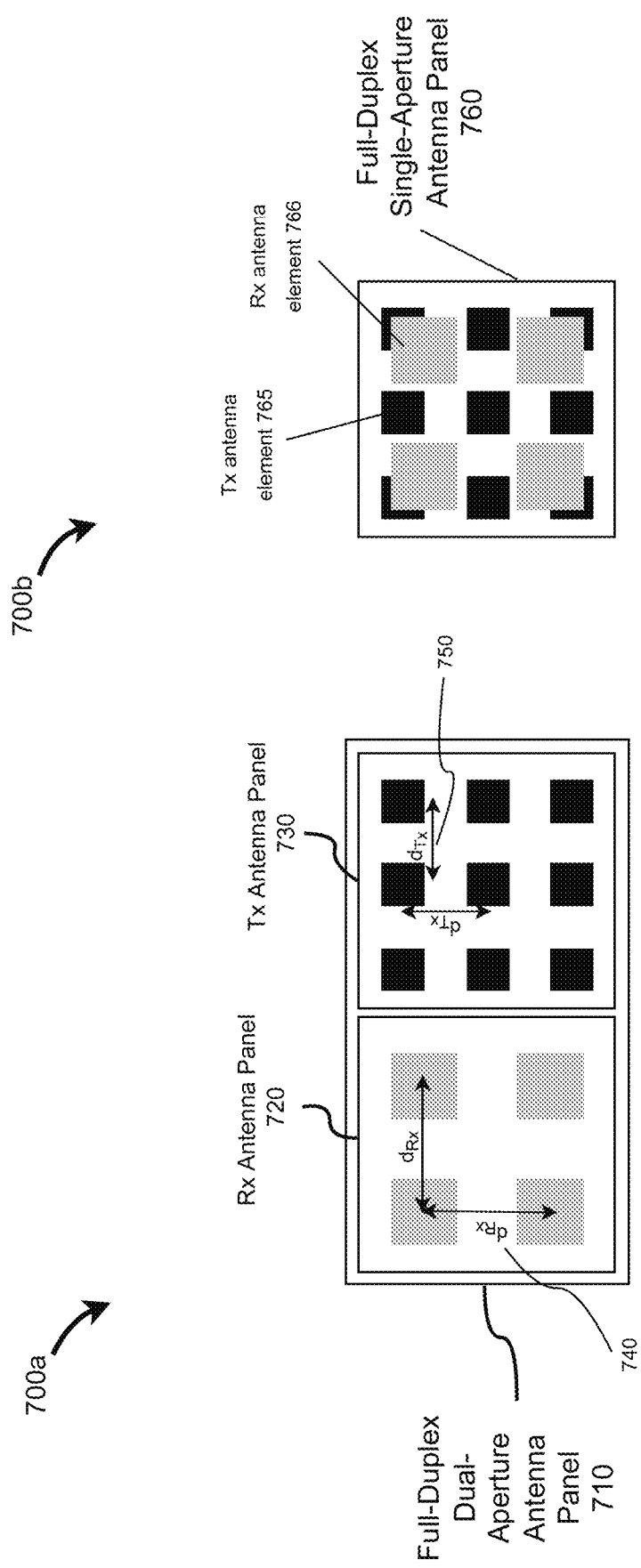
FIG. 7A and FIG. 7B contrasts the full-duplex dual-aperture antenna panel against the full-duplex single-aperture antenna panel, according to some embodiments.

FIG. 7A depicts a full-duplex dual-aperture antenna panel 710 consisting of an Rx antenna panel 720 and a Tx antenna panel 730. An antenna to antenna separation dxx 740 of the Rx antenna panel describes a spacing requirement for the operation of the Rx antenna panel in a Rx frequency. An antenna to antenna separation dr. 750 of the Tx antenna panel describes a spacing requirement for the operation of the Tx antenna panel in a Tx frequency. Combining the Rx antenna panel and the Tx antenna panel into a full-duplex single aperture panel 760 (FIG. 7B) for simultaneous operation in the Tx-band and the Rx-band presents additional design challenges and requires a new array solution. The antenna elements and the way they repeat are no longer preserved. Furthermore, the antenna ground for Tx antenna elements and Rx antenna elements is shared. As an example, the Tx antenna elements (assumed to be above the Rx antenna elements) are separated by a dielectric layer(s) from the Rx antenna elements, while sharing the same ground. Coupling between Tx antenna element 765 and Rx antenna element 766 is introduced. Furthermore, instead of routing RF signals from Tx RFICs into a Tx antenna panel and similarly routing RF signals from Rx RFICs into an Rx antenna panel, the routing of RF signals from Tx RFICs and RF signals from Rx RFICs into the same panel is now required, increasing RFIC density.

As used herein, RFIC density is the percentage of a PCB surface area that will be covered in RFICs. Furthermore, this is defined as (Area required by one RFIC×Number of RFICs)/PCB surface Area.

Figure 8:
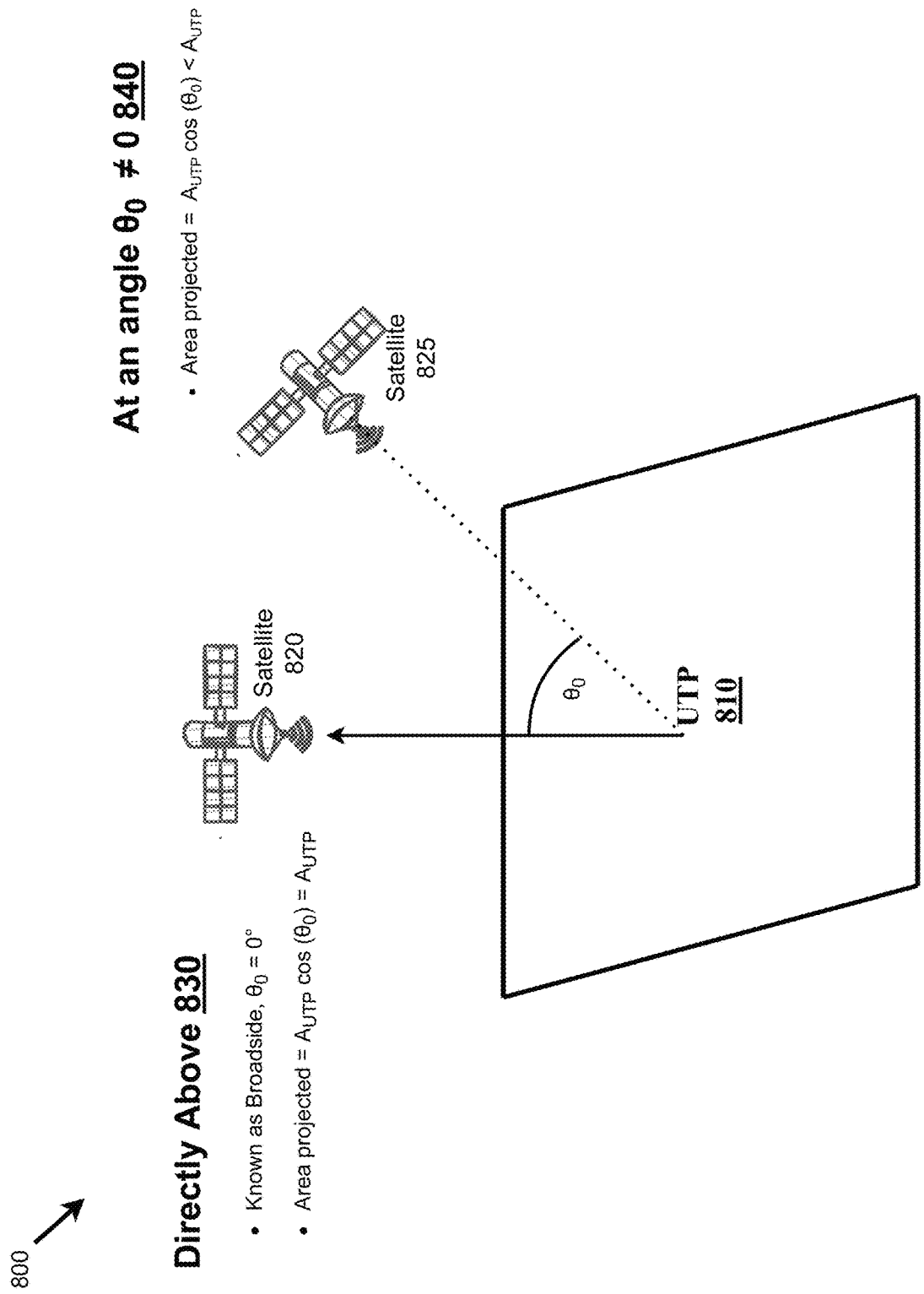
FIG. 8 illustrates the area projected by a UTP with respect to a satellite location, according to some embodiments.

FIG. 8 depicts a satellite 820 and satellite 825 shown with respect to a UTP 810. In some embodiments, satellite 820 and satellite 825 lie in an orbit, like LEO or GEO and UTP 810 lies on an Earth surface. As used herein, the term broadside is when the direction of radiation of the UTP is perpendicular to its main surface area. In 800, satellite 820 is at broadside (or $9=0$ degrees) with respect to UTP 810 and satellite 825 is at an angle $\theta_0 \neq 0$ degrees. In some embodiments, an elevation (EL)=90 degrees is equivalent to $\theta_0=0$ degrees, and an EL=0 degrees is equivalent to $\theta_0=90$ degrees.

As shown in 800, the UTP Area projected towards a satellite varies in accordance with $\theta_0$ of the satellite. The area projected $A_{UTP\ projected}$ towards a satellite is equivalent to the area of the UTP $A_{UTP}$ multiplied by the cosine of the angle $\theta_0$. As shown, the maximum $A_{UTP\ projected}$ is when the satellite is at $\theta_0=0$ degrees (broadside) with respect to the UTP. Furthermore, the gain of the antenna of the UTP ($G_{UTP}$) referenced at an angle &, is proportional to the $A_{UTP\ projected}$ and is a maximum when $\theta_0=0$ degrees. In some embodiments, the gain of the antenna of the UTP is referred to as the gain of the UTP or $G_{UTP}$.

$$A_{UTP\ projected} = A_{UTP} \cos(\theta_0) \quad \text{Equation 4:}$$

Figure 9:
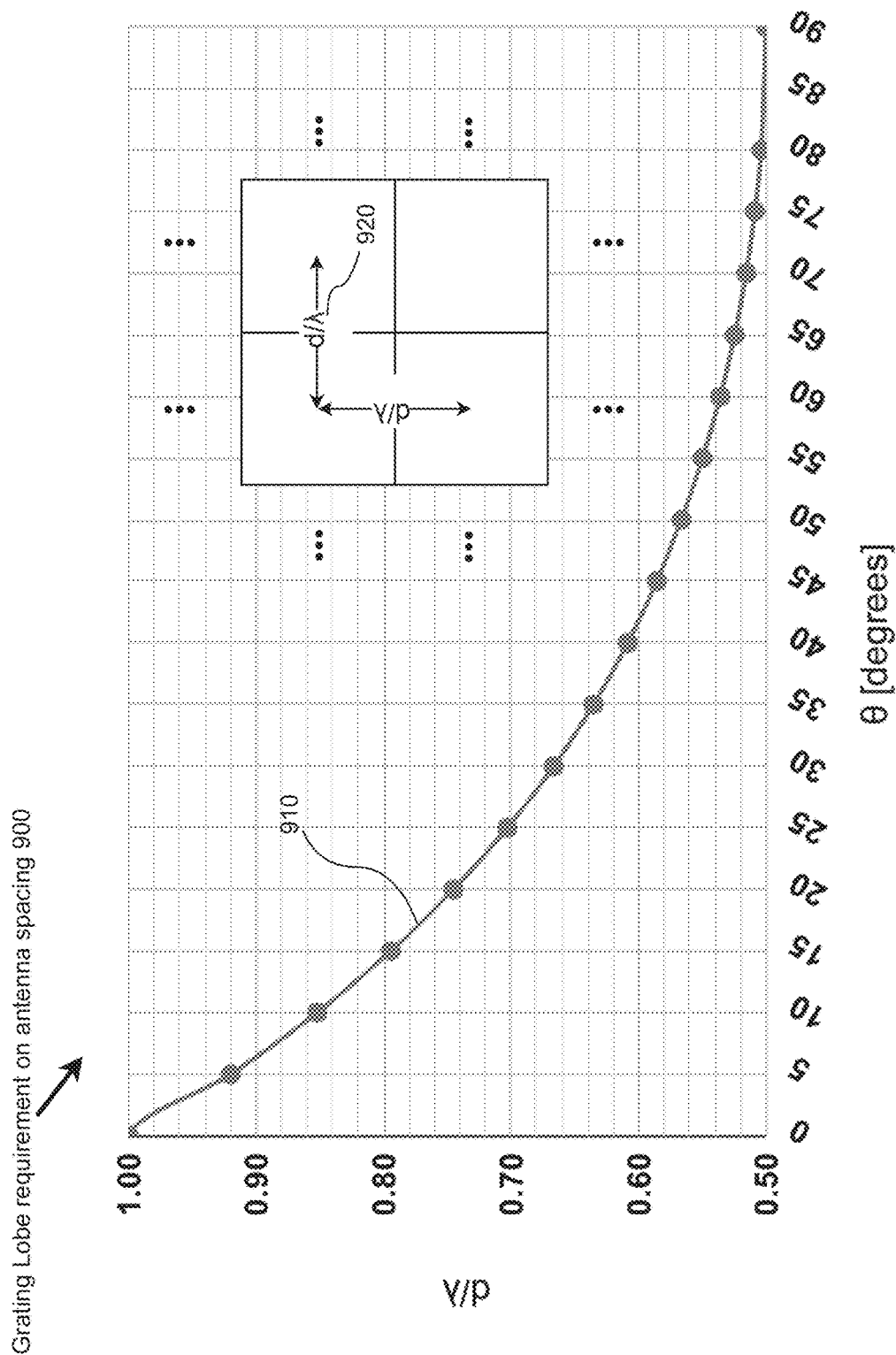
FIG. 9 is a graph illustrating antenna spacing requirement for having a grating lobe-free region, according to some embodiments.

FIG. 9, is a graph illustrating the grating lobe free requirement 910 on the antenna to antenna spacing 920 in terms of wavelength (or free space lambda $\lambda$). Grating lobes are secondary main lobes or very strong side lobes which could be approximately the size of the main lobe in an antenna radiation pattern. Grating lobes occur as a result of spacing among the antenna elements in the phased array antenna. The objective is to avoid grating lobes by using the optimal spacing of antenna elements. As used herein, the antenna to antenna spacing (or spacing of antenna elements) is referred to as $d/\lambda$. The $d/\lambda$ requirement shown in 900 is critical on the scan performance. As an example, a $d/\lambda=0.7$ is needed to meet the criteria of free grating lobes down to a $\theta_0=25$ degrees.

Figure 10:
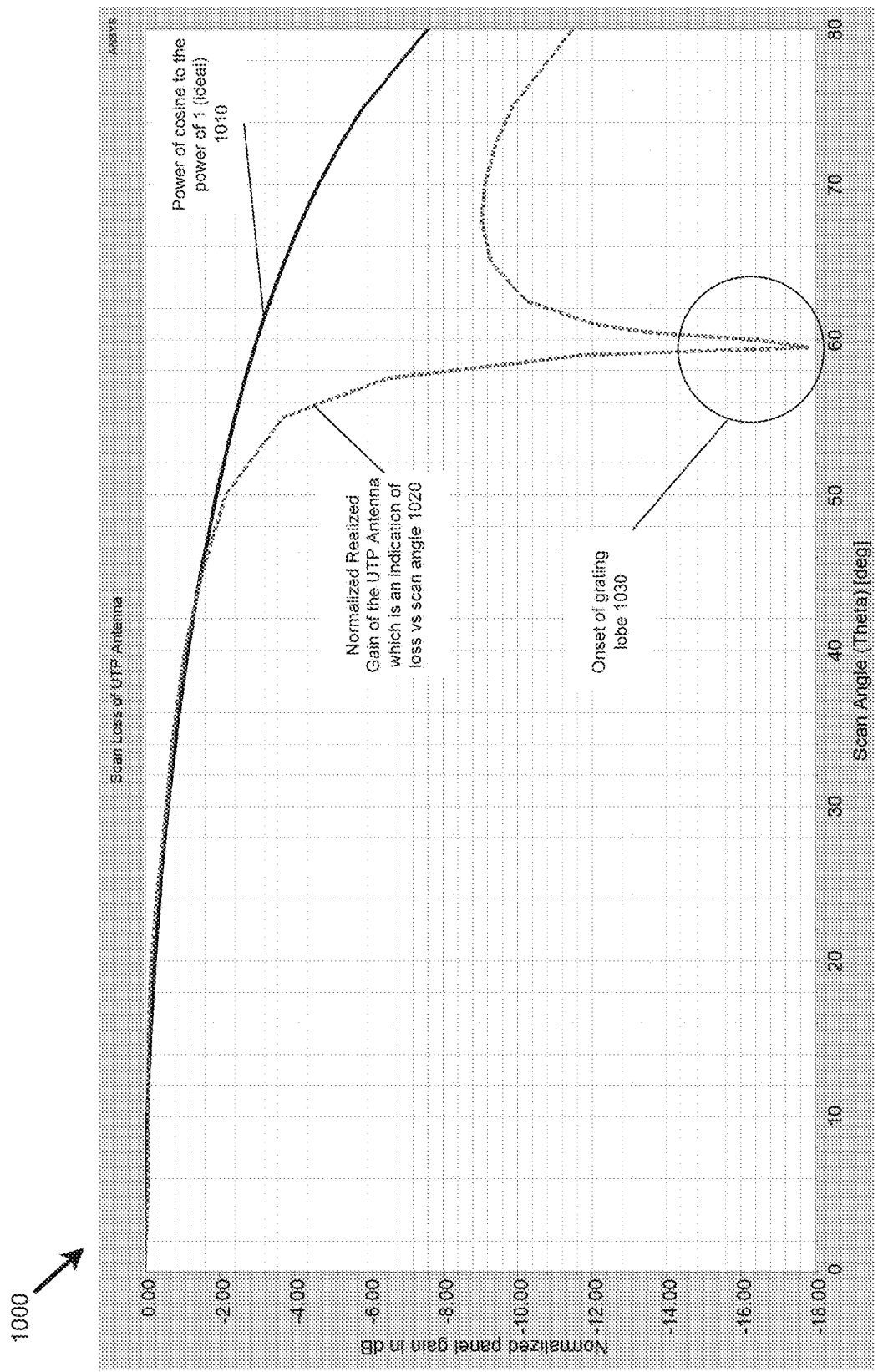
FIG. 10 shows an example graph illustrating the effect of a grating lobe on the full-duplex antenna system scan performance, according to some embodiments.

FIG. 10, is a graph illustrating the effect of antenna spacing $(d/\lambda)=0.536$ on the scan performance of the UTP. As used herein, scan loss is referred to as scan performance and is depicted by a normalized realized gain of the UTP 1020. Graph 1000 shows the onset of grating lobe 1030 around a scan angle ($0o$) of 60 degrees. It is to be noted that in addition to the grating lobe free requirement 910 (FIG. 9), there exists other considerations that affect the scan loss, such as interaction between antenna elements (a.k.a. mutual coupling). Graph 1000 also shows an ideal power of cosine to the power of 1 1010, which indicates a maximum UTP gain achieved.

Figure 11A:
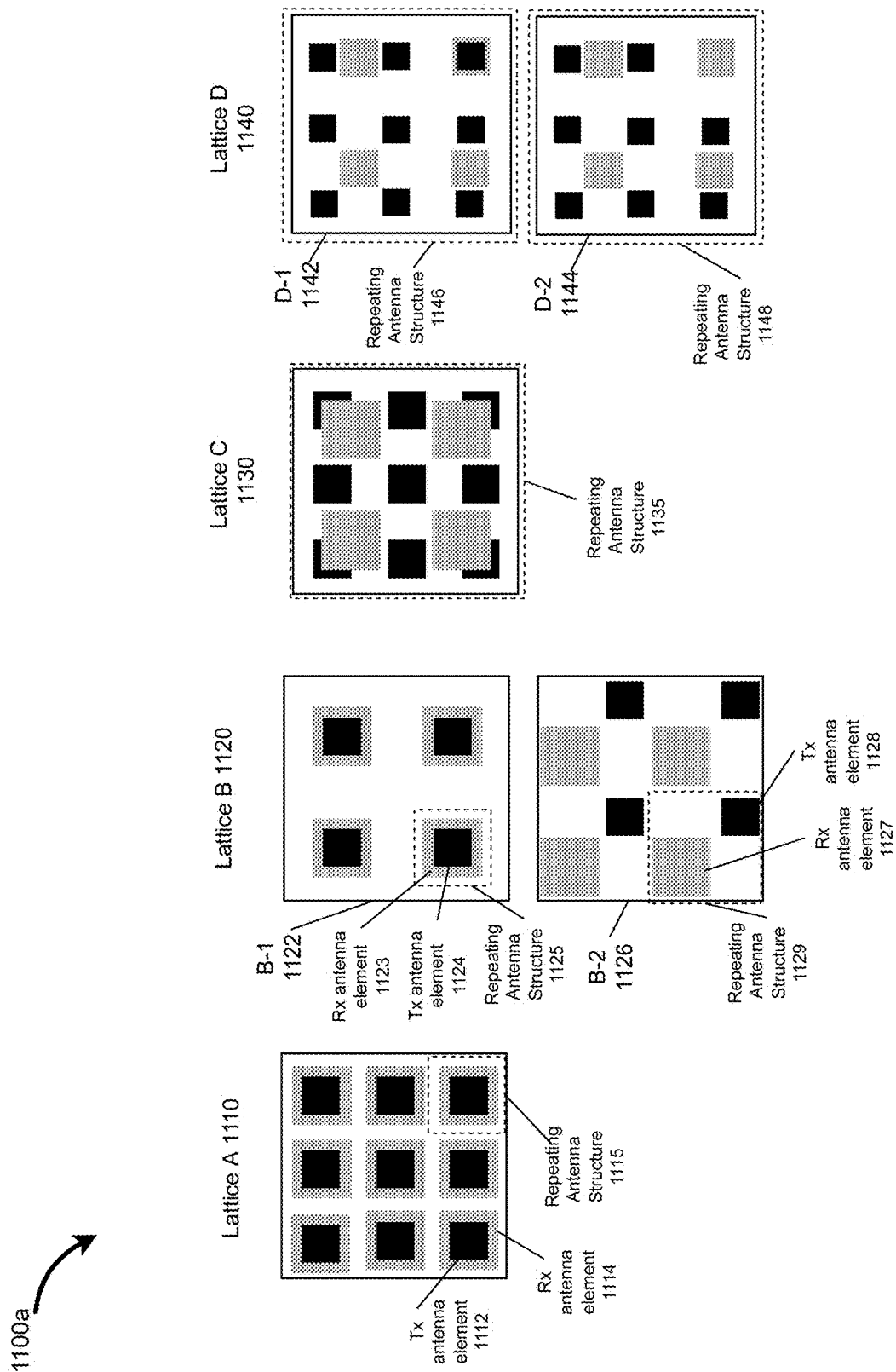
FIG. 11A illustrates top views of several configurations of antenna lattice used by full-duplex antenna systems, according to some embodiments.
Figure 11B:
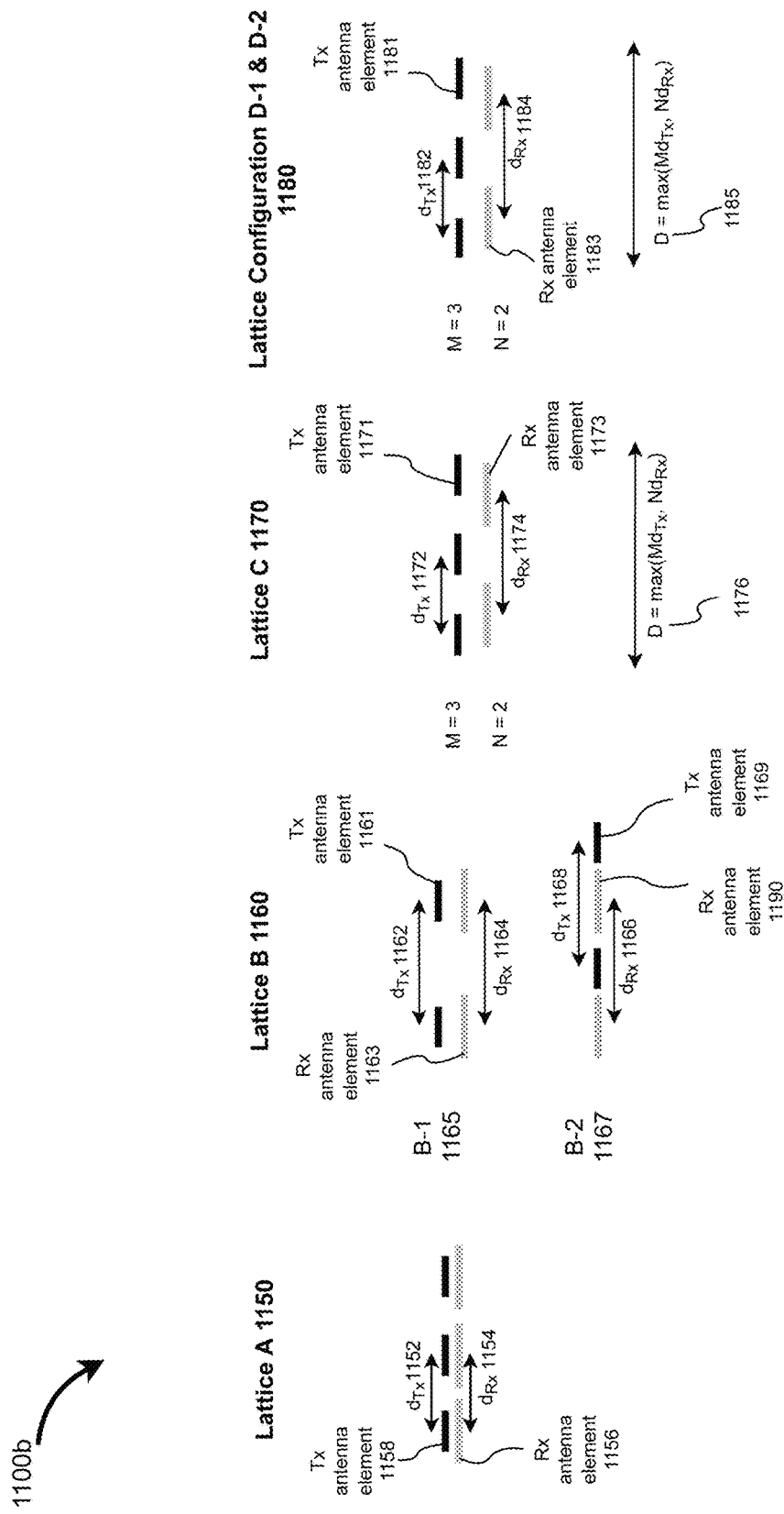
FIG. 11B illustrates cross-sectional views of several configurations of antenna lattice used by full-duplex antenna systems, according to some embodiments.

FIG. 11A and FIG. 11B depict top views and cross sectional views of four lattice configurations for a full-duplex single-panel UTP respectively.

Lattice A 1110 has a $d/\lambda$ configured at a Tx frequency higher than an Rx frequency. A combination of a Tx antenna element 1112 with an Rx antenna element 1114 creates a repeating antenna structure 1115. As used herein, the repeating antenna structure 1115 is also referred to as a full-duplex antenna element. Lattice A uses a Tx antenna element spacing $d_{Tx}$ 1152 (FIG. 11B) that is equal to an Rx antenna element spacing $d_{Rx}$, 1154.

As used herein, lattice A 1150 uses Tx antenna elements 1158 on a separate plane than Rx antenna elements 1156.

Lattice B top view 1120 and cross sectional view 1160 has two configurations B-1 and B-2. B-1 1165(FIG. 11B) and B-2 1167 (FIG. 11B) have their $d/\lambda$ configured at an Rx frequency lower than a Tx frequency. B-1 uses a Tx antenna element spacing $d_{Tx}$ 1162 that is equal to an Rx antenna element spacing dx 1164. B-2 uses a Tx antenna element spacing $d_{Tx}$ 1168 that is equal to an Rx antenna element spacing $d_{Rx}$ 1166. As shown in B-1 1122, a combination of a Tx antenna element 1123 with an Rx antenna element 1124 creates a repeating antenna structure 1125. As used herein, the repeating antenna structure 1125 is also referred to as a full-duplex antenna element. As shown in B-2 1126, a combination of a Tx antenna element 1128 with an Rx antenna element 1127 creates a repeating antenna structure 1129. As used herein, the repeating antenna structure 1125 is also referred to as a full-duplex antenna element.

As used herein, lattice B-1 1165 uses Tx antenna elements 1121 on a separate plane than Rx antenna elements 1163, lattice B-2 1167 uses Tx antenna elements 1169 on the same plane as Rx antenna elements 1190.

Lattice C 1130 is an example of a lattice configured to meet specifications of $d/\lambda$ for a Tx frequency as well as an Rx frequency. As used herein, the Tx frequency is higher than the Rx frequency. In other embodiments, Rx frequency is higher than a Tx frequency.

Lattice C cross-sectional view 1170, shows using a Tx antenna element spacing $d_{Tx}$ 1172 different from Rx antenna element spacing du 1174. For a square UTP, the side dimension D 1176 for Lattice C 1170 that would make it a repeating antenna structure 1135 is the maximum of the two values: $Md_{Tx}$ and $Nd_{Rx}$ where M is the number of Tx antenna elements and N is the number of Rx antenna elements. As used herein, a repeating antenna structure 1135, is a repeating pattern that allows for the scaling of the UTP by multiplying the number of repeating antenna structures in a KxK fashion, where K is an integer number.

$$D = \max(Md_{Tx}, Nd_{Rx}) \quad \text{Equation 5:}$$

As used herein, lattice C 1170 uses Tx antenna elements 171 on a separate plane than Rx antenna elements 1173.

Lattice D 1140 is another example of a lattice configured to meet specifications of $d/\lambda$ for a Tx frequency as well as an Rx frequency. As used herein, the Tx frequency is higher than the Rx frequency. In other embodiments, Rx frequency may be higher than a Tx frequency.

Lattice D-1 top view 1142 and D-2 top view 1144, both show using a Tx antenna element spacing $d_{Tx}$ 1182 different from Rx antenna element spacing $d_{Rx}$ 1184.

In some embodiments, the side dimension D 1185 for Lattice D1 1142 that would make it a repeating antenna structure 1146 in a square configuration is the maximum of the two values; $Md_{Tx}$ and $Nd_{Rx}$ where M is the number of Tx antenna elements and N is the number of Rx antenna elements. As used herein, a repeating antenna structure 1146, is a repeating pattern that allows for the scaling of the UTP by multiplying the number of repeating antenna structures in a KxK fashion, where K is an integer number.

In other embodiments, the side dimension D 1185 for Lattice D2 1144 that would make it a repeating antenna structure 1148 in a square configuration is the maximum of the two values: $M_{dTx}$ and $Nd_{Rx}$ where M is the number of Tx antenna elements and N is the number of Rx antenna elements. As used herein, a repeating antenna structure 11468, is a repeating pattern that allows for the scaling of the UTP by multiplying the number of repeating antenna structures in a KxK fashion, where K is an integer number.

As used herein, lattice D-1 and D-2 both use Tx antenna elements 1181 on a separate plane than Rx antenna elements 1183.

TABLE 1

Pros and Cons of Lattice Configurations

| Lattice | Pros | Cons |
|---|---|---|
| A | No grating lobes for both Tx and Rx frequencies (and therefore an optimum scanning) depending on value of separation with respect to Tx wavelength (d/λ) Repeating antenna structure consists of 1 type of antenna comprising a Tx antenna element and an Rx antenna element | Highest RFIC density Highest DC power that is required to drive the RFICs Cost is highest due to the highest RFIC density Highest coupling between any two adjacent Rx antenna elements due solely to their smallest spacing |
| B-1 | Minimum RFIC density Repeating antenna structure consists of a single type of full-duplex antenna element comprising a Tx antenna element disposed above an Rx antenna element | Presence of grating lobes in the Tx frequencies and therefore highest scan loss in the Tx frequency |
| B-2 | Minimum RFIC density Repeating antenna structure consists of a single type of full-duplex antenna element comprising a Tx antenna element disposed diagonal with respect to an Rx antenna element, resulting in a more cost effective PCB manufacturing | Presence of rating lobes in the Tx frequencies and therefore highest scan loss in the Tx frequenecy |
| C | No grating lobes for both Tx frequency and Rx frequency (and therefore an optimum scanning), depending on value of separation with respect to wavelength for each Tx (d/λ) and Rx (d/λ), chosen separately | Requires 2 different types of antenna elements (for the example of Ka band where the ratio of Tx to Rx frequency is 3:2) within the repeating antenna structure, this means: signle band Tx antenna element and a dual band Tx/Rx element |
| D1 | No grating lobes for both Tx frequency and Rx frequency (and therefore an optimum scanning), depending on value of separation with respect to wavelength for each Tx (d/λ) and Rx (d/λ), chosen separately | Requires 3 different types of antenna elements (tor the example of Ka band where the ratio of Tx to Rx frequency is 3:2) within the repeating antenna structure, this means: single band Tx antenna element, sinide band Rx antenna element, and a dual band Tx/Rx element |
| D2 | No grating lobes for both Tx frequency and Rx frequency (and therefore an optimum scanning), depending. on value of separation with respect to wavelength for each Tx (d/λ) and Rx (d/λ), chosen separately Lower in cost compared with D1 because it uses less Tx antenna elements and therefore less Tx RFICs | Requires 2 different types of antenna elements (for the example of Ka band where the ratio of Tx to Rx frequency is 3:2) within the repeating antenna structure, this means: single band Tx antenna element and a single band Rx antenna element |

Figure 12:
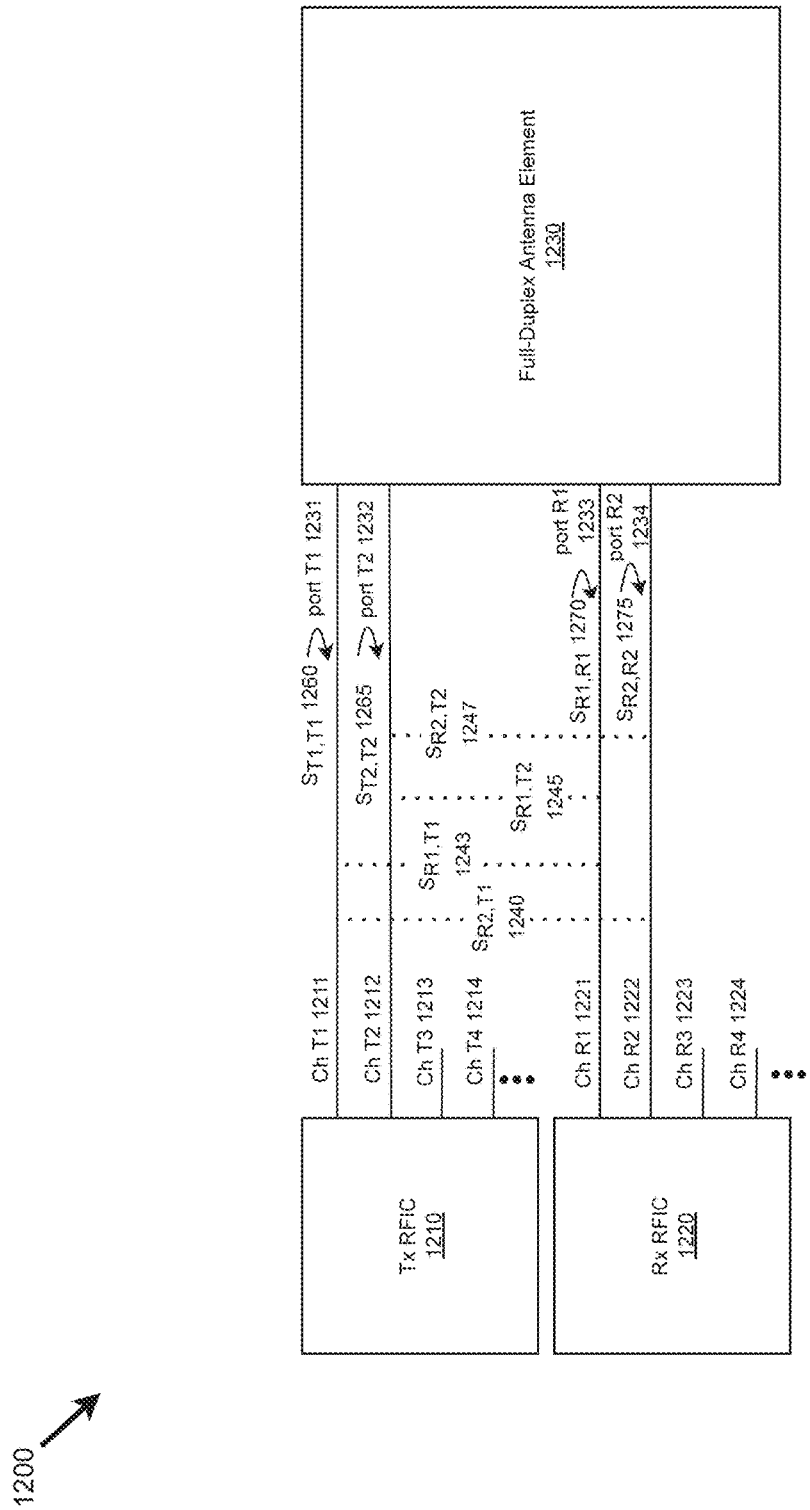
FIG. 12 illustrates a block diagram of the Transmit (Tx) Radio Frequency Integrated Circuit (RFIC). Receive (Rx) RFIC as well as Full-Duplex Antenna Element, according to some embodiments.

FIG. 12 depicts a block diagram 1200 showing the Tx RFIC 1210 channels such as Ch T1 1211, Ch T2 1212 connected to a Tx antenna element 1230 through port T1 1231 and port T2 1232, respectively. Also shown in 1200 are the connections between an Rx RFIC 1220 channels Ch R1 1221, Ch R2 1222 connected to an Rx antenna element 1230 through port R1 1233 and port R2 12324, respectively. As shown, the full-duplex antenna element 1230 has a total of 4 ports, with 2 ports per Tx antenna element and 2 ports per Rx antenna element. The 2 ports per Tx and Rx antenna elements allow for full polarization control. As shown in 1200, Ch T1 1211 is connected to port T1 1231 of the full-duplex antenna element 1230, Ch T2 1212 is connected to port T2 1232 of the full-duplex antenna element 1230, Ch R1 1221 is connected to port R1 1233 of the full-duplex antenna element 1230, and Ch R2 1222 is connected to port R2 1234 of the full-duplex antenna element 1230. In some embodiments, Ch T3 1213, Ch T4 1214, Ch R3 1223, and Ch R4 1224 are connected to another full-duplex antenna element (not shown). In other embodiments (not shown), the Tx RFIC 1210 and the Rx RFIC 1220 may have 1 channel, 2 channels, 8 channels, or 16 channels.

Shown in FIG. 12 are the self S-parameters $S_{T1,T1}$ 1260, $S_{T2,T2}$ 1265, $S_{R1,R1}$ 1270, $S_{R2,R2}$ 1275 which represent an energy reflected at the respective port. As an example, $S_{T1,T1}$ represents an amount of power that is reflected at port T1. As used herein, a self S-parameter is referred to as return loss.

Also shown in FIG. 12 are the mutual S-parameters $S_{R1,T1}$ 1240, $S_{S1,T1}$ 1243, $S_{R1,T2}$ 1245, $S_{R2,T2}$ 1247 which represent an energy coupled from one port to another in the network that is shown in the block diagram 1200. As an example, $S_{R1,T1}$ represents an amount of power that is coupled from port T1 into port R1, As used herein, a mutual S-parameter is referred to as coupling.

Figure 13:
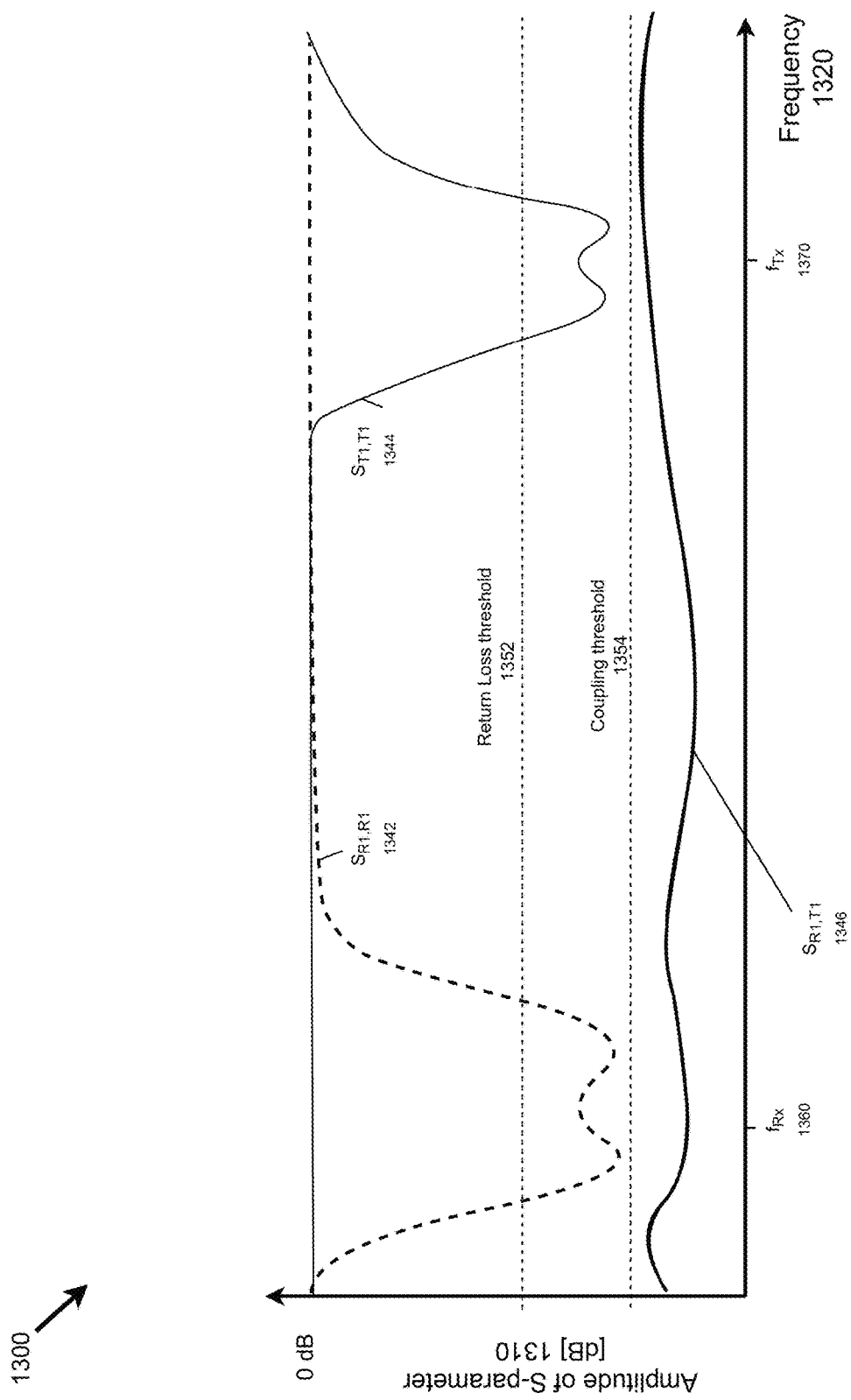
FIG. 13 is a graph illustrating S-parameters vs. frequency of a full-duplex antenna element, according to some embodiments.

FIG. 13 is a graph that illustrates a threshold level for return loss and coupling, according to some embodiments. Graph 1300 shows a vertical axis 1310 that represents an amplitude of the S-matrix in decibel [dB] and a horizontal axis that has the frequency 1320, typically in units of GHz. Also shown are specific frequencies of interest such as $f_{Rx}$ 1360 and $f_{Tx}$ 1370.

In some embodiments $S_{R1,R1}$ 1342 is an example of a return loss of a Rx antenna element of a full duplex antenna element and $S_{T1,T1}$ 1344 is an example of a return loss response of a Tx antenna element of a full-duplex antenna element. Furthermore, $S_{R1,T1}$ 1346 is an example coupling response between a Tx antenna element and a Rx antenna element of a full-duplex antenna element.

In some embodiments, a threshold level is defined for the return loss 1352 of a Tx antenna element and Rx antenna element, as well as a coupling 1354 between a Tx antenna element and an Rx antenna element.

Figure 14:
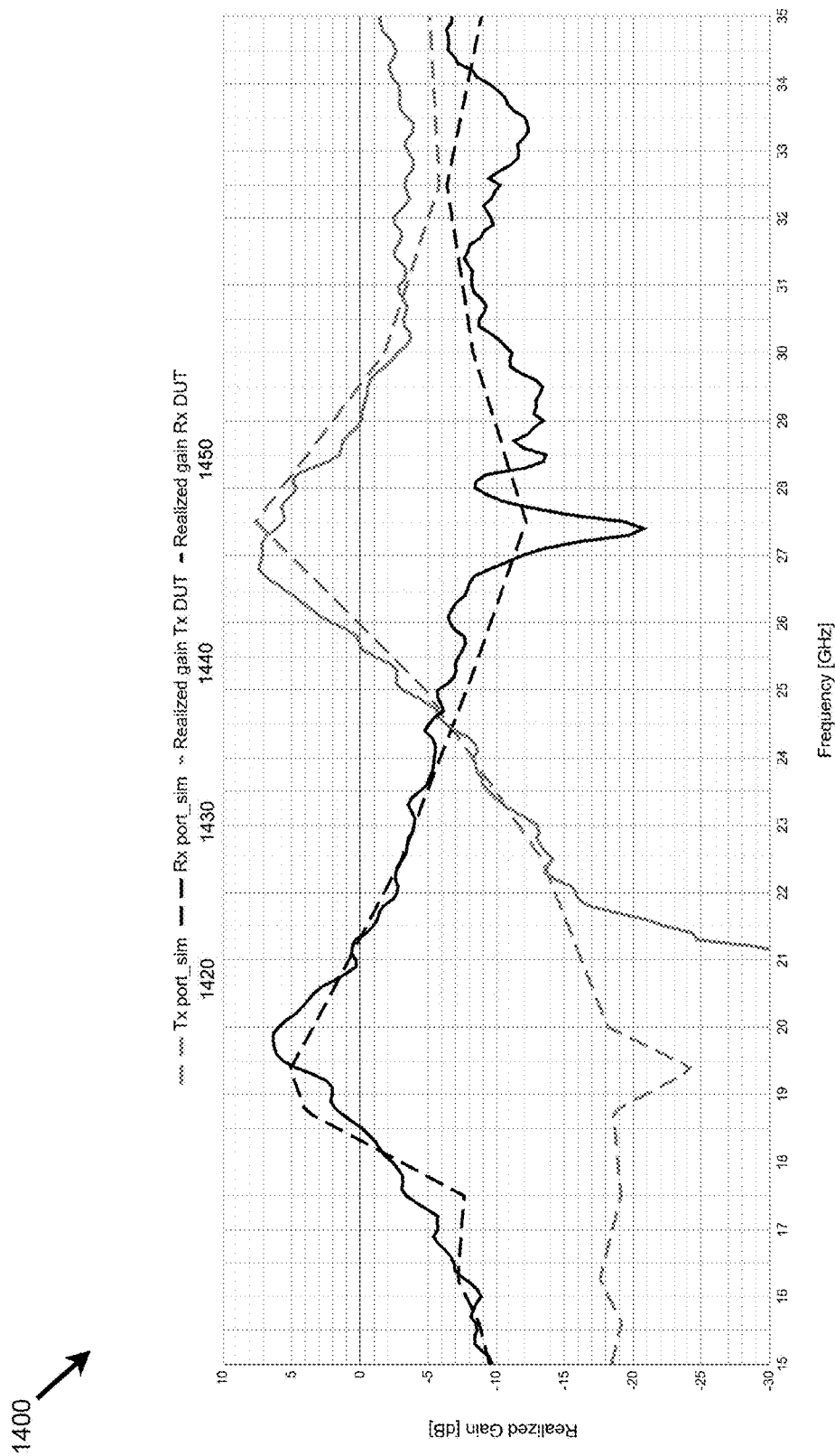
FIG. 14 is a graph illustrating realized gain vs. frequency of a full-duplex antenna element, according to some embodiments.

FIG. 14 is a graph that illustrates exemplar realized gain measurements of the Tx antenna element 1440 of a full-duplex antenna element and realized gain measurements of the Rx antenna element 1450 of a full-duplex antenna element, according to some embodiments. Also in 1440 are the simulation results of the Tx antenna element 1420 and the simulation results of the Rx antenna element 1430. Realized gain is an important antenna metric that represents the amount of energy that is accepted by an antenna and radiated out. Graph 1400 shows that at 19.5 GHz, the realized gain of the Rx antenna element is around 5 dB while the realized gain of the Tx antenna element is around −25 dB. This difference of 30 dB in the realized gain between the Rx antenna element and the Tx antenna element is key to a successful full-duplex operation and owes itself to the design of the full-duplex antenna element including the isolation between the Tx antenna element and the Rx antenna element.

Figure 15:
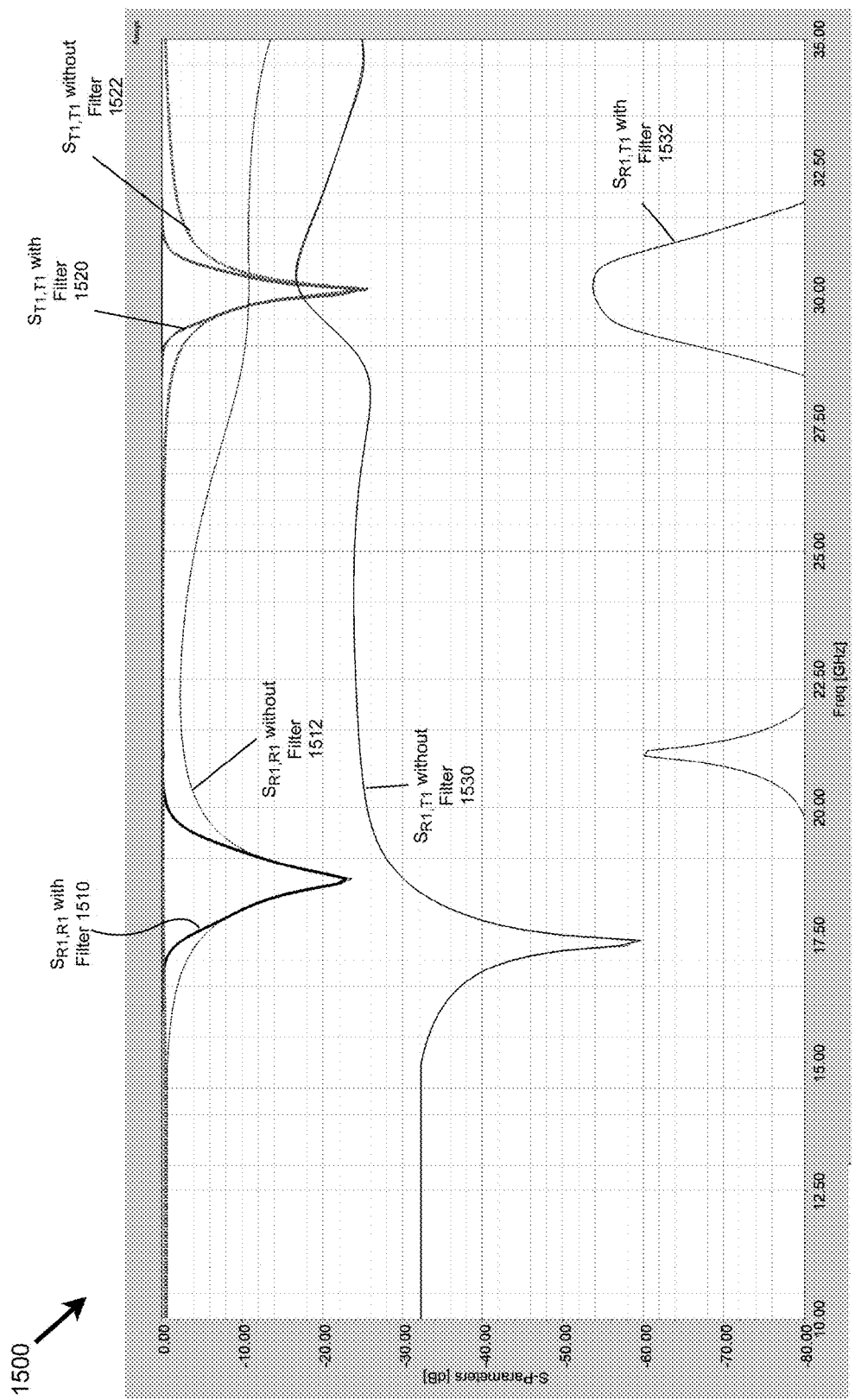
FIG. 15 is a graph illustrating S-parameters vs. frequency of a full-duplex antenna element utilizing filters, according to some embodiments.

FIG. 15 is a graph that illustrates the S-parameters response of a full-duplex antenna element 220 (FIG. 2) with and without a Tx filter 236 (FIG. 2) and an Rx filter 246 (FIG. 2). As shown in 1500, the $S_{R1,T1}$ with filter 1532 presents a significant improvement when compared with $S_{R1,T1}$ without filter 1530. Also shown in 1550 are $S_{R1,R1}$ with filter 1510 and $S_{R1,R1}$ without filter 1530 as well as $S_{T1,T1}$ with filter 1520 and $S_{T1,T1}$ without filter 1522. As used herein, the Tx filter is a band-pass filter for the Tx frequency range 29 GHz to 31 GHz and the Rx filter is a band pass filter for the Rx frequency range 17 GHz to 20 GHz. The penalty of using such filters is the insertion loss that the filter itself adds to the circuitry, which ultimately results in a reduced G/T of the UTP and a reduced EIRP of the UTP.

Figure 16:
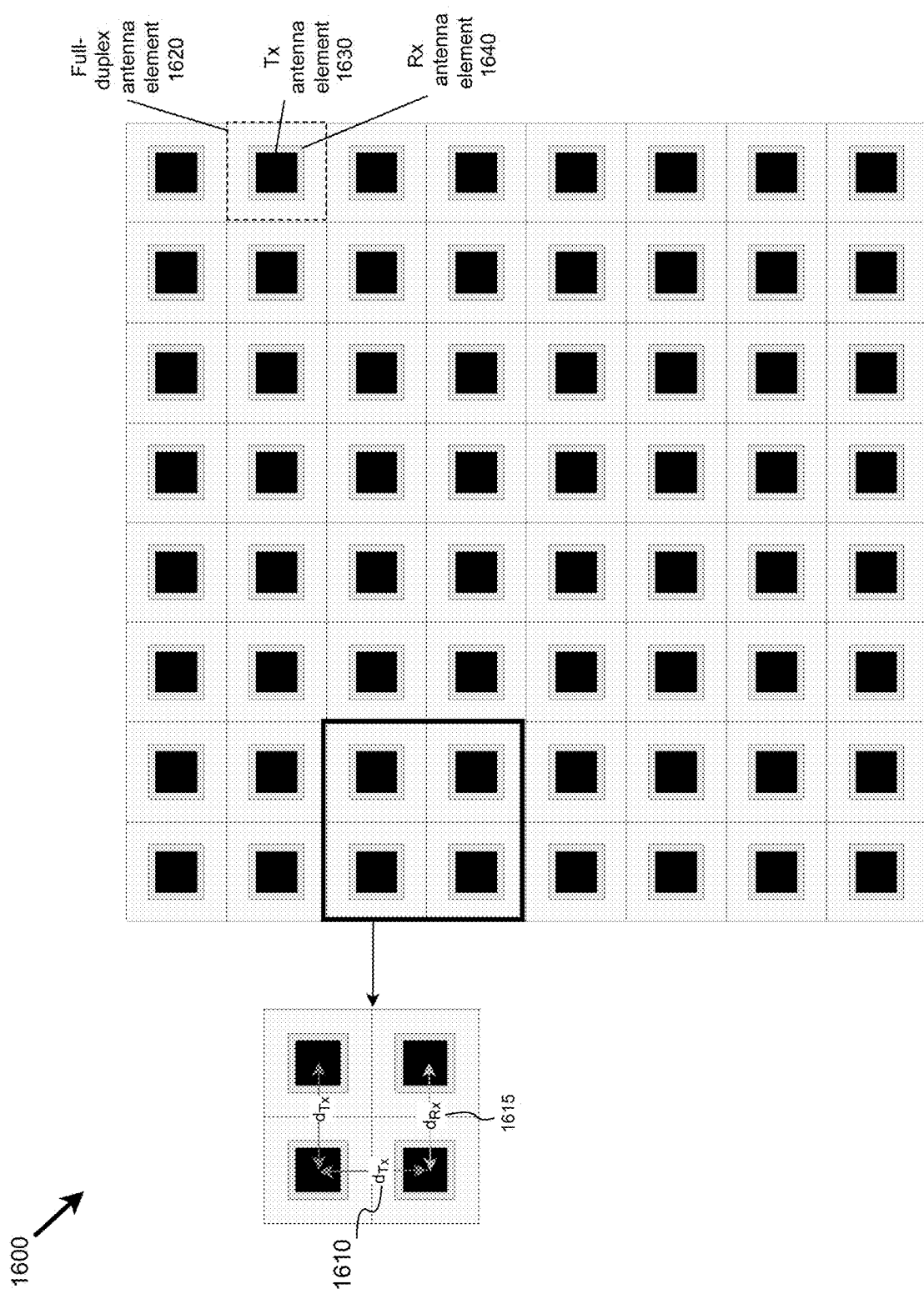
FIG. 16 depicts an example lattice configuration of a full-duplex antenna element, optimized for scanning in the Tx frequency, according to some embodiments.

FIG. 16 depicts a UTP with Lattice A (FIG. 11A) which uses a d/λ configured at a Tx frequency higher than an Rx frequency. Lattice A uses a Tx antenna element spacing $d_{Tx}$ 1610 that is equal to an Rx antenna element spacing $d_{Rx}$ 1615. As used herein, a full-duplex antenna element 1620 consists of a Tx antenna element 1630 and an Rx antenna element 1640.

Figure 17:
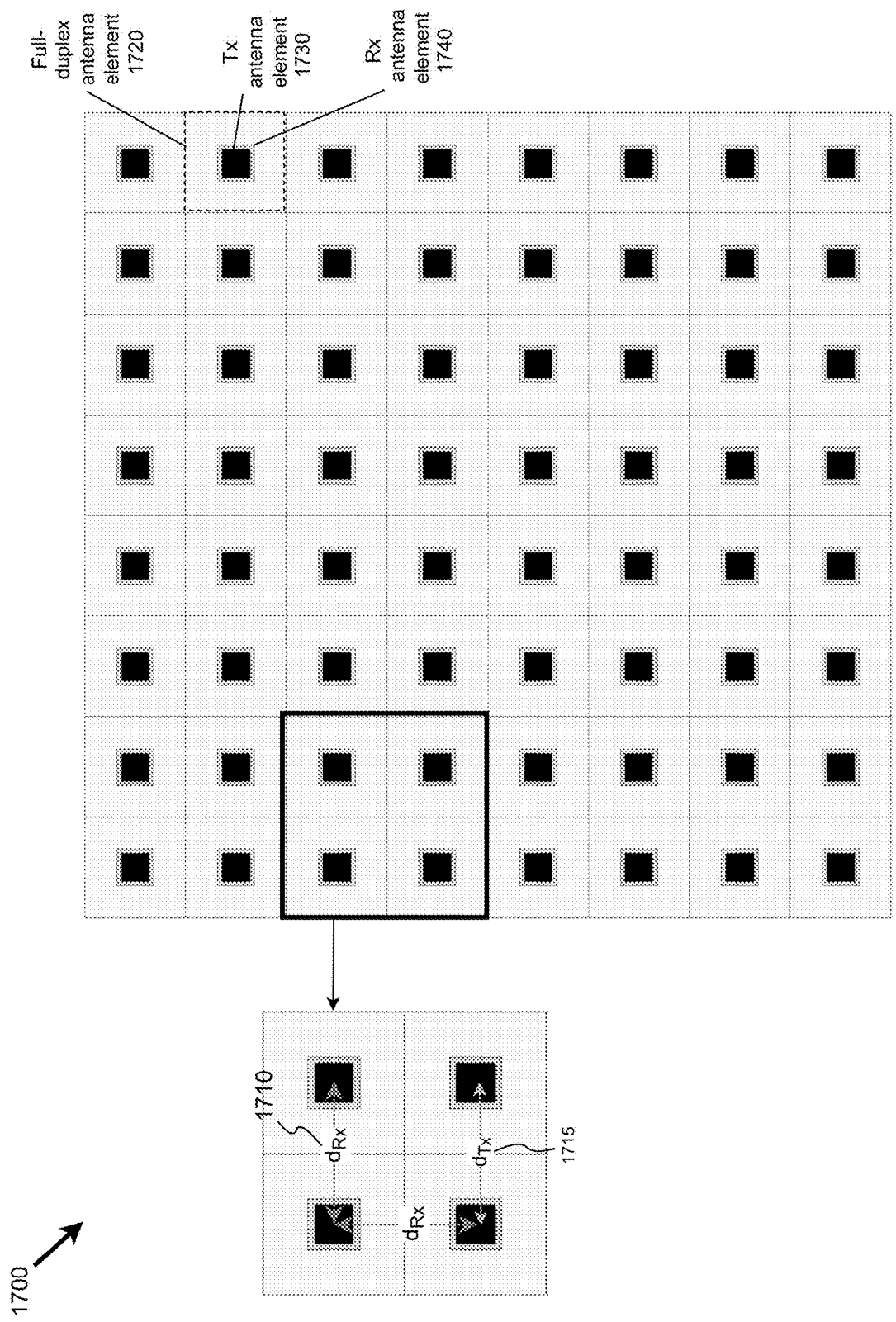
FIG. 17 depicts an example lattice configuration of a full-duplex antenna element, optimized for scanning in the Rx frequency, according to some embodiments.

FIG. 17 depicts a UTP with Lattice B-1 (FIG. 11A) which uses a d/λ configured at an Rx frequency lower than a Tx frequency. Lattice B-1 uses an Rx antenna element spacing $d_{Rx}$ 1710 that is equal to a Tx antenna element spacing $d_{Tx}$ 1715. As used herein, a full-duplex antenna element 1720 consists of a Tx antenna element 1730 and an Rx antenna element 1740.

Figure 18:
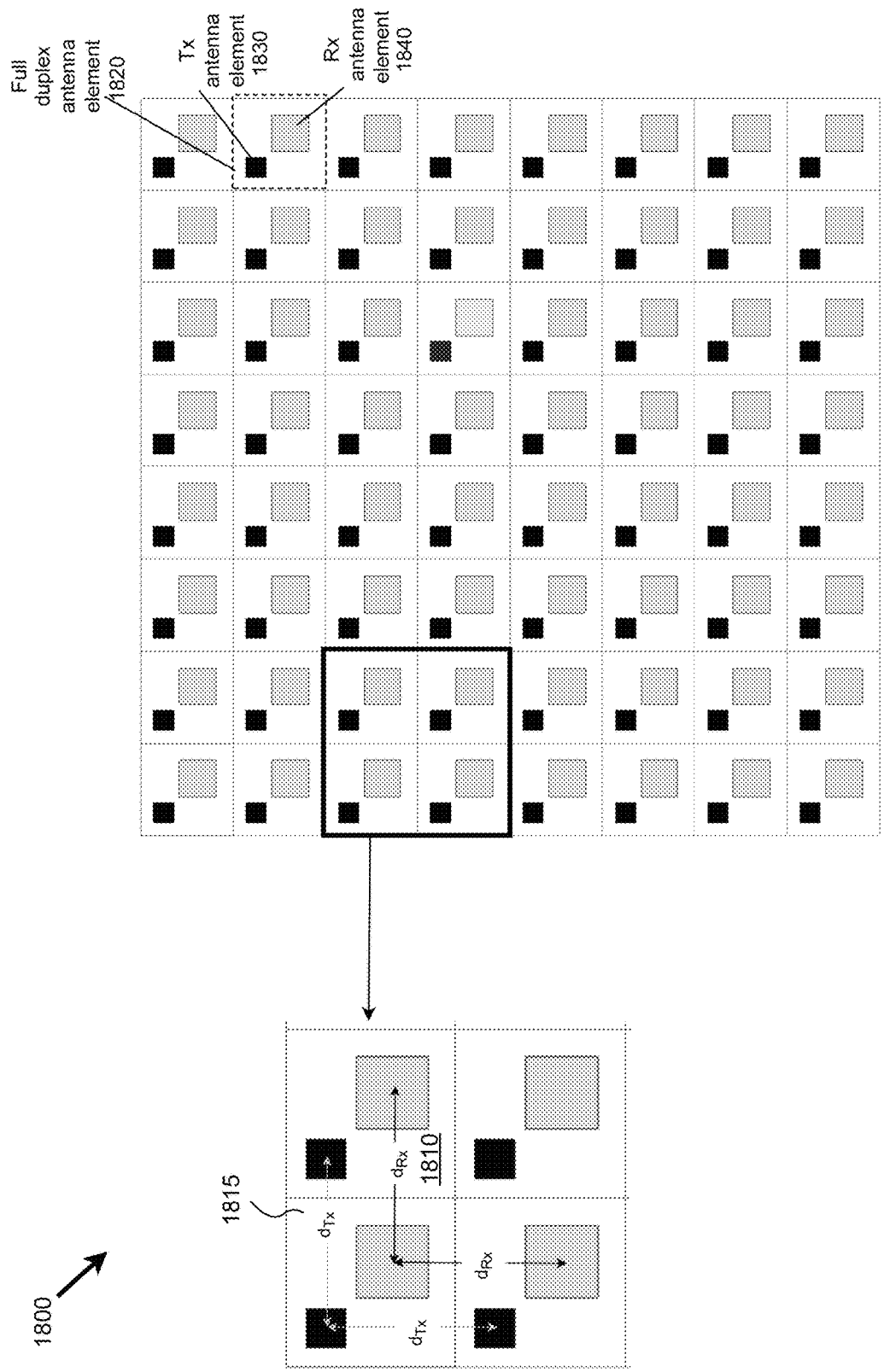
FIG. 18 depicts an example lattice configuration of a full-duplex antenna element, optimized for scanning in the Rx frequency, according to some embodiments.

FIG. 18 depicts a UTP with Lattice B-2 (FIG. 11A) which uses a d/λ configured at an Rx frequency lower than a Tx frequency. Lattice B-2 uses an Rx antenna element spacing $d_{Rx}$ 1810 that is equal to a Tx antenna element spacing $d_{Tx}$ 1815. As used herein, a full-duplex antenna element 1820 consists of a Tx antenna element 1830 and an Rx antenna element 1840.

Figure 19A:
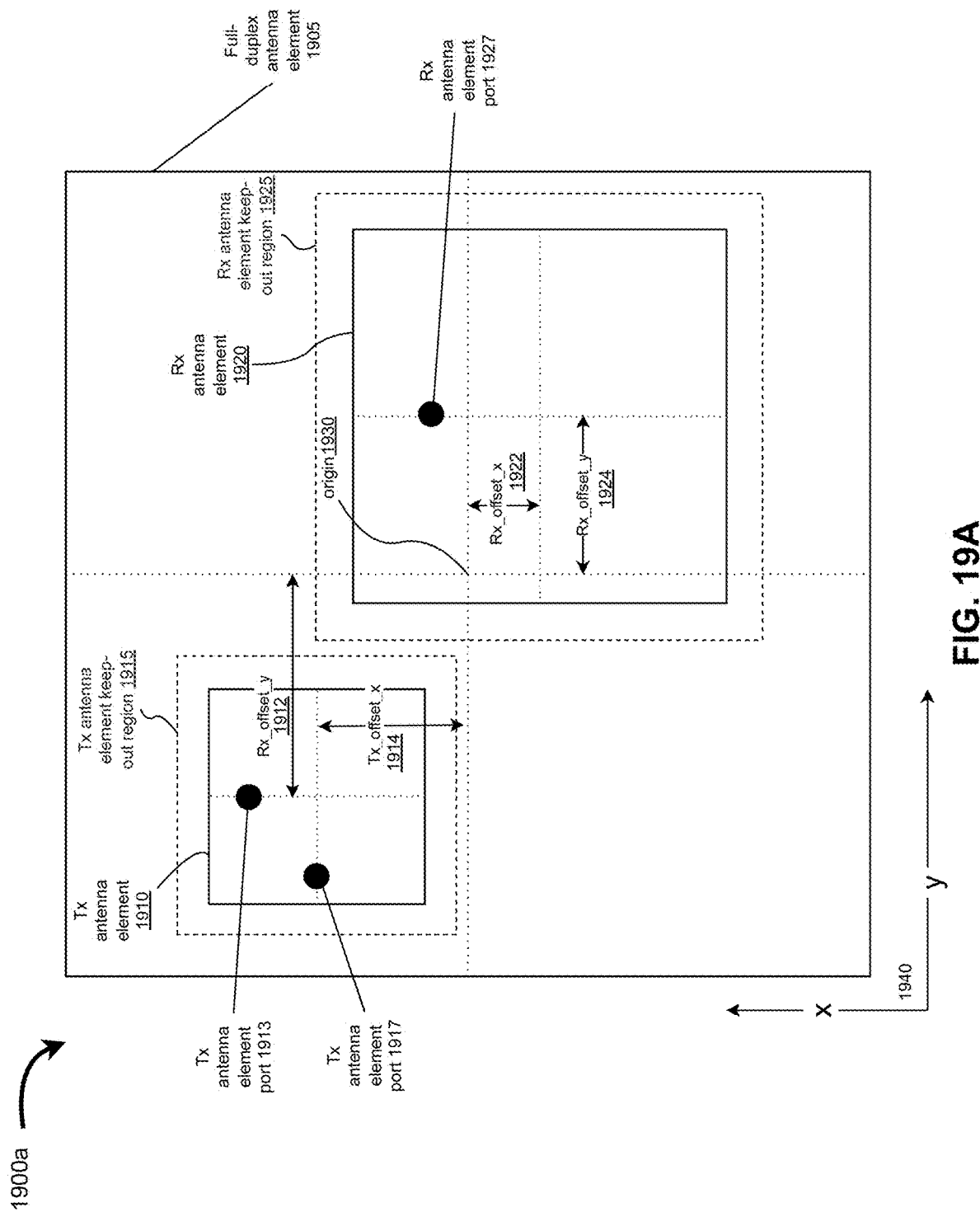
FIG. 19A depicts a full-duplex antenna element showing a keepout region, according to some embodiments.
Figure 19B:
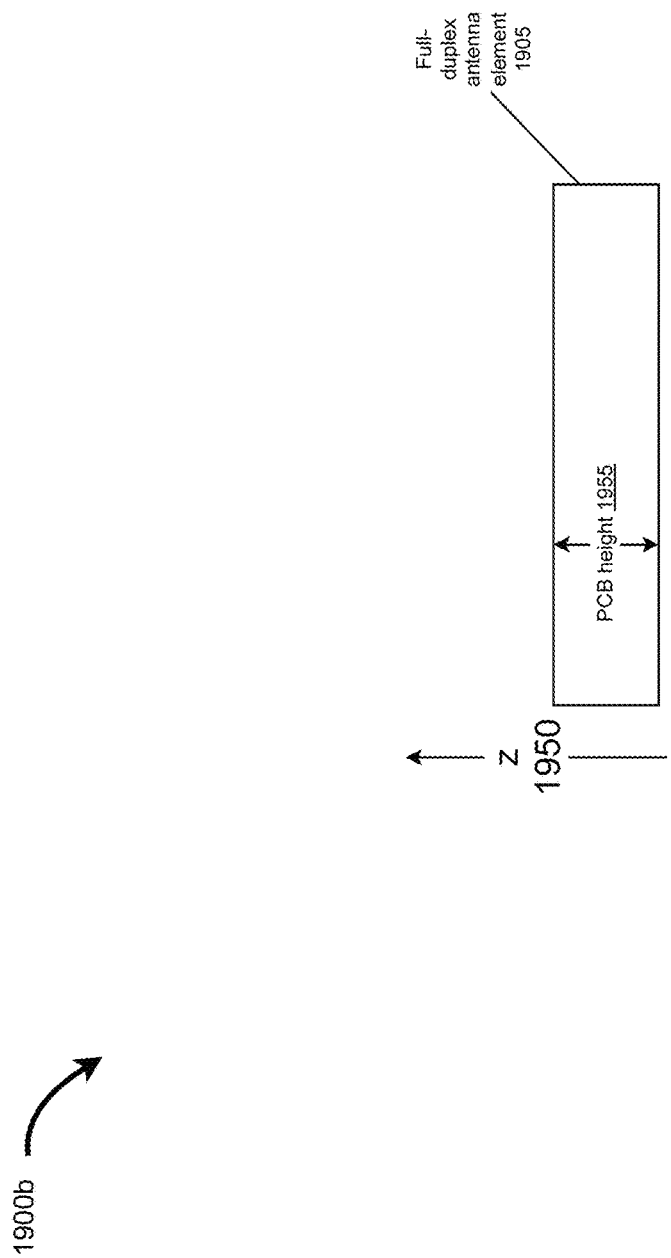
FIG. 19B illustrates the height of the PCB of the full-duplex antenna element, according to some embodiments.

FIG. 19A and FIG. 19B illustrate a full-duplex antenna element for performing full-duplex communication, according to some embodiments. 1900a illustrates a top view of a full-duplex antenna element 1905, including a Tx antenna element keepout region 1915 of a Tx antenna element 1910 and an Rx antenna element keepout region 1925 of an Rx antenna element 1920. As used herein, the Tx antenna element keepout region is a spatial zone disposed about a periphery of the Tx antenna element, and the Rx antenna element keepout region is a spatial zone disposed about a periphery of the Rx antenna element. As shown herein, 1905 is an example of a Tx antenna element 1910 and an Rx antenna element 1920 lying on an x-y plane 1940 of a printed circuit board (PCB). In other embodiments, the Tx antenna element and the Rx antenna element are disposed on different layers of a PCB. The Tx antenna keepout region 1915 and the Rx antenna keepout region 1925 are dependent upon the electric field strength of the Tx antenna element 1910 and the Rx antenna element 1920, respectively. The stronger the electric field strength, the larger the keepout region. The purpose of the Tx antenna keepout region and the Rx antenna keepout region plays a key role in maximizing the Tx/Rx isolation 250 (FIG. 2) within the full-duplex antenna element 1905.

1900b illustrates a cross-sectional view of a full-duplex antenna element 1905, according to some embodiments. In such embodiments, the Tx antenna keepout region and Rx antenna keepout region extends beyond the x-y plane 1940 and into the z plane 1950. In such embodiments, the Tx antenna element and the Rx antenna element are disposed on one or more layers of the PCB 1955.

FIG. 19A also illustrates Tx antenna element port 1913 placed in a non-orthogonal orientation when compared with Rx antenna element port 1927. Also shown is Tx antenna element port 1917 in an orthogonal orientation when compared with Rx antenna element port 1927.

Figure 20:
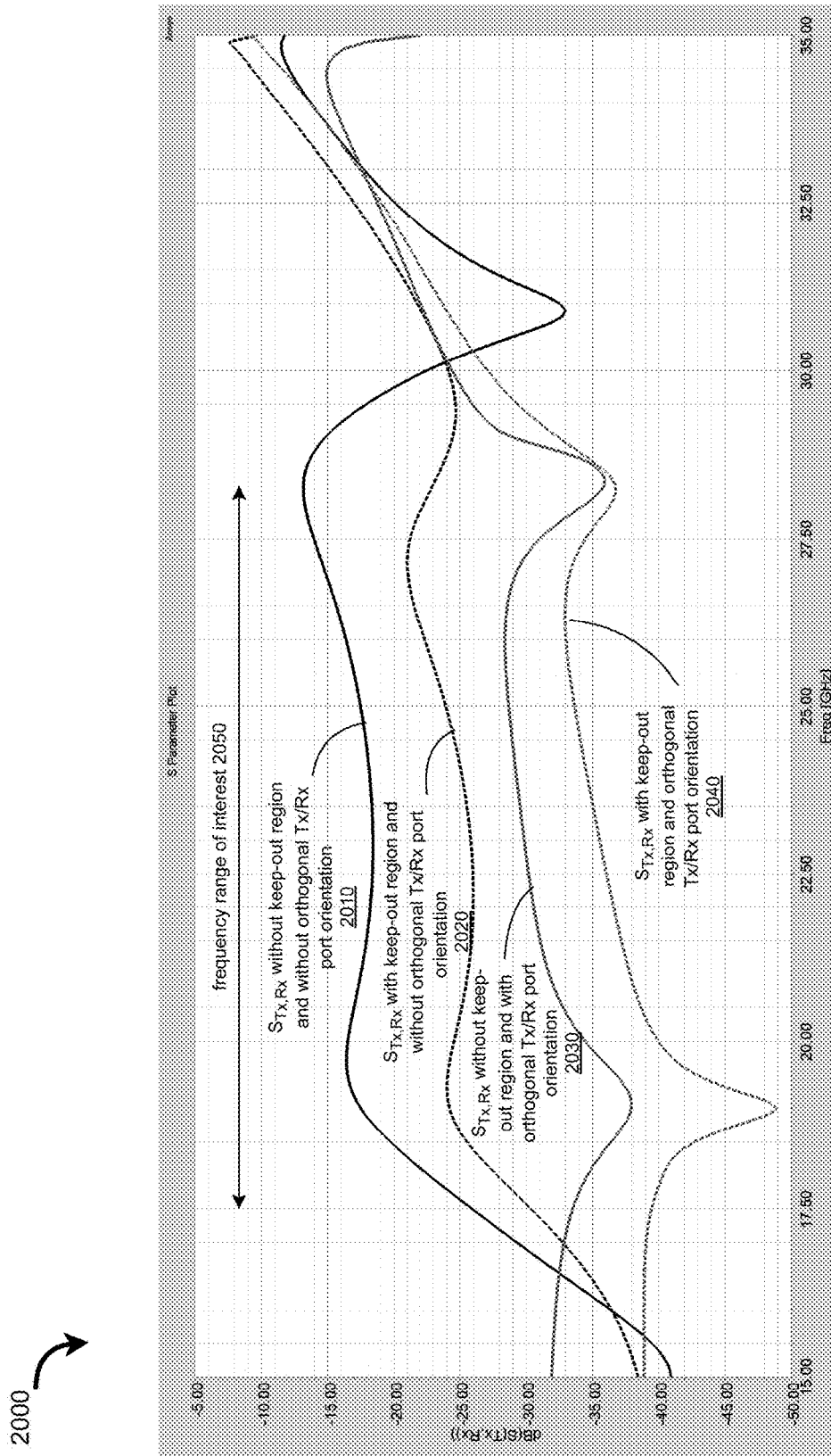
FIG. 20 is a graph illustrating the effect of the keepout region and port orthogonality, according to some embodiments.

FIG. 20 is a graph illustrating the effect of keepout region as well as port orientation of the full-duplex antenna element, according to some embodiments. Graph 2000 is an exemplary graph illustrating the coupling level between a Tx antenna element port and an Rx antenna element port of the full-duplex antenna element of an antenna system. As shown in graph 2000, using a keepout region 2020 reduces the coupling level between the Tx antenna element port and the Rx antenna element port; in other words the isolation between said ports increases in the frequency range of interest 2050, when compared with a scenario where no keepout region was used 2010.

Graph 2000 also illustrates the effect of antenna element port orthogonality on the isolation between Tx antenna element and Rx antenna element. As shown, an $S_{Tx,Rx}$ with keepout region and with orthogonal port orientation 2040 shows more isolation than $S_{Tx,Rx}$ with keepout region and without orthogonal port orientation 2020, in a frequency range of interest 2050.

Figure 21:
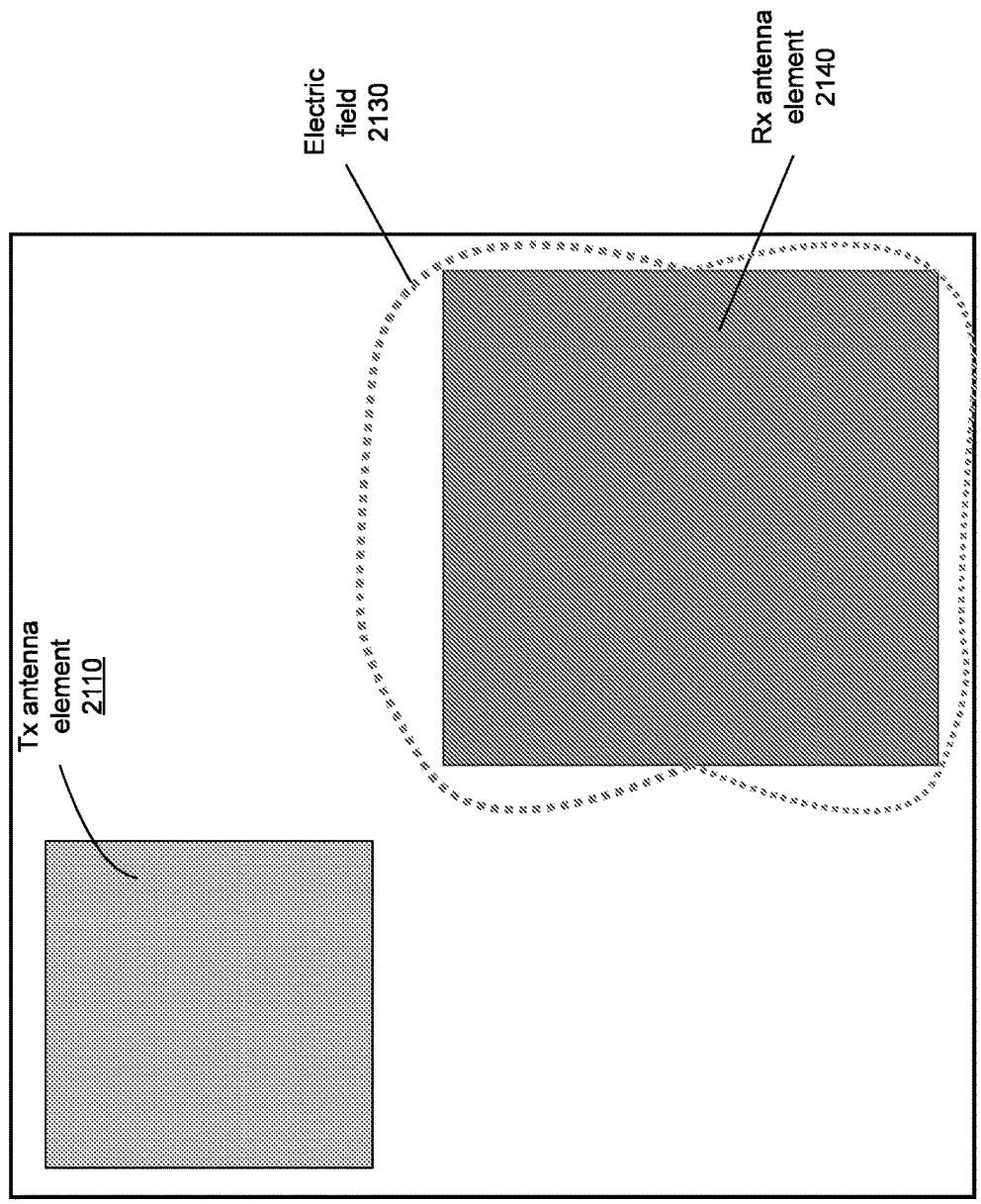
FIG. 21 depicts the Electric Field intensity of a full-duplex antenna element, according to some embodiments.

FIG. 21 depicts an Electric Field 2130 of an Rx antenna element 2140 in presence of a Tx antenna element 2110 within a full-duplex antenna element 2100, according to some embodiments. As illustrated in 2100, a confinement of the Electric Field strength at the Rx antenna is due to the Rx antenna element keepout region (not shown). This in turn, enables a large isolation between the Rx antenna element port and the Tx antenna element port. This is depicted by having weak Electric Field at the Tx antenna element port (40 dB lower with reference to the strongest Electric Field at the Rx antenna port) coupled from the Rx antenna element port. As used herein, the coupling between an Rx antenna and a Tx antenna is the same as the coupling between the Rx antenna port and the Tx antenna port.

Figure 22:
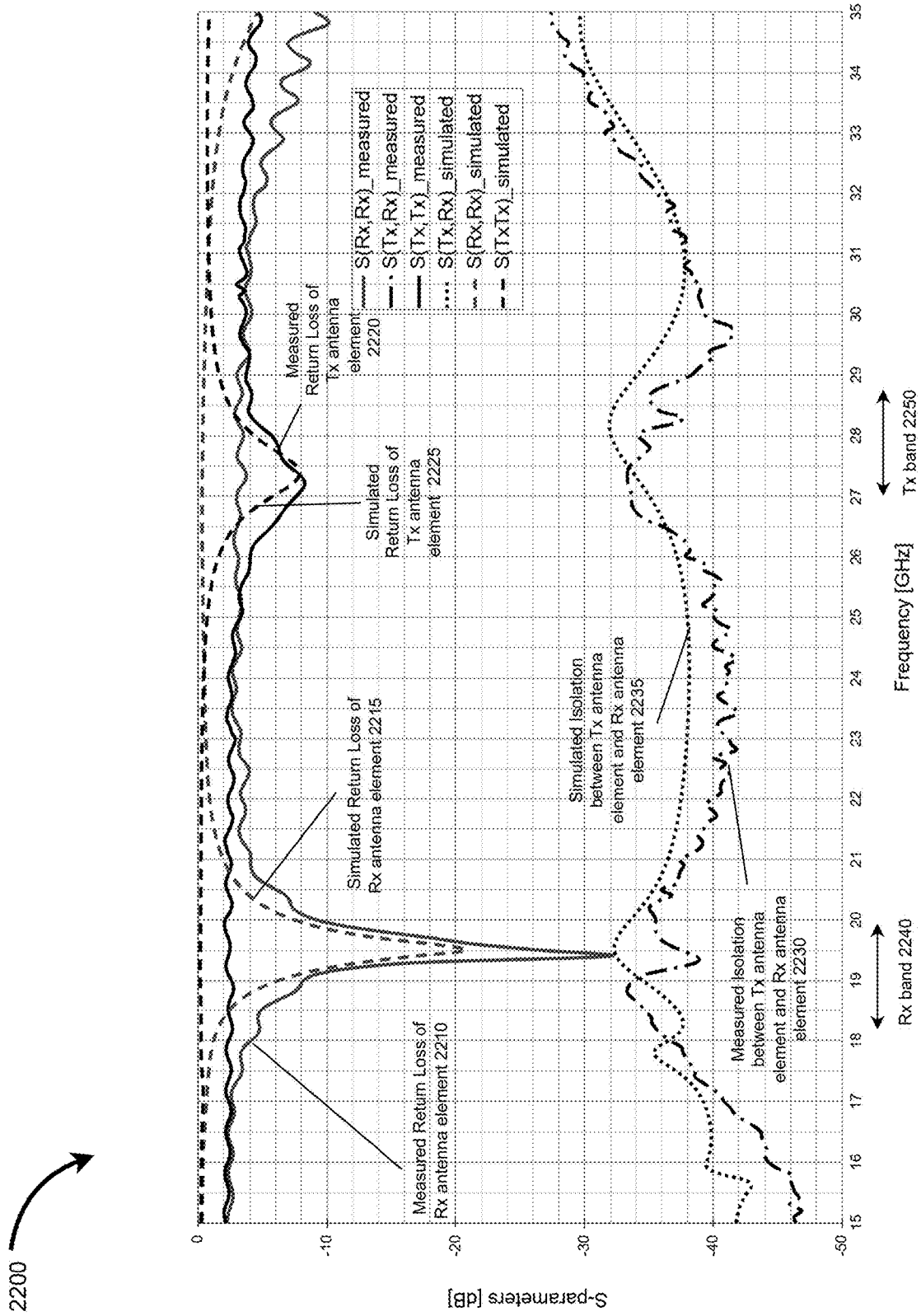
FIG. 22 is a graph illustrating the S-parameters of a full-duplex antenna element, according to some embodiments.

FIG. 22 is a graph that illustrates the S-parameters of a full-duplex antenna element using Lattice B-2 (FIG. 11A), according to some embodiments. Shown in graph 2200 are: measured return loss of an Rx antenna element 2210, simulated return loss of an Rx antenna element 2215, measured return loss of a Tx antenna element 2220, simulated return loss of a Tx antenna element 2225, measured isolation between Tx antenna element and Rx antenna element 2230, and simulated isolation between Tx antenna element and Rx antenna element 2235. The S-parameters are of specific interest in certain bands such as Rx band 2240 and Tx band 2250.

Figure 23A:
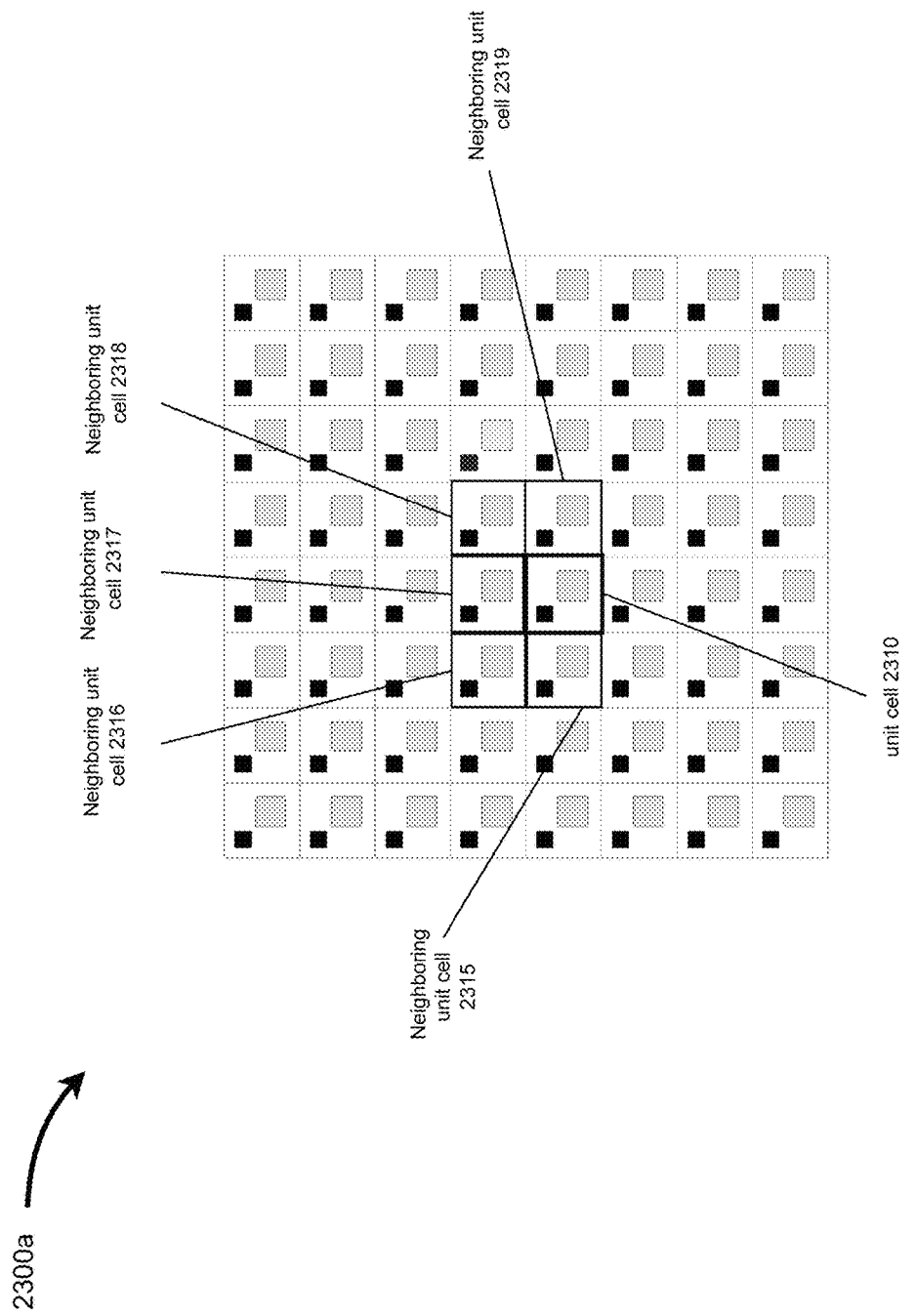
FIG. 23A illustrates a repeating antenna structure and a neighboring repeating antenna structure, according to some embodiments.

FIG. 23A illustrates a repeating antenna structure 2310 and a neighboring repeating antenna structure 2315. As used herein, a neighboring repeating antenna structure is any repeating antenna structure that is touching 2310.

Figure 23B:
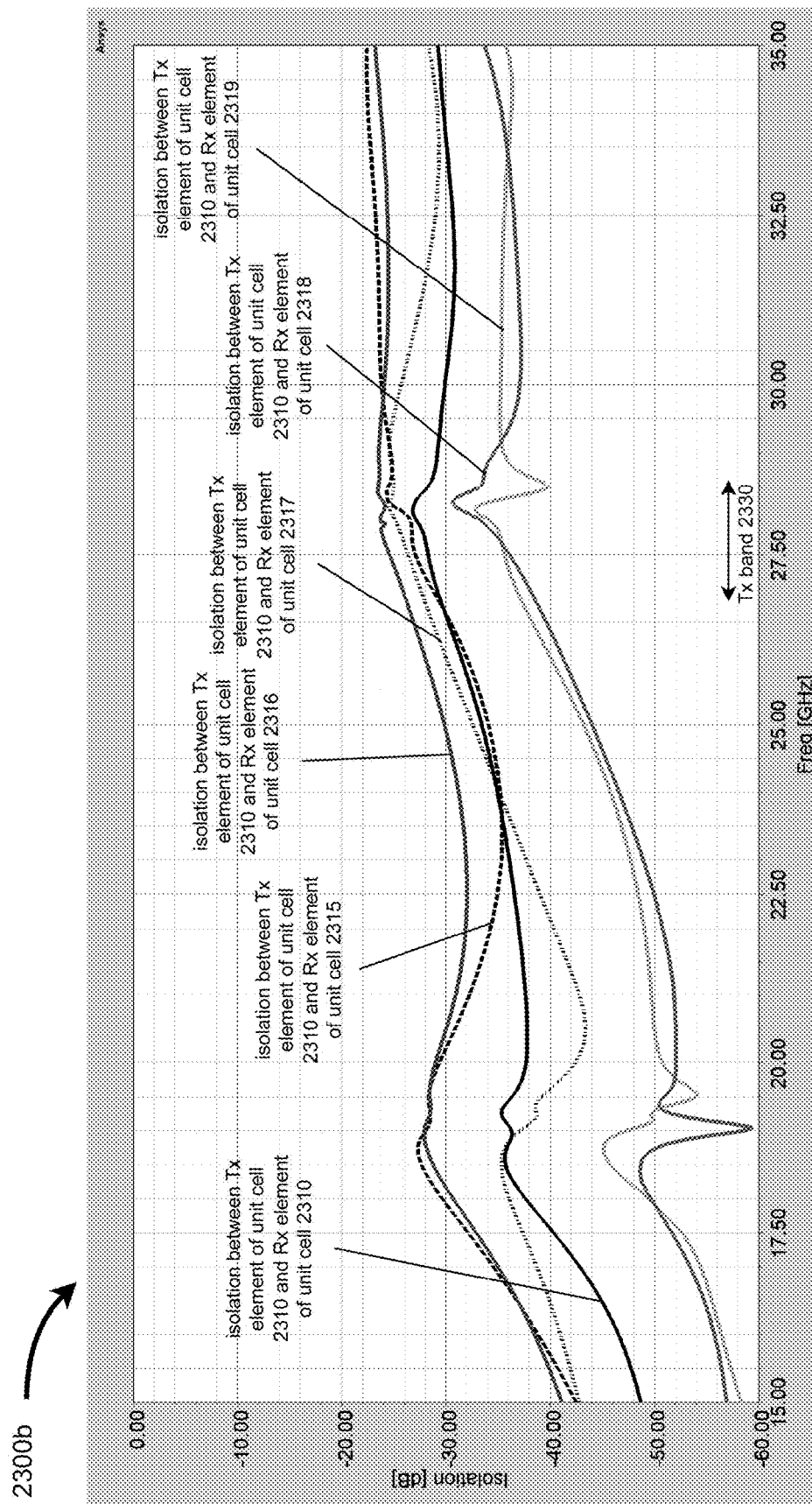
FIG. 23B is a graph illustrating the S-parameters of a full-duplex antenna element, according to some embodiments.

FIG. 23B is a graph that illustrates the isolation between a Tx antenna element port of a unit cell 2310 and neigboring Rx antenna elements of neighboring unit cells, according to some embodiments. As used herein, a repeating full-duplex antenna element may also be referred to as a unit cell. Graph 2300b show the isolation level between Tx element of unit cell 2310 and the Rx antenna element of unit cells 2315, 2316, 2317, 2318, and 2319. Those unit cells are chosen due to the smaller proximity of their Rx antenna element with that of the Tx antenna element of 2310 and it is assumed that the isolation between the Tx antenna element 2310 with the Rx elements of those unit cells that are further away would yield a better isolation. In addition, the isolation of the Tx element with the Rx element of unit cell 2310 itself is shown on graph 2300b. It is noteworthy that the graph of 2300b assumes that there are an infinite amount of unit cells, which is a well-accepted practice in the antenna array discipline when there are a large number of unit cells, such as tens of unit cells, hundreds, and even more. As shown, graph 2300*b* illustrates that the isolation levels of the Tx antenna element of the unit cell 2310 and five Rx antenna elements of neighboring unit cells in the Tx band 2330 are comparable to the isolation level of a Tx antenna element and an Rx antenna element of the same unit cell, such as the simulated isolation between Tx antenna element and Rx antenna element 2235 in FIG. 22.

In some embodiments, a repeating antenna structure is referred to as a full duplex antenna element.

Figure 24:
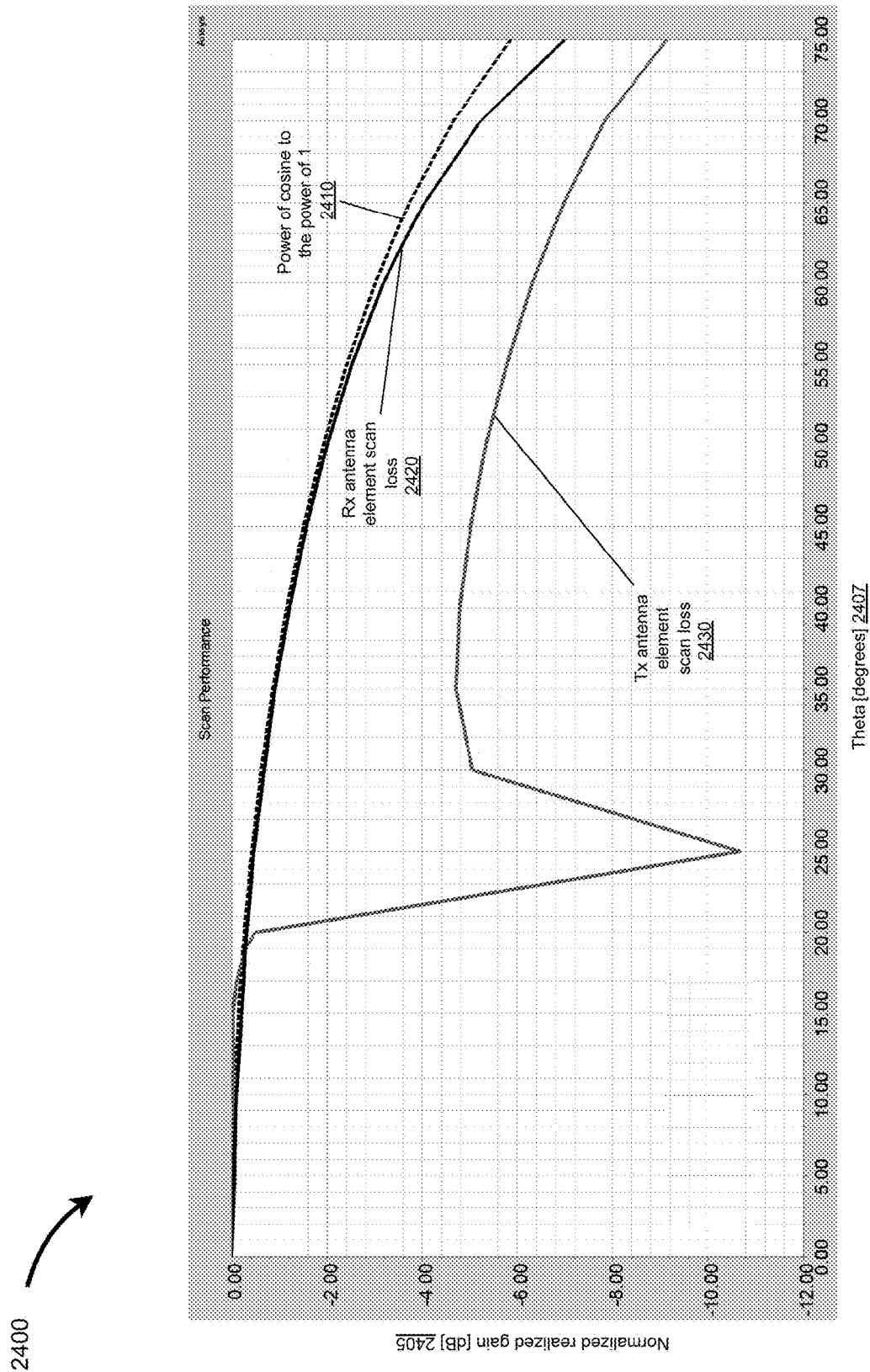
FIG. 24 is a graph illustrating the scan performance of a full-duplex antenna element, according to some embodiments.

FIG. 24 is a graph that illustrates the scan performance (or scan loss) for the repeating full-duplex antenna element 2300*a* (FIG. 23-A). 2400 is a graph of normalized realized gain 2405 vs. Theta 2407, representing a single repeating full-duplex antenna element gain normalized to a maximum gain value vs. theta. As used herein, the scan loss is the normalized realized gain of a full-duplex antenna element. Trace 2410 represents a power of cosine to the power of 1; an ideal case of scan loss. Trace 2420 represents the scan loss of the Rx antenna element. Trace 2430 represents the scan loss of the Tx antenna element. Graph 2400 takes into account the effect of all neighboring repeating full-duplex antenna elements. Due to this, the scan loss of the full-duplex single panel user terminal is the same as the scan loss of the full-duplex antenna element.

Figures 25A, 25B:
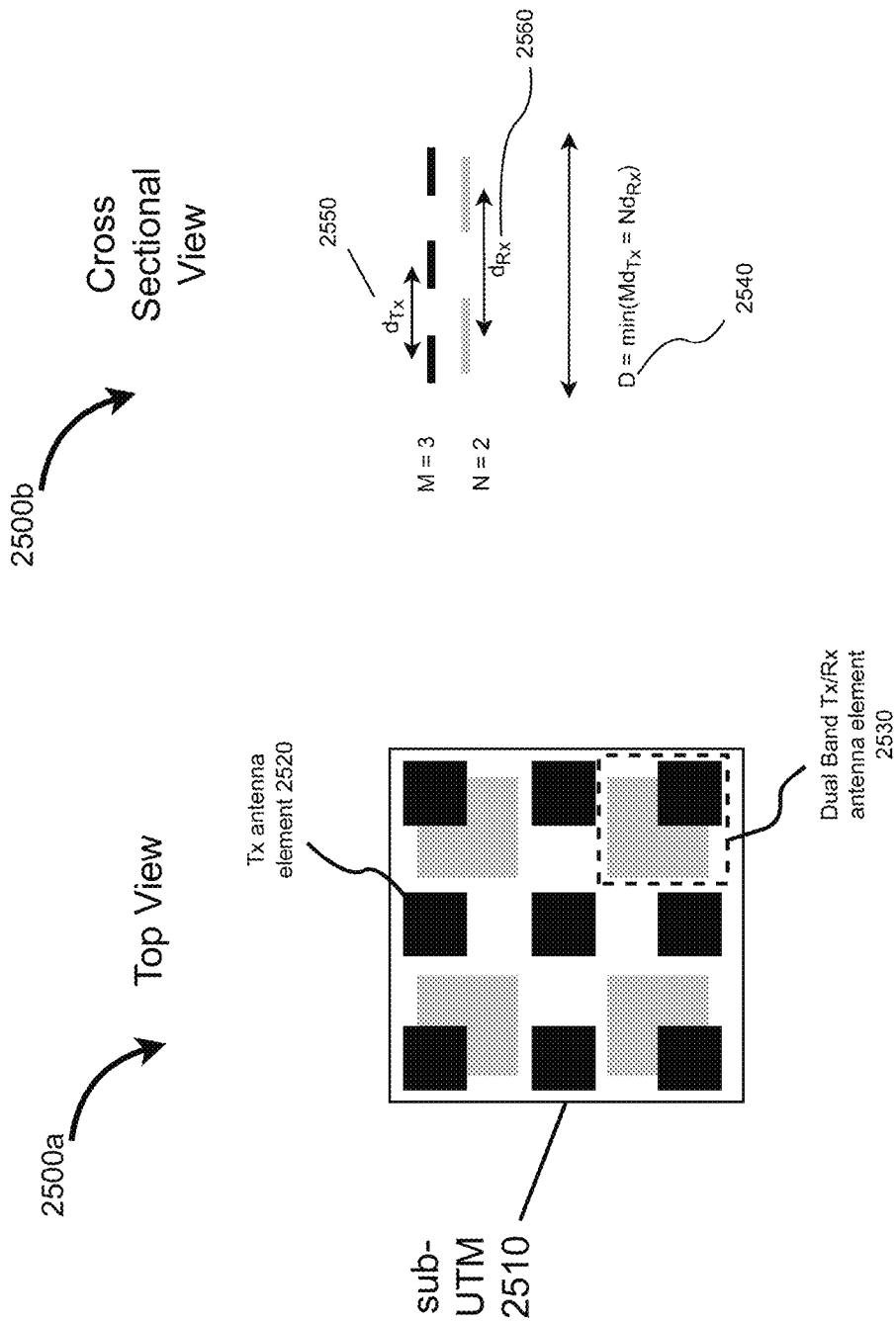
FIG. 25A illustrates a top view of a sub-User Terminal Module (UTM), according to some embodiments.
FIG. 25B illustrates a cross-sectional view of a sub-UTM, according to some embodiments.

FIG. 25A depicts atop view of a sub-UTM and FIG. 25B depicts a cross-sectional view of a sub-UTM, according to some embodiments. As referred to herein, a sub-UTM is the smallest physically manufacturable PCB; or the smallest building block that is used to create a larger UTP. As shown, a sub-UTM 2510 consists of two types of antenna elements: a Tx antenna element 2520 and a dual-band Tx/Rx antenna element 2530. Furthermore, as used herein, there is no standalone Rx antenna element and the functionality of the Rx antenna element is a part of the dual-band Tx/Rx antenna element.

2500*b* shows the Tx antenna element to Tx antenna element separation $d_{Tx}$ 2550 is different from the Rx antenna element to antenna element separation dxx 2560, as discussed previously in FIGS. 11A and 11B. This different spacing in $d_{Tx}$ and $d_{Rx}$ may provide optimum scan performance for two different frequencies and may result in similar scan performance for the Tx and Rx frequency bands as opposed to difference scan performance for the Tx and Rx frequencies as shown in FIG. 24.

The side dimension of a square sub-UTM is given by equation 5 above.

Figure 26:
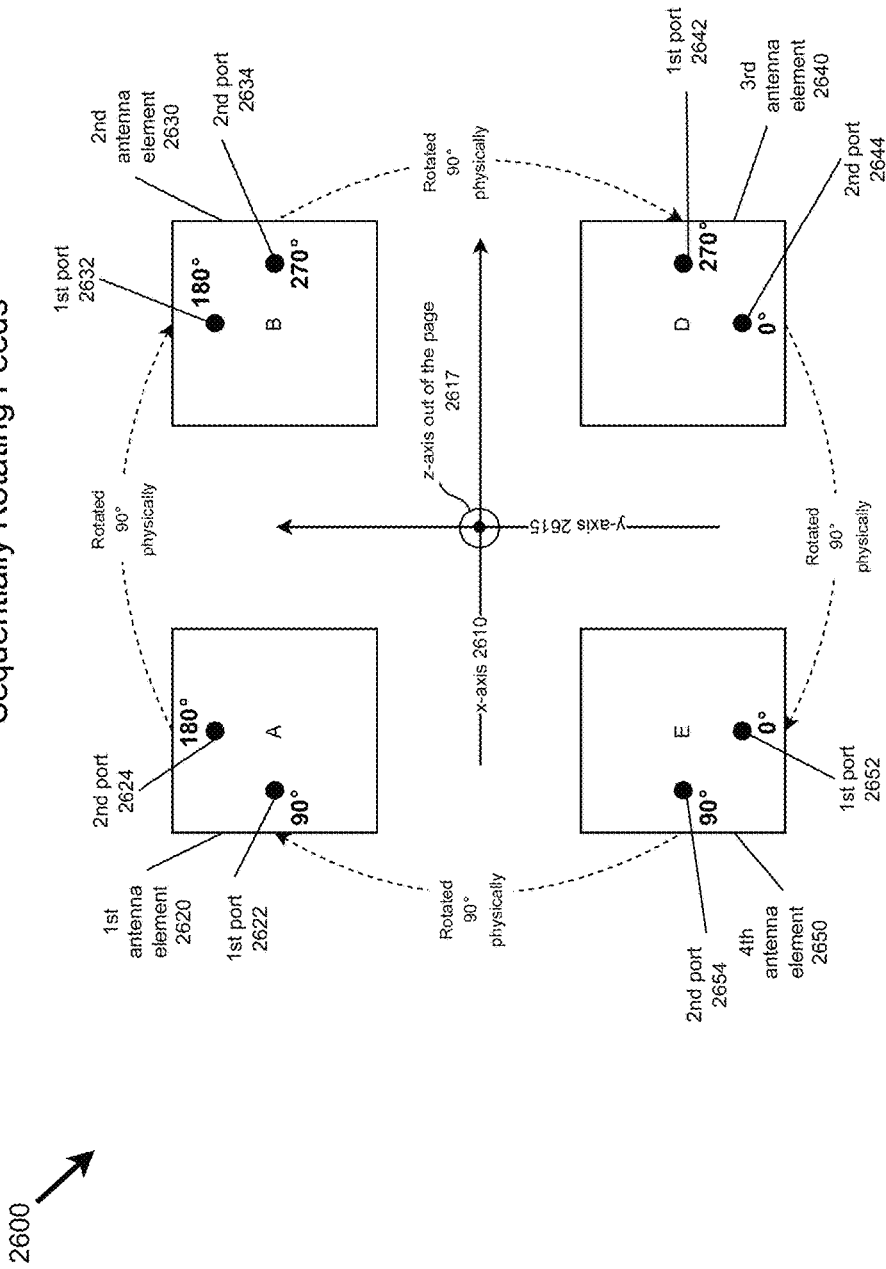
FIG. 26 illustrates the use of sequentially rotating (SQR) ports in an antenna array, according to some embodiments.

FIG. 26 illustrates a method of Sequentially Rotating Feeds (SQR), according to some embodiments. The method consists of rotating a 1st antenna element 2620 by 90 degrees with respect to a z-axis 2617 to create a 2nd antenna element 2630. Furthermore, a 1st port 2622 of the 1st antenna element 2620 is rotated 90 degrees, with respect to the z-axis, and a 90 degrees phase addition is applied to it. For example, 1st port 2622 originally had 90 degrees applied to it, and after rotating it by 90 degrees with respect to the z-axis, a 180 degrees phase is applied to it. In a similar way, a 2nd port 2624 of the 1st antenna element is rotated by 90 degrees physically to a 2nd port 2634 of the 2nd antenna element 2630, with respect to the z-axis, and a 90 degrees phase addition is applied to it. The 2nd antenna element 2630 may also be seen as mirrored 1st antenna element 2620 with respect to the y-axis 2615. In a similar way, the 2nd antenna element rotates physically by 90 degrees, with respect to a z-axis 2617, creating a 3rd antenna element 2640. The 3rd antenna element 2640 may also be seen as a mirrored 2nd antenna element 2630 with respect to the x-axis 2610. This SQR method is completed after a 4th antenna element and its ports are created, by rotating a 3rd antenna element and its ports by 90 degrees with respect to the z-axis. The principle of SQR hence requires both physically rotating the feeds of the antenna element by 90 degrees and changing the applied phase to each antenna port via the RFIC. Implementing an SQR configuration achieves an improvement of an axial ratio (AR) bandwidth (BW) for each element. The AR is an important antenna parameter especially in circularly polarized antennas and maintaining an AR<3 dB is an important metric to achieve.

Figure 27:
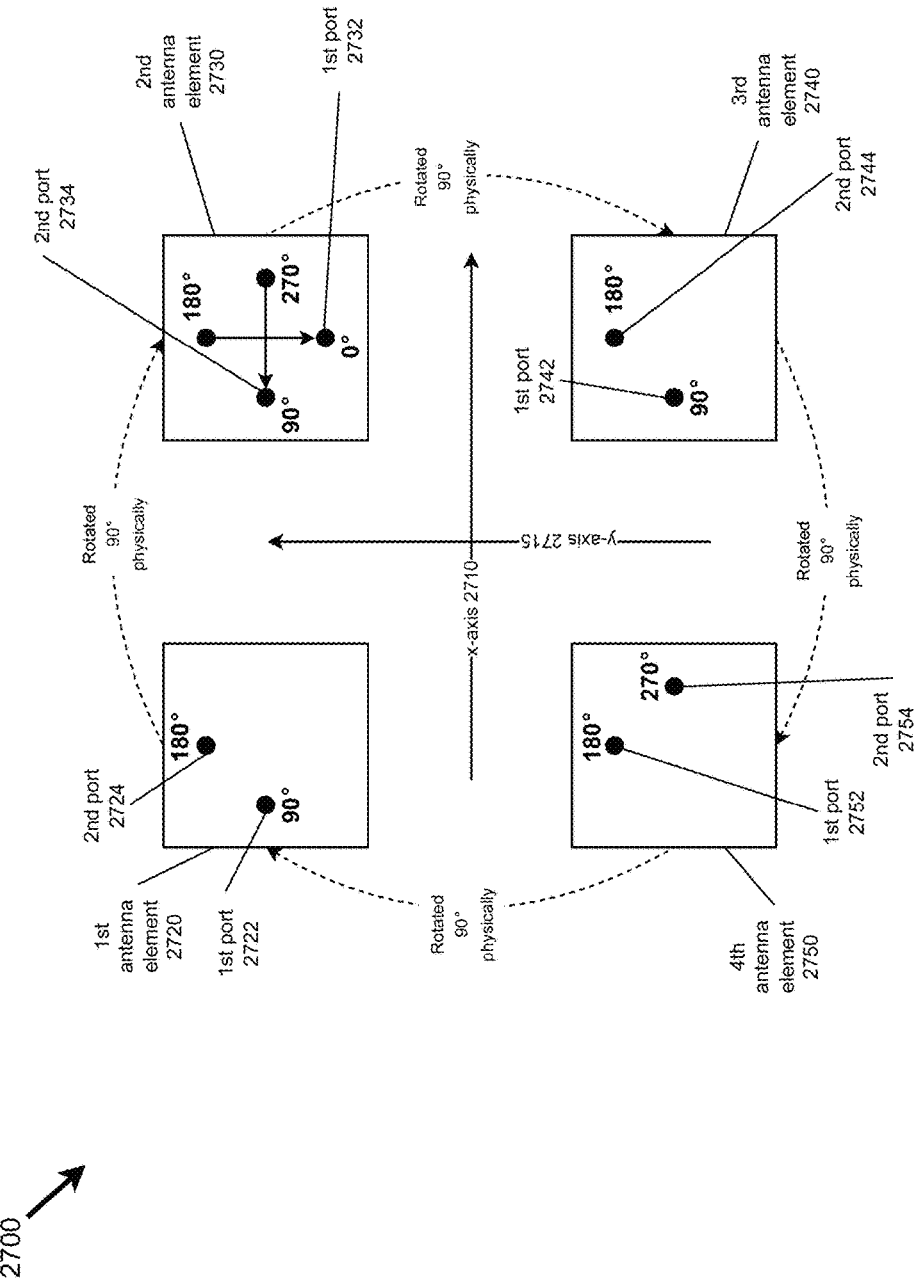
FIG. 27 illustrates the use of orthogonal ports and SQR in an antenna array, according to some embodiments.

FIG. 27 illustrates an alternate SQR method. As shown in 2700, a 90 degrees physical clockwise rotation of a 1st antenna element 2720 is applied to create a 2nd antenna element 2730, in such a way that the 1st port 2722 of the first antenna element 2720 is rotated a 90 degrees clockwise, and an additional 180 degrees physical clockwise rotation, resulting in a 2nd port location 2734 of the 2nd antenna element 2730. Furthermore, a 180 degrees additional phase is applied in addition to the original 90 degrees phase addition described in 2600, resulting in a total additional phase of 270 degrees to each port.

Both SQR 2600 and alternate SQR 2700 are effective ways to enhance AR BW.

Figures 28A, 28B:
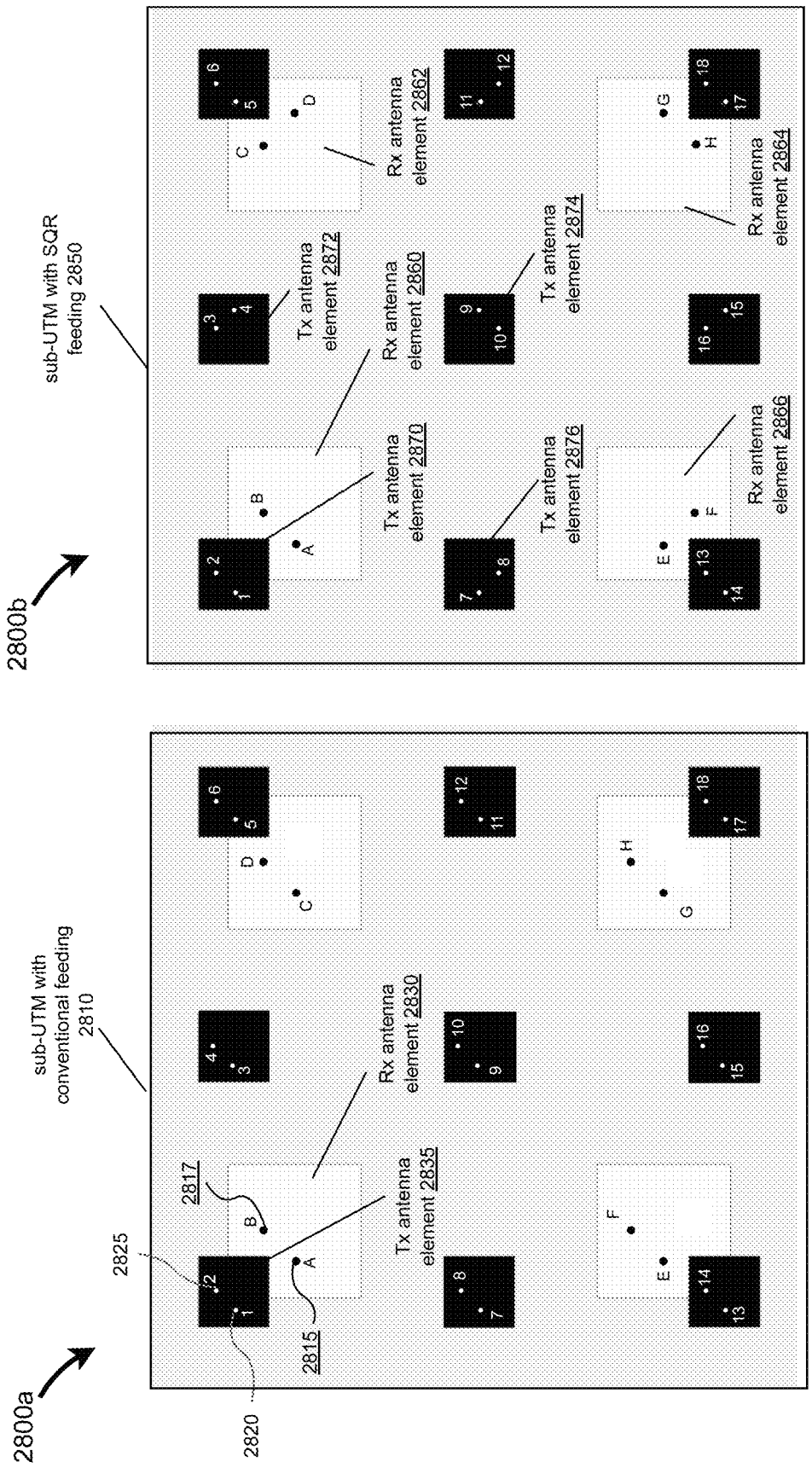
FIG. 28A illustrates a sub-UTM with conventional port placement, according to some embodiments.
FIG. 28B illustrates a sub-UTM with SQR port placement, according to some embodiments.

FIG. 28A depicts a sub-UTM using conventional feeding 2810. As shown, all Rx antenna elements of the sub-UTM 2810 use a similar orientation of ports such as port A 2815, and port B 2817 of Rx antenna element 2830. In a similar way, all Tx antenna elements of the sub-UTM 2810 use a similar port orientation as ports 1 2820 and port 2 2825 of Tx antenna element 2835.

FIG. 28B depicts a sub-UTM with SQR feeding 2850. As shown, ports 3 and port 4 of Tx antenna element 2872 employ an SQR feeding method and are hence rotated 90 degrees clockwise when compared with port 1 and port 2 of Tx antenna element 2870, respectively. Furthermore, Tx antenna element 2874 is rotated 90 degrees clockwise with respect to Tx antenna element 2872 and Tx antenna element 2876 is rotated 90 degrees clockwise with respect to Tx antenna element 2874. A similar SQR feeding method is applied to the Rx antenna elements of sub-UTM 2850.

Figure 29:
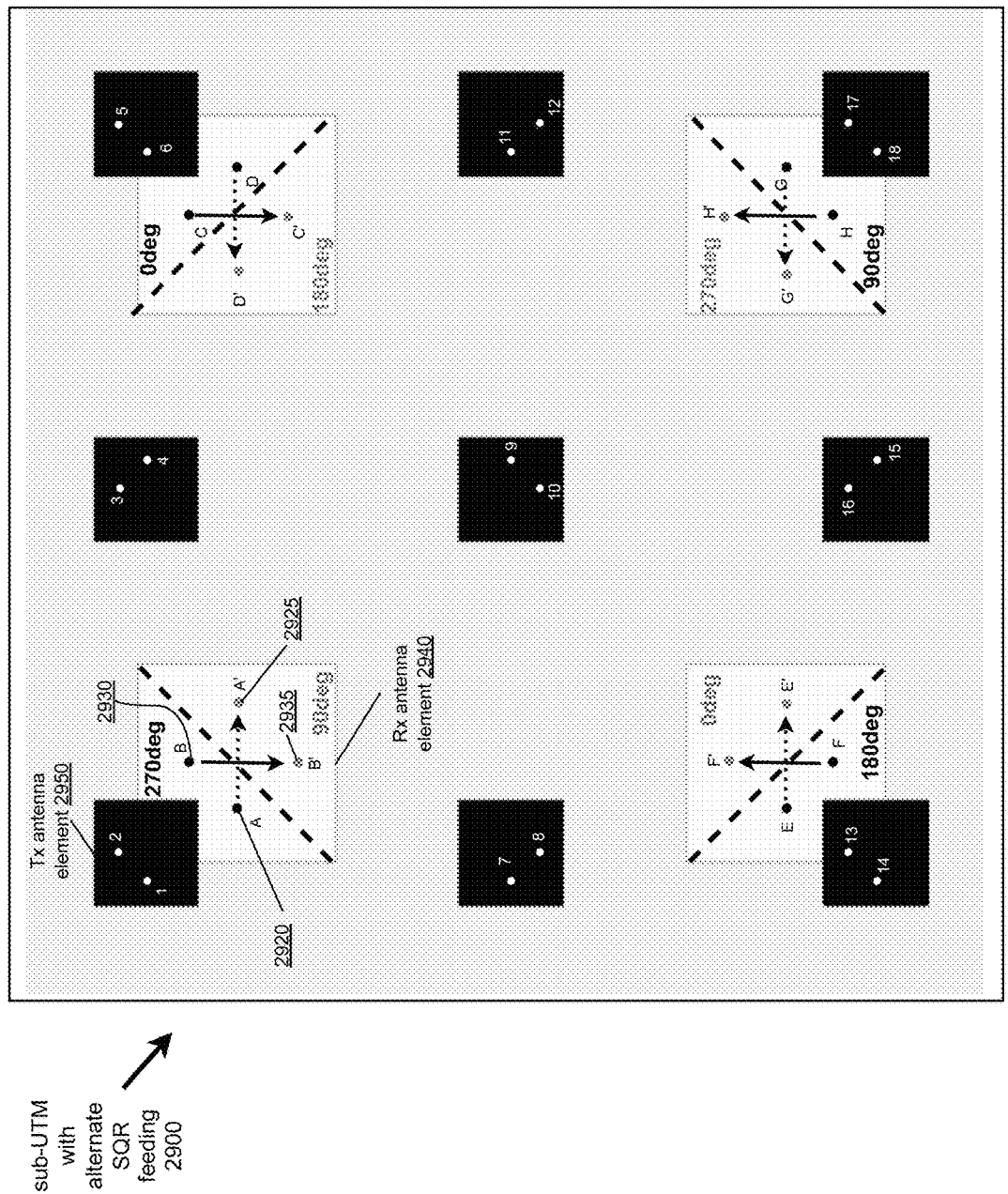
FIG. 29 illustrates the use of orthogonal ports in a sub-UTM, according to some embodiments.

FIG. 29 depicts a sub-UTM with alternate SQR feeding 2900, according to some embodiments. As used herein, SQR method is applied to the Rx antenna elements and Tx antenna elements. In this example, the additional 180 degrees rotation that is applied to the ports is only used on the Rx antenna ports: port A 2920 of Rx antenna element 2940 is rotated 180 degrees to location A' 2925 and port B 2930 of Rx antenna elements 2940 is rotated by 180 degrees to location B' 2935.

Figure 30:
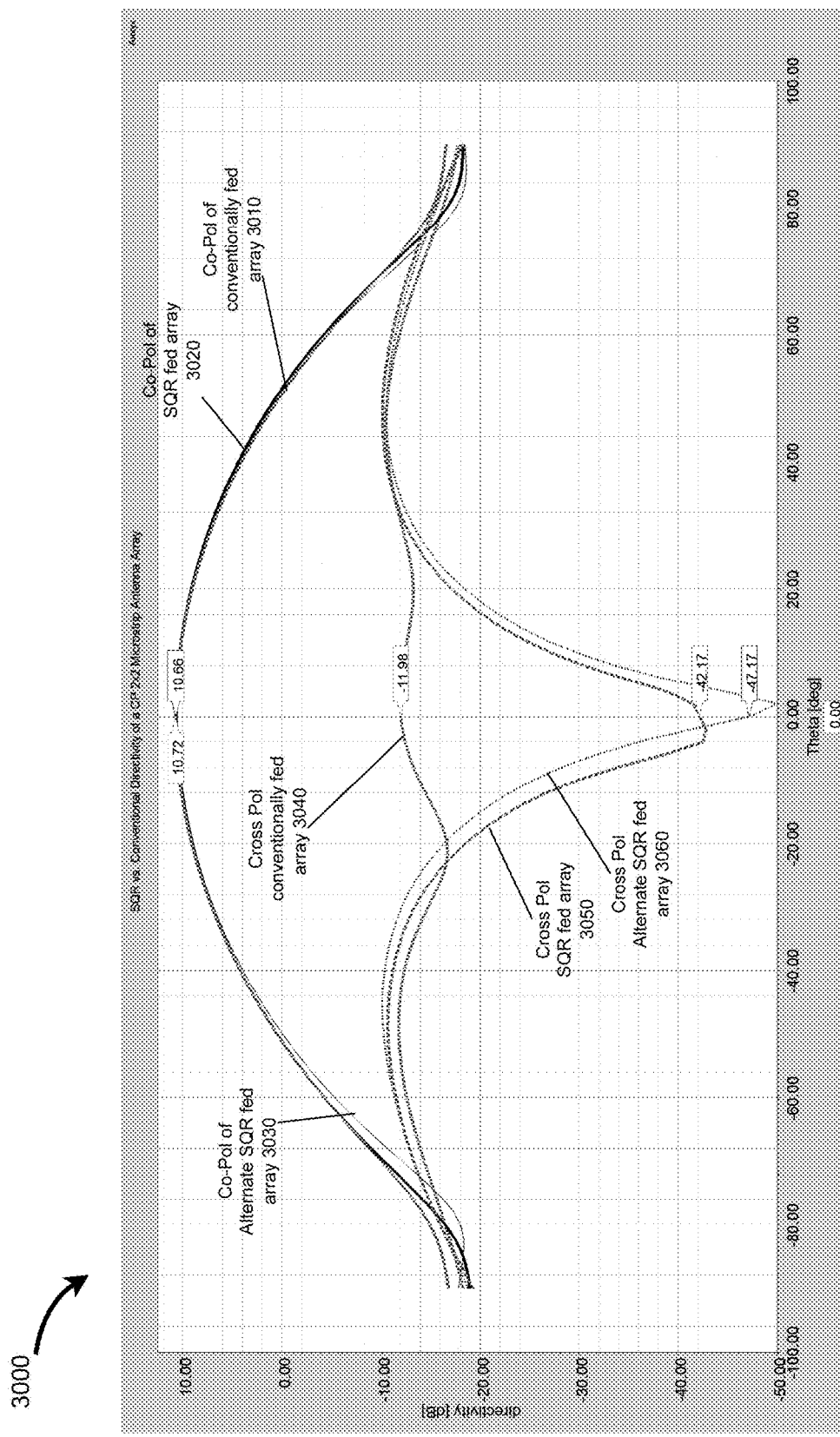
FIG. 30 is a graph illustrating a directivity of an example 2×2 array when configured in an SQR vs. conventional port arrangement, according to some embodiments.

FIG. 30 is a graph illustrating an example SQR directivity. In this example three configurations are compared against each other for a 2×2 microstrip antenna array resembling a configuration similar to that shown in FIG. 26 for an SQR feeding and FIG. 27 for an alternate SQR feeding. For each configuration, the co-pol and the cross-pol directivity are plotted. As shown, the co-pot of the conventionally fed array 3010, the co-pol of the SQR fed array 3020, and the co-pol of the alternate SQR fed array 3030 are comparable to each other, varying less than 0.2 dB in the broadside direction (theta=0 degrees). The cross-pol of the conventionally fed array 3040 is shown to be significantly higher (more than 30 dB) than the cross-pol of the SQR fed array 3050 and the cross-pol of the alternate SQR fed array 3060. The cross-pol is an antenna metric that is kept low with most antenna system specifications calling for a value lower than −20 dB.

Figure 31:
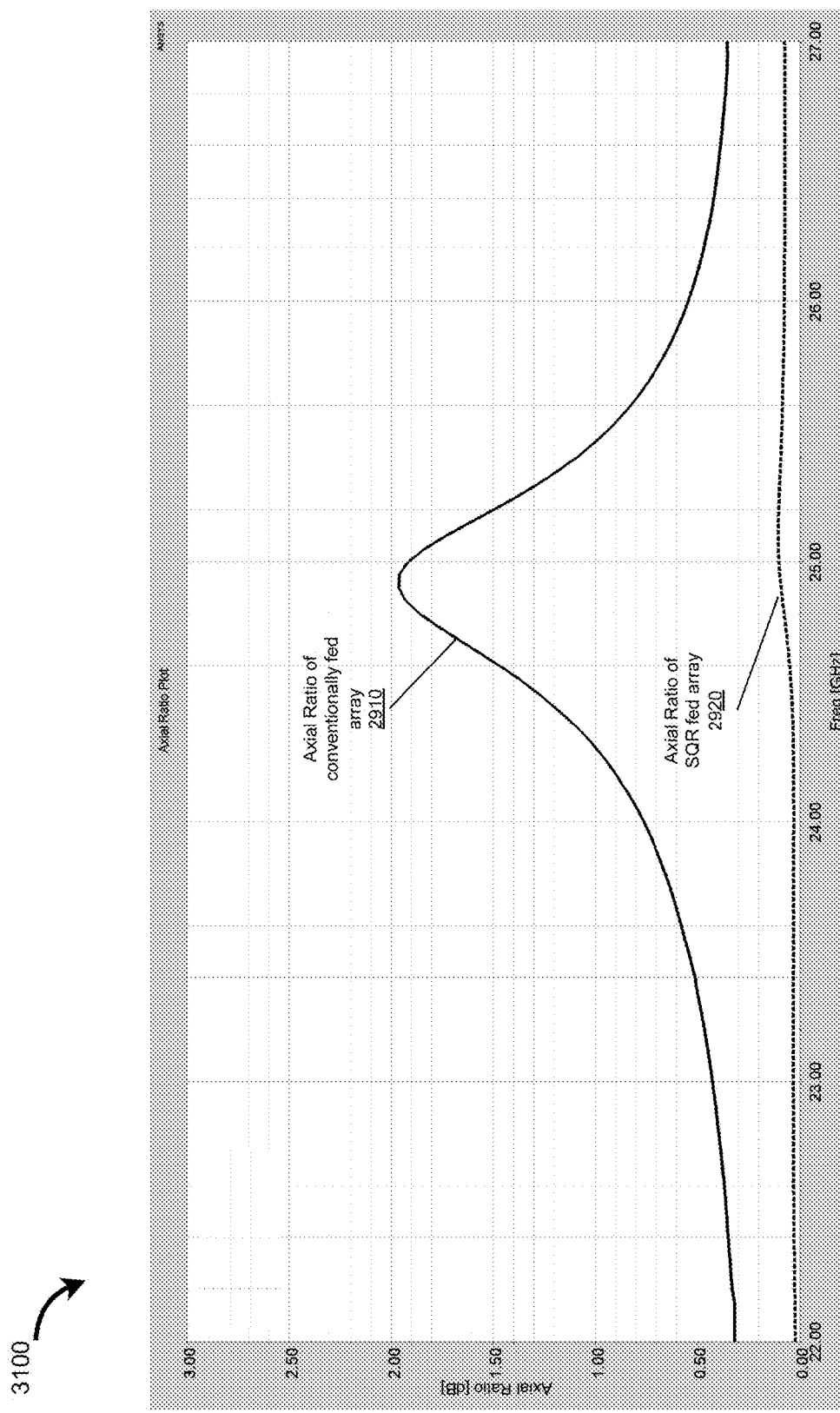
FIG. 31 is a graph illustrating axial ratio of an example 2×2 array when configured in an SQR vs. conventional port arrangement, according to some embodiments.

FIG. 31 is a graph illustrating the broadside AR of the 2×2 SQR Microstrip Antenna Array for the conventionally fed array 2910 and the SQR fed array 2920. As shown, the AR of the SQR fed array is lower in value compared with the conventionally fed array. In addition the AR of the SQR fed array exhibits more flatness when compared with the AR of the conventionally fed array.

Figure 32:
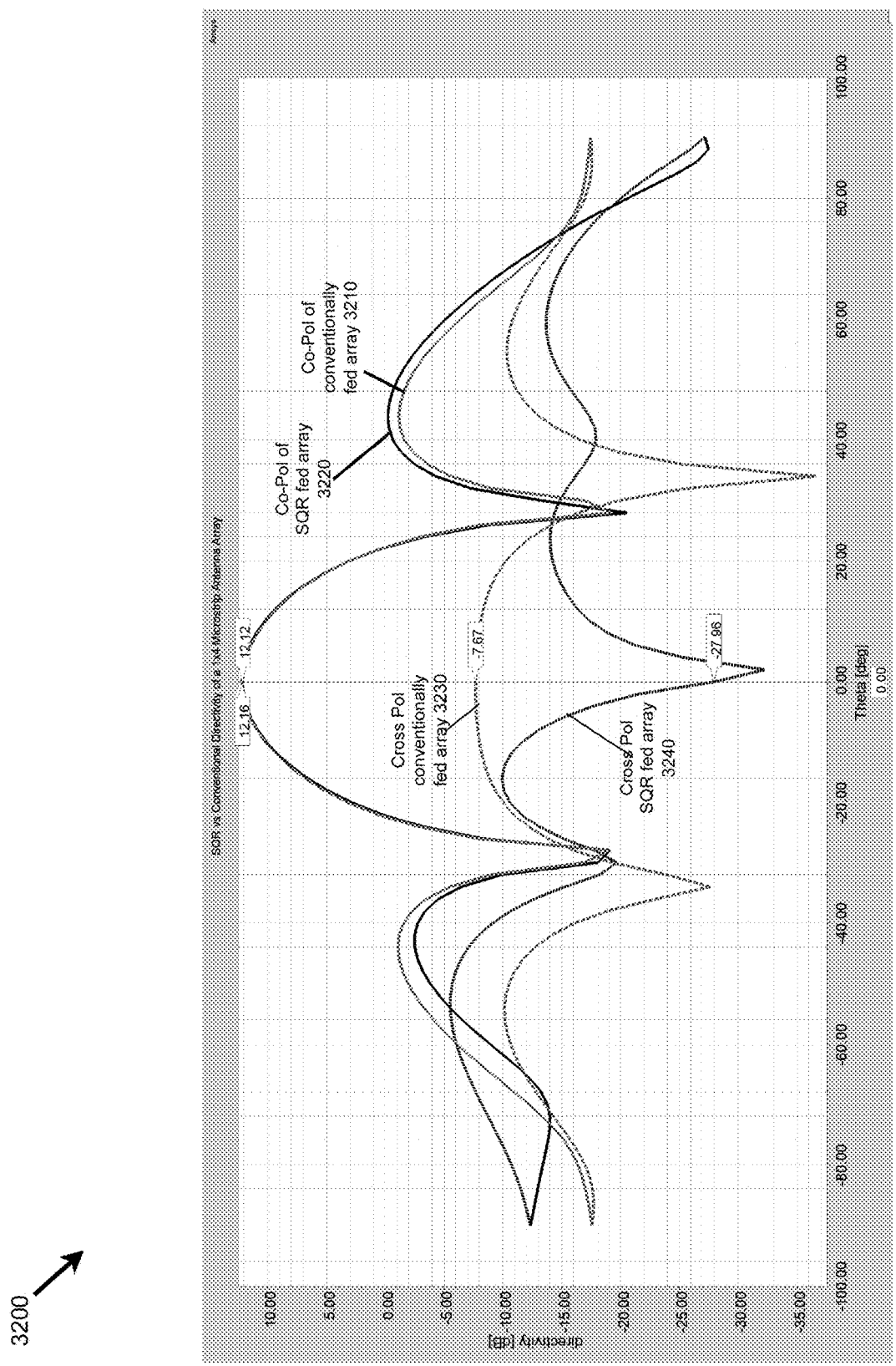
FIG. 32 is a graph illustrating a directivity of an example 1×4 array when configured in an SQR vs. conventional port arrangement, according to some embodiments.

FIG. 32 is a graph illustrating another example of SQR directivity. In this example two configurations are compared against each other for a 1×4 microstrip antenna array. For each configuration, the co-pol and the Cross-pol directivity are plotted. As shown, the co-pol of the conventionally fed array 3210 and the co-pol of the SQR fed array 3220 are comparable to each other, varying less than 0.1 dB in the broadside direction (theta=0 degrees). The cross-pol of the conventionally fed array 3230 is shown to be significantly higher (more than 30 dB) than the cross-pol of the SQR fed array 3240.

Figure 33:
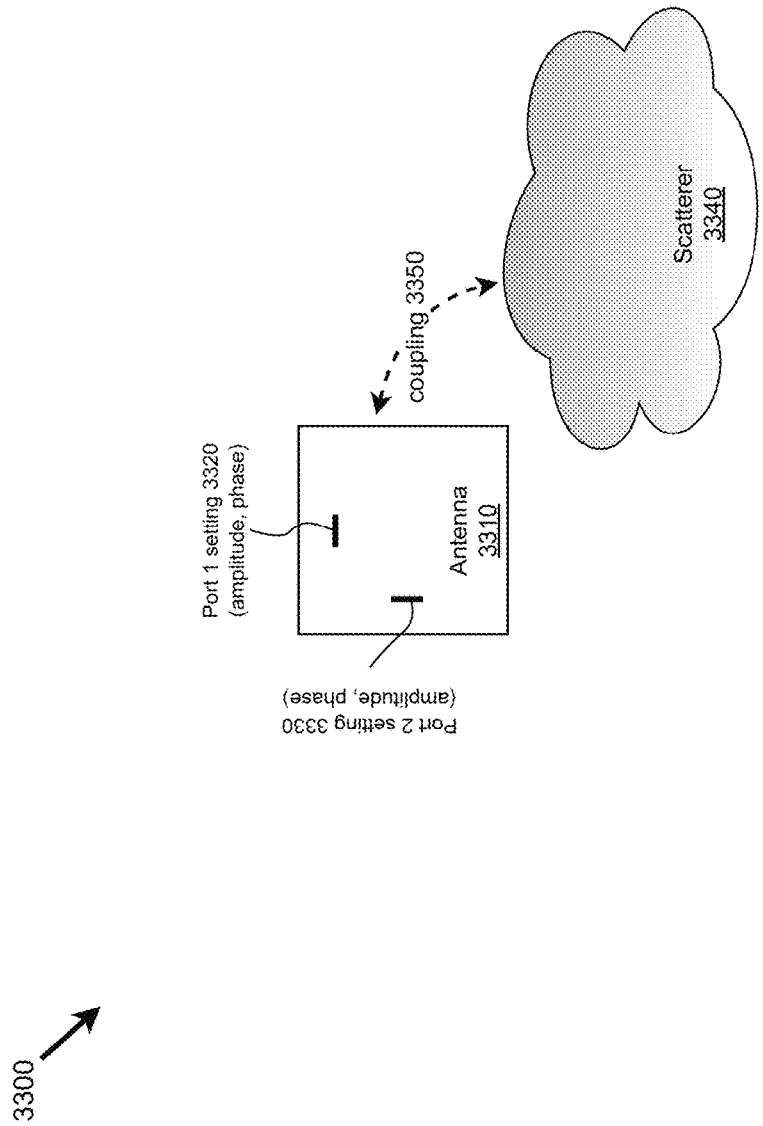
FIG. 33 illustrates an antenna element in the presence of a scatterer, according to some embodiments.

FIG. 33 illustrates an antenna 3310 with Port 1 settings 3320 of amplitude and phase and Port 2 settings 3330 of amplitude and phase. Also shown is a scatterer 3340. A scatterer is considered to be any other object in the vicinity of the antenna 3310, including another antenna. A coupling 3350 exists between the antenna 3310 and the scatterer 3340. This coupling 3350 depends on several factors like the size of the scatterer, the distance between the antenna 3310 and the scatterer 3340 and the material of the scatterer. The coupling 3350 may affect Port 1 setting 3310 and Port 2 setting 3330 and ultimately change the polarization of a radiated wave of antenna 3310 and the cross-pot level of antenna 3310.

orthogonal to each other, creating an additional polarization discrimination between the individual Tx and Rx antenna elements of the dual-band Tx/Rx antenna element.

Figure 36:
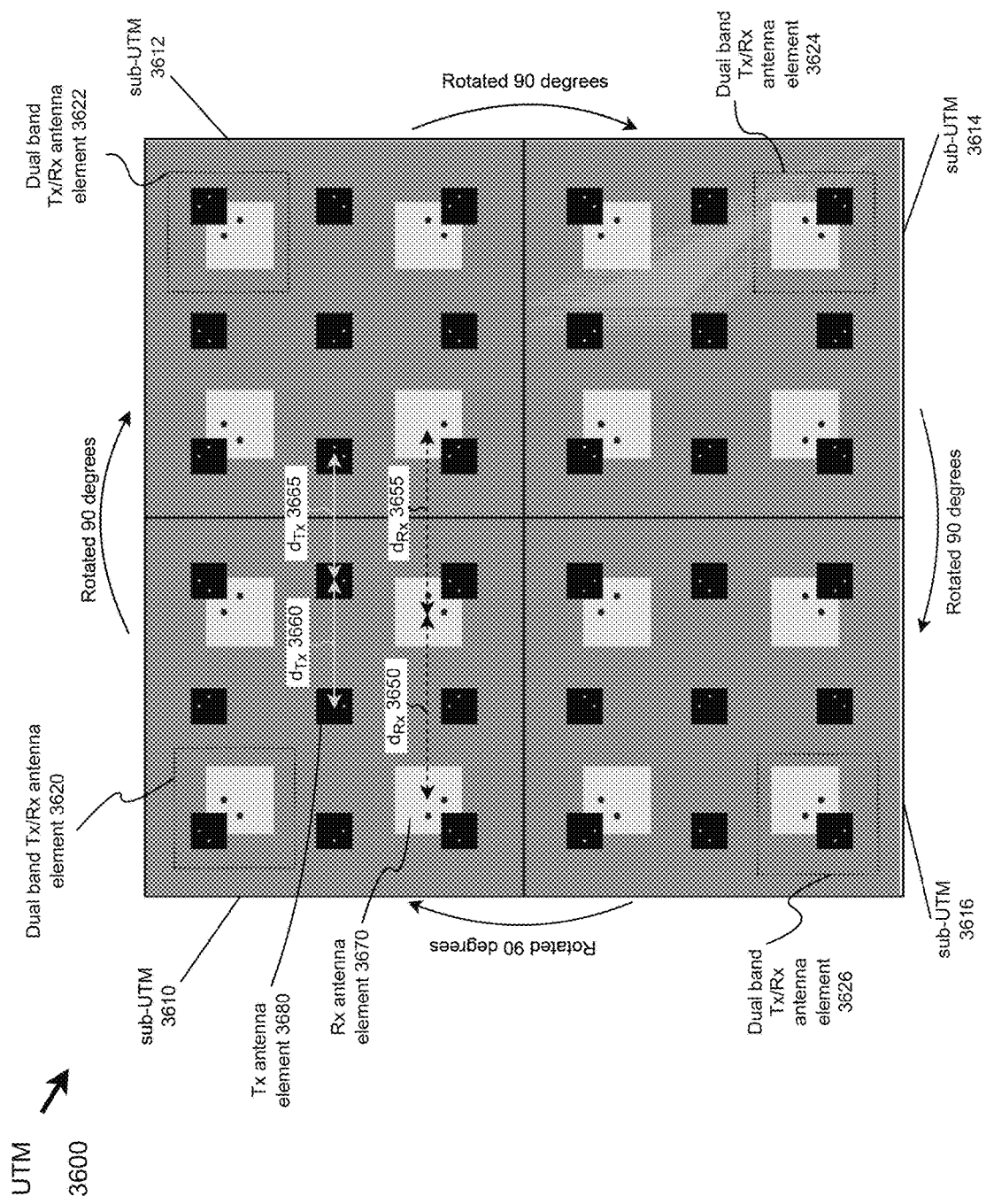
FIG. 36 depicts a user terminal module, according to some embodiments.

FIG. 36 depicts a UTM 3600 comprised of four sub-UTMs utilizing SQR method, according to some embodiments. As shown, dual band Tx/Rx antenna element 3622 of sub-UTM 3612 is formed by physically rotating dual band Tx/Rx antenna element 3620 of sub-UTM 3610 by 90 degrees clockwise. Dual band Tx/Rx antenna element 3624 of sub-UTM 3614 is formed by physically rotating dual band Tx/Rx antenna element 3622 of sub-UTM 3612 by 90 degrees clockwise. Furthermore, dual band Tx/Rx antenna element 3626 of sub-UTM 3616 is formed by physically rotating dual band Tx/Rx antenna element 3624 of sub-UTM 3614 by 90 degrees clockwise. Combined, sub-UTM 3610, sub-UTM 3612, sub-UTM 3614, sub-UTM 3616 form a single UTM. As used herein, a sub-UTM is the smallest form of a PCB used as a building block for realizing a UTM.

As shown herein, the center to center spacing $d_{Rx}$ 3650 is equal to da 3655 of any 2 neighboring Rx antenna elements. Similarly $d_{Tx}$ 3660 is equal to dix 3665 of any two neighboring Tx antenna elements; wherein $d_{Tx}$ is different than $d_{Rx}$, allowing for independent beam scanning in the Tx frequency and Rx frequency simultaneously.

Figure 37:
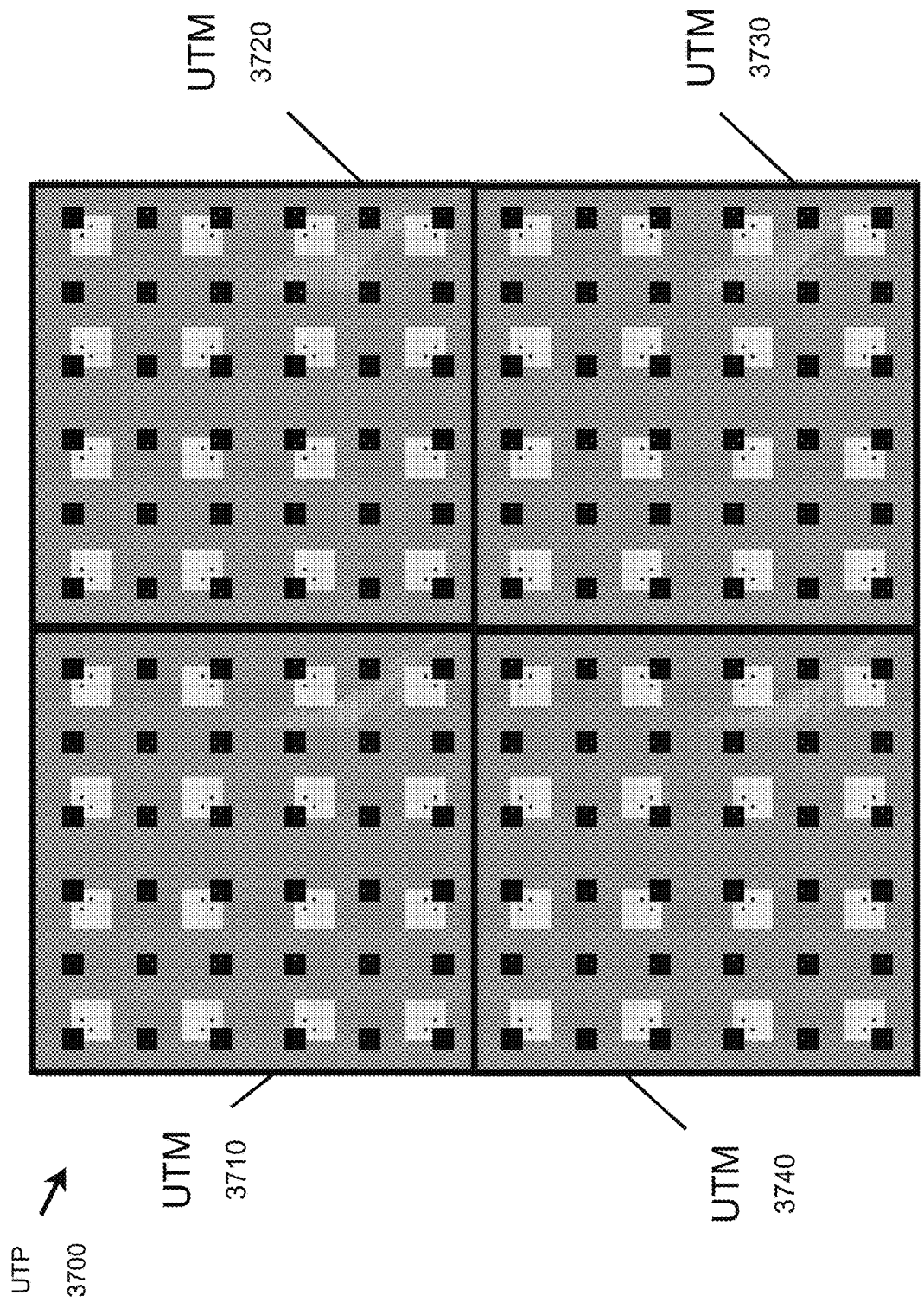
FIG. 37 depicts an example antenna lattice configuration of a full-duplex single-panel user terminal panel (UTP), according to some embodiments.

FIG. 37 depicts a UTP 3700 comprised of UTM 3710, UTM 3720, UTM 3730, and UTM 3740. UTM 3710 may be duplicated horizontally and/or vertically to create a UTP of any size of n×n UTMs, where n is an integer, according to some embodiments.

Figure 38:
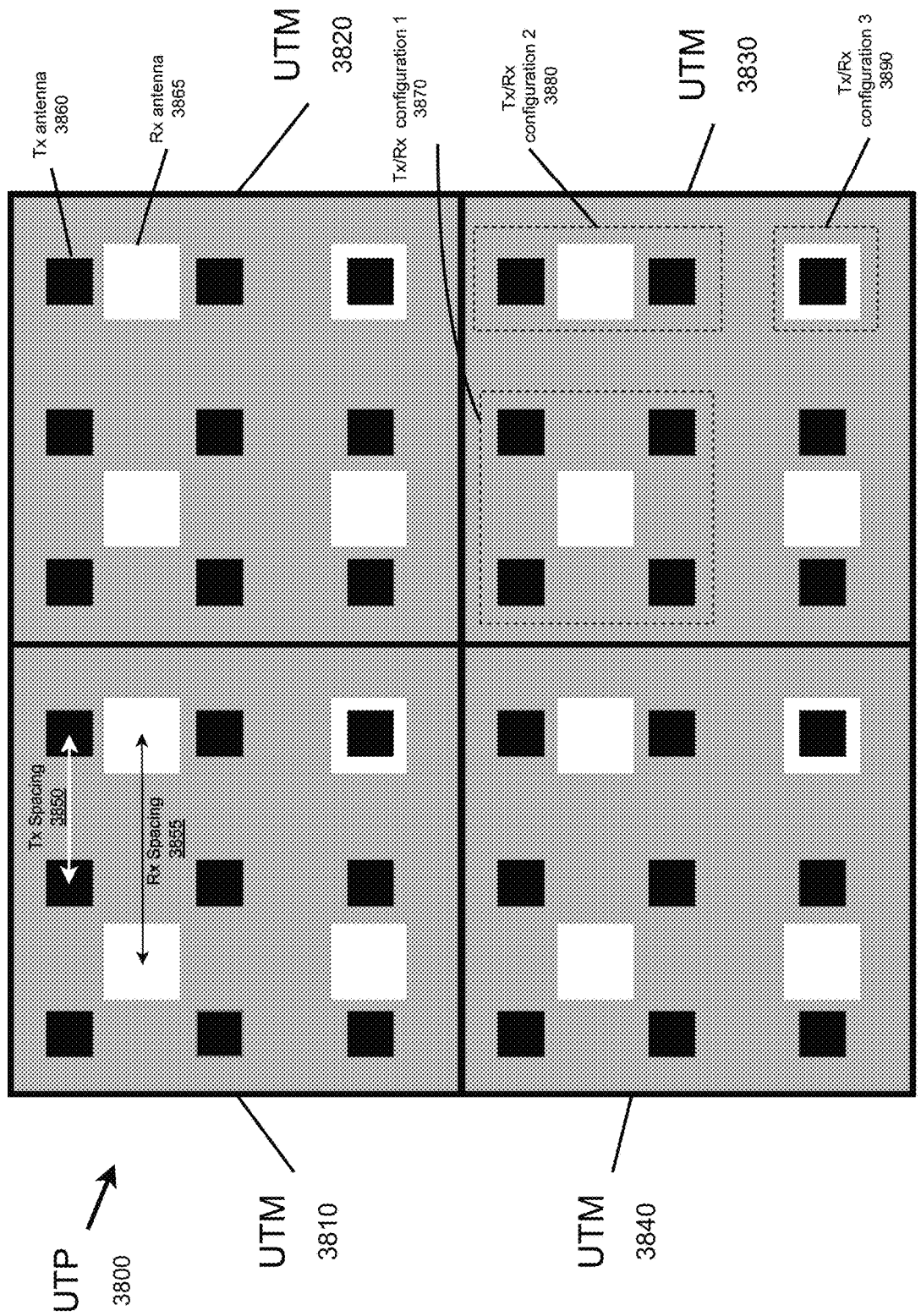
FIG. 38 depicts a top view of an alternate example antenna lattice configuration of a full-duplex single-panel user terminal panel (UTP), according to some embodiments.

FIG. 38 depicts atop view of UTP 3800 comprised of UTM 3810, UTM 3820, UTM 3830, and UTM 3840. Each

TABLE 2

Port excitation to Electric Field Propagation Reference Table

| Port Excitation | | | | Electric Field Propagation | | | |
|---|---|---|---|---|---|---|---|
| Port 1 amplitude | Port 1 phase | Port 2 amplitude | Port 2 phase | Normalized Ex amplitude | Normalized Ex phase | Normalized Ex amplitude | Normalized Ex phase |
| 1 | 0 | 0 | 0 | 1 | 0 | 0 | 0 |
| 1 | 90 | 0 | 0 | 1 | 90 | 0 | 0 |
| 0 | 0 | 1 | 0 | 0 | 0 | 1 | 0 |
| 0 | 0 | 1 | 90 | 0 | 0 | 1 | 90 |

Figure 34:
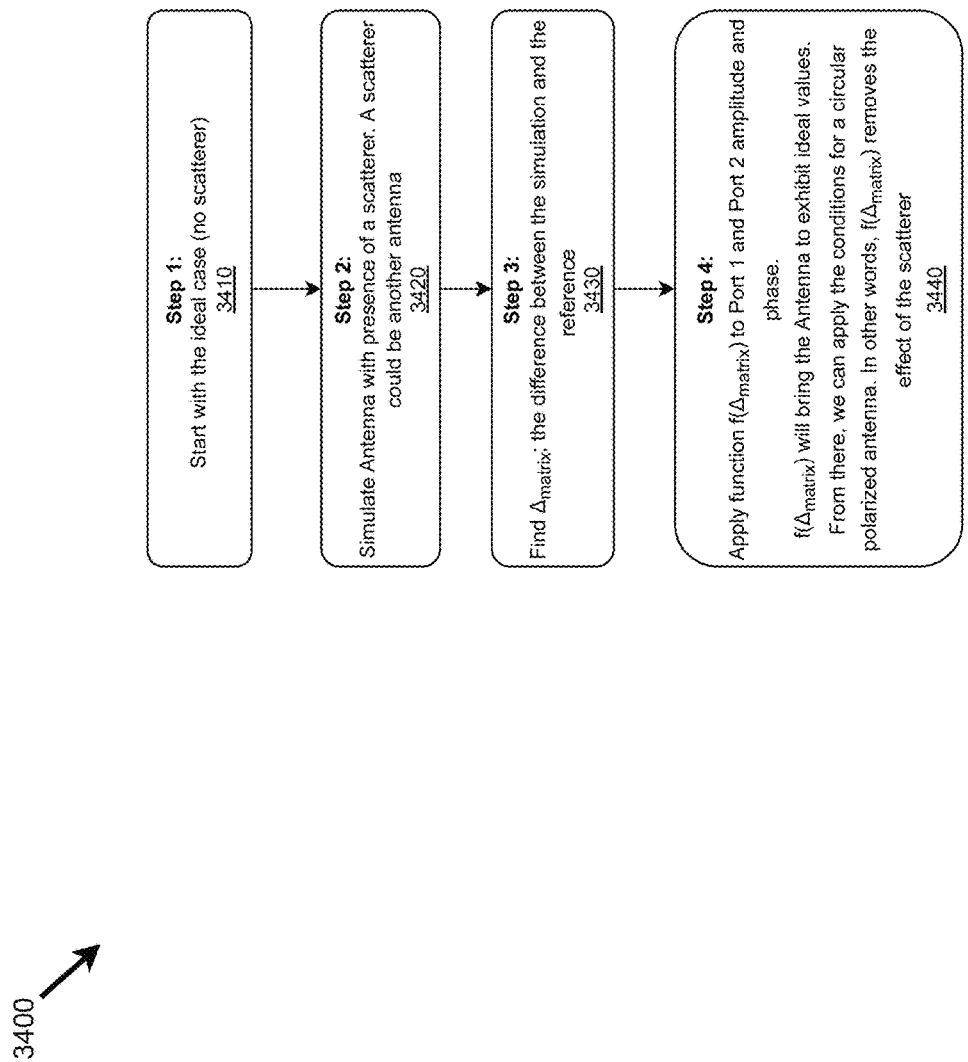
FIG. 34 illustrates a method of designing an antenna element in the presence of a scatterer, according to some embodiments.

FIG. 34 illustrates a method of removing an effect of a scatterer on the performance of an antenna, according to some embodiments. As shown, flow 3400 starts at 3410 with a reference table such as Table 2, which resembles an ideal case of port excitation to electric field propagation. Operation 3420 calls for simulating an antenna with presence of a scatterer which could be another antenna. Operation 3420 calls for calculating a $\Delta_{matrix}$ which is the difference between the simulation of the antenna and the reference table. Operation 3440 calls for applying a function $f(\Delta_{matrix})$ to Port 1 and Port 2 settings (amplitude and phase), which will bring the antenna to exhibit its ideal values: in other words, $f(\Delta_{matrix})$ will remove the effect of the scatterer. Furthermore, conditions for circular polarizations may be applied.

In other embodiments, operation 3420 may be performed in lab measurements.

Figure 35:
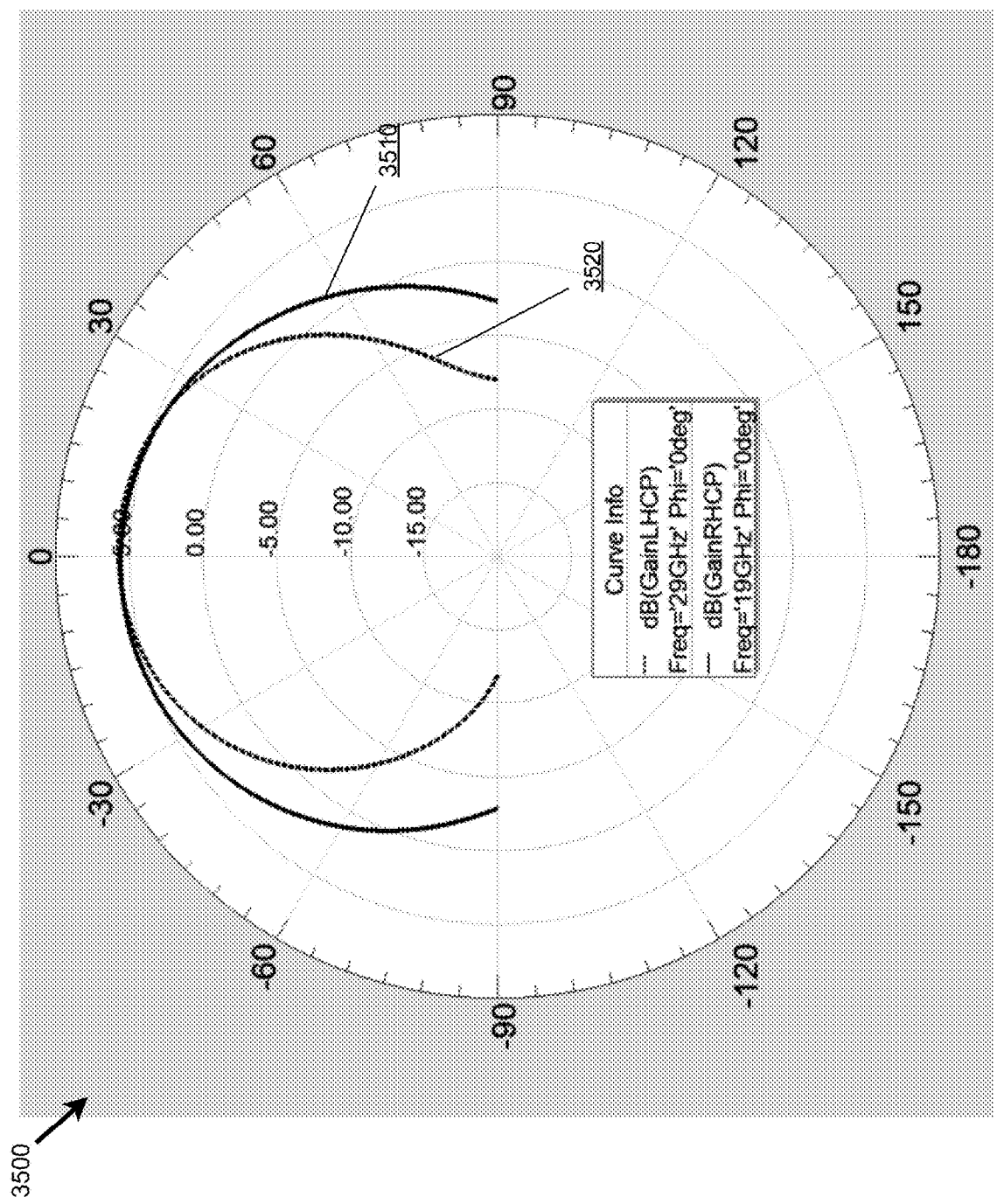
FIG. 35 is a graph of a radiation pattern of a full duplex antenna element, according to some embodiments.

FIG. 35 is a graph illustrating a gain pattern of a dual-band Tx/Rx antenna element 2530 (FIG. 25A). As shown, a Right Hand Circularly Polarized (RHCP) gain plot 3510 is shown at an Rx frequency of 19 GHz and a Left Hand Circularly Polarized (LHCP) gain plot 3520 is shown at a Tx frequency of 29 GHz. It is worth noting that the two gain plots are of the UTM 3810, UTM 3820, UTM 3830, and UTM 3840 are identical UTMs. UTM 3810 may be duplicated horizontally and/or vertically to create a UTP of any size of n×n UTMs, where n is an integer, according to some embodiments. Furthermore, each UTM consists of Tx/Rx configuration 1 3870, Tx/Rx configuration 2 3880, Tx/Rx configuration 3 3890. Similar to 3600, each of the UTM 3810, UTM 3820, UTM 3830, and UTM 38340 employ a center to center spacing Rx spacing 3855 that is identical for any 2 neighboring Rx antenna elements. Similarly a center to center spacing Tx spacing 3850 of any two neighboring Tx antenna elements is identical; wherein Rx spacing is different from Tx spacing, allowing for independent beam scanning in the Tx frequency and Rx frequency simultaneously.

Figure 39:
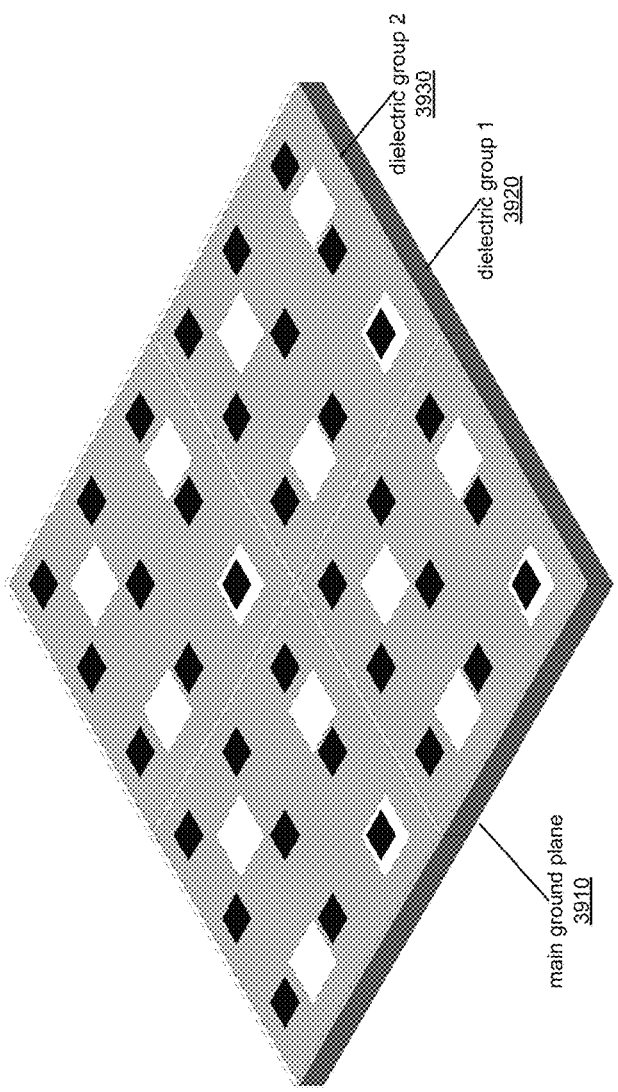
FIG. 39 depicts a perspective view of an alternate example antenna lattice configuration of a full-duplex single-panel user terminal panel (UTP), according to some embodiments.

FIG. 39 depicts a perspective view of UTP 3900. As shown, the UTP 3900 comprises a dielectric group 2 3930 disposed above dielectric group 1 3920. In addition, UTP 3900 comprises a main ground plane 3910, according to some embodiments.

Figure 40:
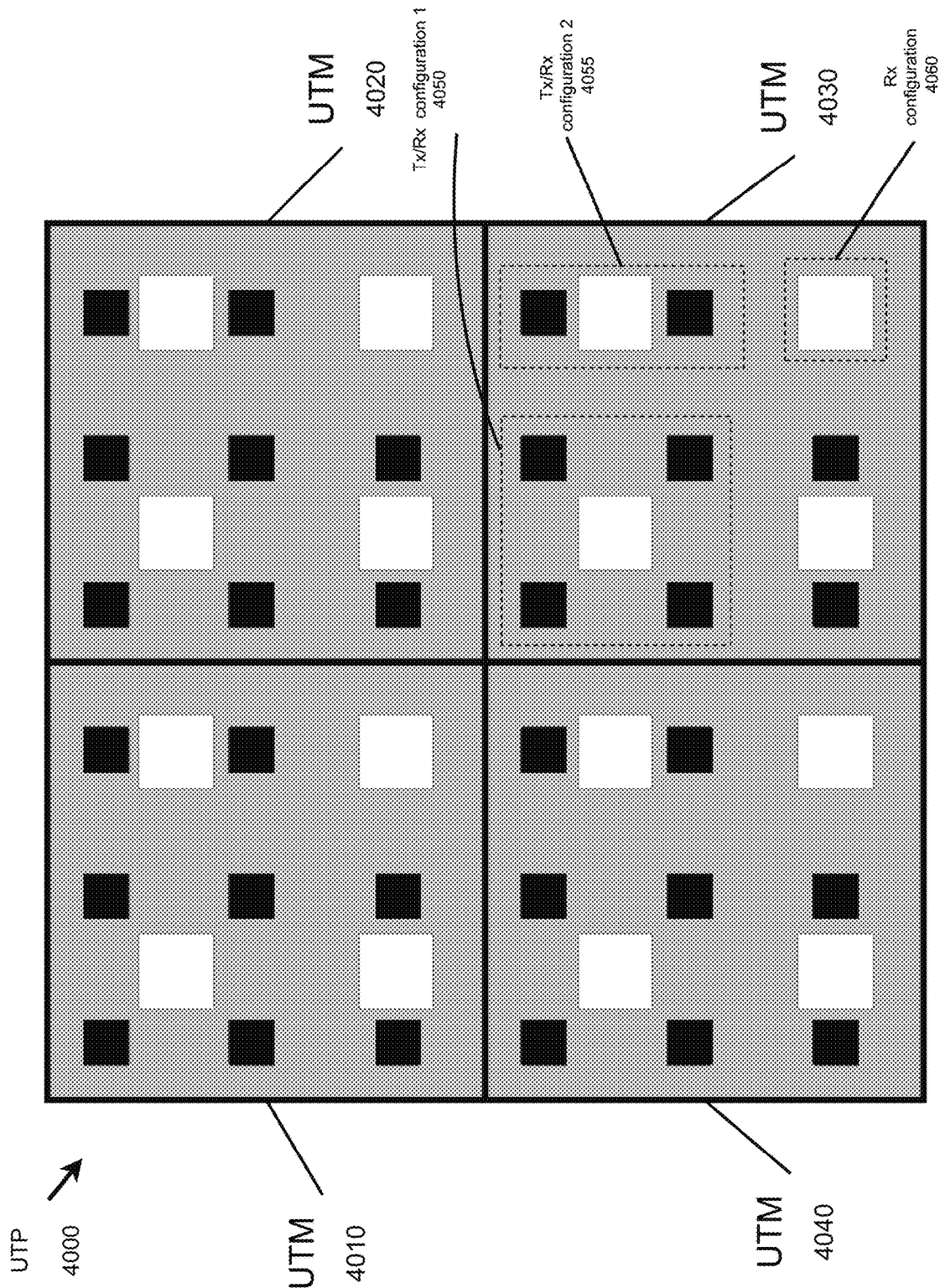
FIG. 40 depicts an example antenna lattice configuration of a full-duplex single-panel user terminal panel (UTP) using reduced Tx antenna elements, according to some embodiments.

FIG. 40 depicts atop view of UTP 4000 comprised of UTM 4010. UTM 4020, UTM 4030, and UTM 4040. Each of the UTM 4010, UTM 4020, UTM 4030, and UTM 4040 are identical UTMs. UTM 4010 may be duplicated horizontally and/or vertically to create a UTP of any size of n×n UTMs, where n is an integer, according to some embodiments. Furthermore, each UTM consists of Tx/Rx configuration 1 4050, Tx/Rx configuration 2 40550, Rx configuration 4060. Similar to 3600, each of the UTM 4010, UTM 4020, UTM 4030, and UTM 4040 employ equal Rx spacing of any two neighboring Rx antenna elements and equal Tx spacing of any two neighboring Tx antenna elements with the exception of the removed Tx antenna neighboring element; wherein Rx spacing is different from Tx spacing, allowing for independent beam scanning in the Tx frequency and Rx frequency simultaneously. Furthermore, each of the UTM 4010, UTM 4020, UTM 4030, and UTM 4040 have 1 less Tx antenna element when compared to UTM 3600 and/or UTM 3800, resulting in an even number of Tx antennas per UTM, according to some embodiments. An even number of Tx antenna elements requires an even number of RFIC channels which may be more commercially available than an odd number of RFIC channels; albeit at the expense of less Tx antenna radiation. In some embodiments, this is referred to as array thinning. The UTP gain is related directly to the area of the illuminated aperture, the gain of the UTP will be reduced in approximate proportion to the fraction of the elements removed. However, the UTP beamwidth is related to the largest dimension of the single-panel, the removal of elements does not significantly change its beamwidth. This procedure can make it possible to build a highly directive array with reduced gain at a lower cost of a filled array.

Figure 41:
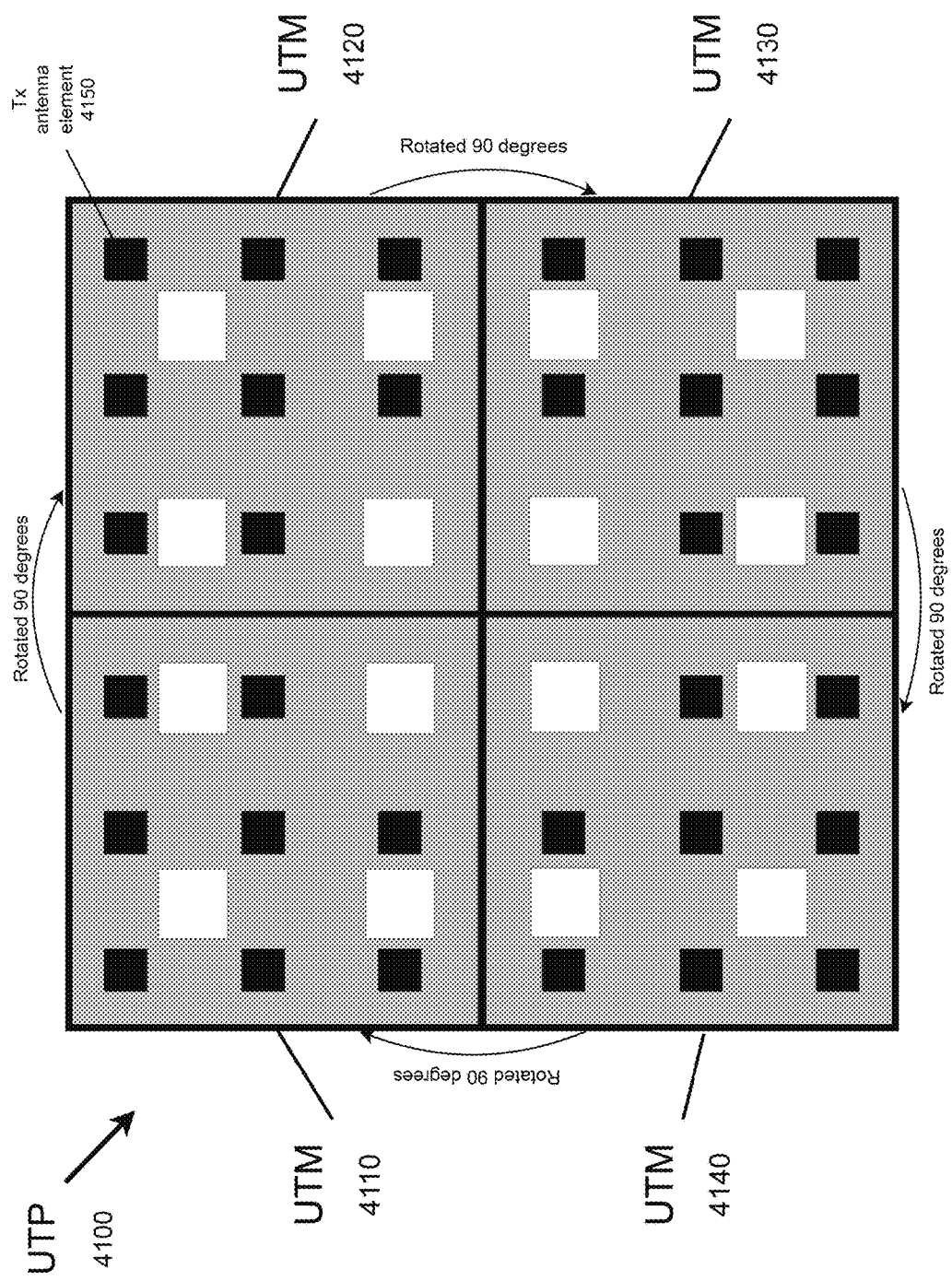
FIG. 41 depicts another example antenna lattice configuration of a full-duplex single-panel user terminal panel (UTP) using reduced Tx antenna elements, according to some embodiments.

FIG. 41 depicts a UTM 4100 comprised of four sub-UTMs utilizing SQR method, according to some embodiments. As shown, sub-UTM 4120 is formed by physically rotating sub-UTM 4110 by 90 degrees clockwise. Sub-UTM 4130 is formed by physically rotating sub-UTM 4120 by 90 degrees clockwise. Sub-UTM 4140 is formed by physically rotating sub-UTM 4130 by 90 degrees clockwise. Combined, sub-UTM 4110, sub-UTM 4120, UTM 4130, and sub-UTM 4140 form a single UTM. As used herein, a sub-UTM is the smallest form of a PCB used as a building block for realizing a UTM. As shown, each of the sub-UTM 4110, sub-UTM 4120, UTM 4130, and sub-UTM 4140 comprises eight Tx antenna elements. Similar to that shown in 4000, array thinning is employed in order to create an even number of Tx antenna elements to interface an even number of RFIC channels, which may be more commercially available.

Figure 42:
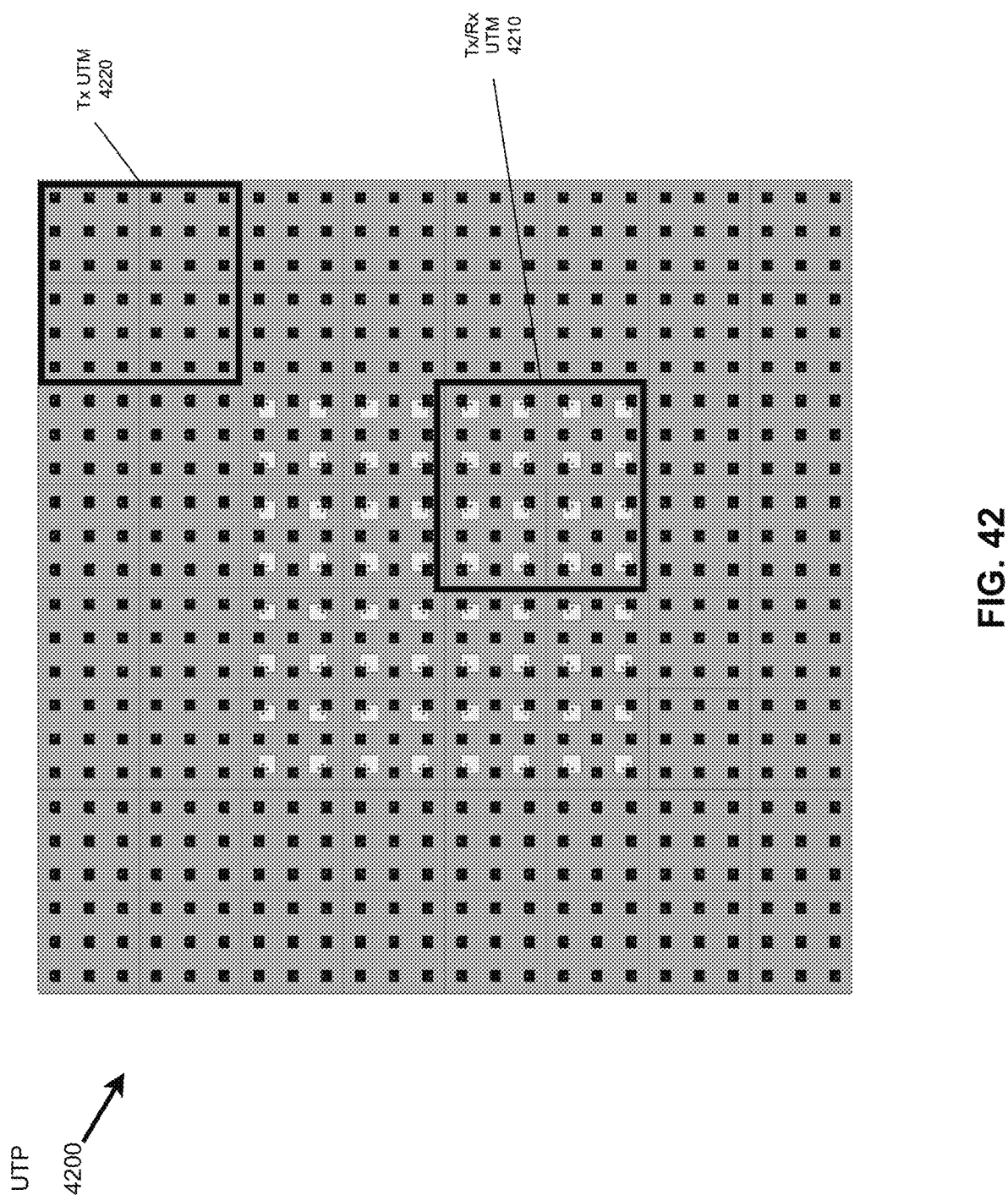
FIG. 42 depicts a UTP with Tx/Rx UTMs and Tx Only UTMs, according to some embodiments.

FIG. 42 depicts a UTP 4200, according to some embodiments. As shown, UTP 4200 comprises 2 UTM configurations: Tx % Rx UTM 4210 and Tx UTM 4220. As shown, Tx UTM 4220 uses Tx antenna elements only. The Tx UTMs may be placed around the Tx/Rx UTMs. The additional Tx UTMs may increase the EIRP of the full-duplex UTP. In other embodiments, Tx/Rx UTMs may be placed around the Tx UTMs or in a side-by-side fashion.

Figure 43:
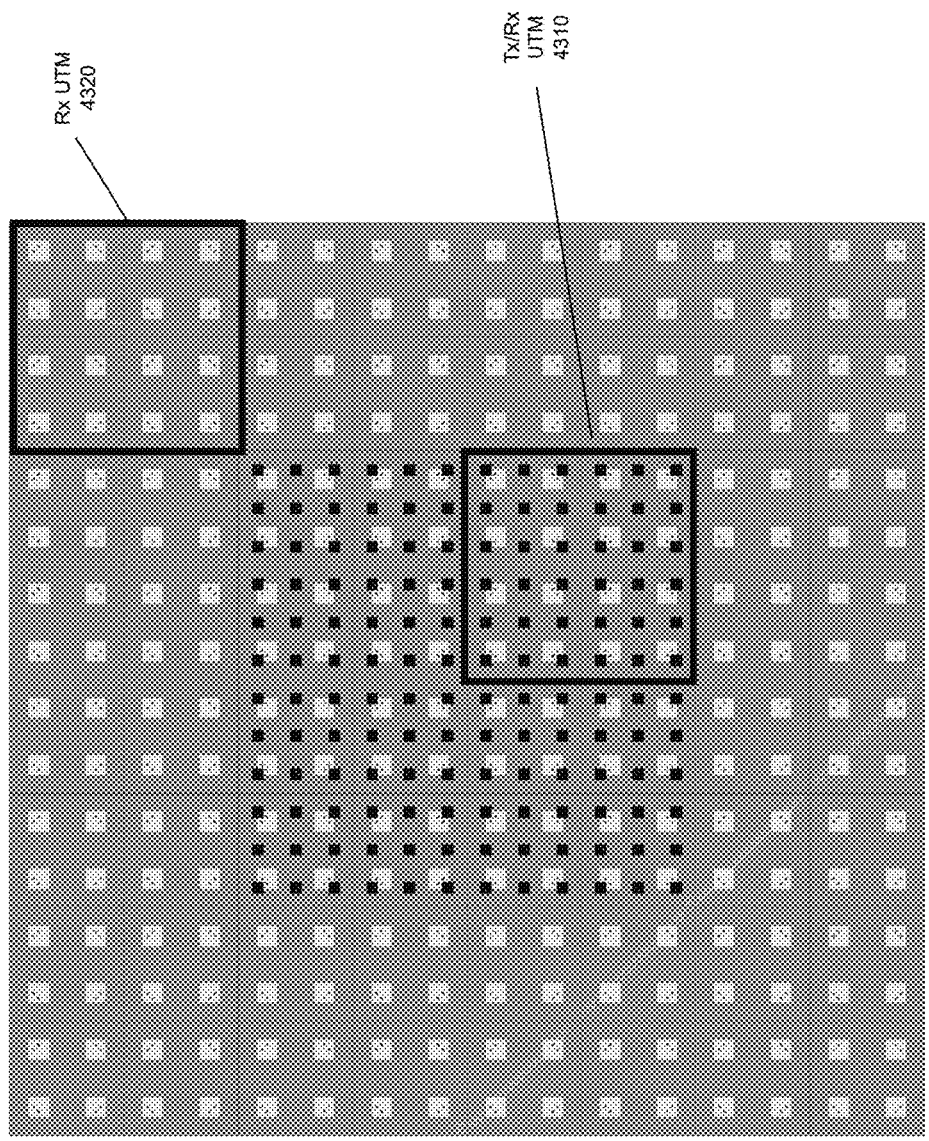
FIG. 43 depicts a UTP with Tx/Rx UTMs and Rx Only UTMs, according to some embodiments.

FIG. 43 depicts a UTP 4300, according to some embodiments. As shown, UTP 4300 comprises 2 UTM configurations: Tx/Rx UTM 4310 and Rx UTM 4320. As shown, Rx UTM 4320 uses Rx antenna elements only. The Rx UTMs can be added around the Tx/Rx UTMs. The additional Rx UTMs may increase the G/T of the full-duplex UTP. In other embodiments, Tx/Rx UTMs may be placed around the Rx UTMs or in a side-by-side fashion.

Figure 44:
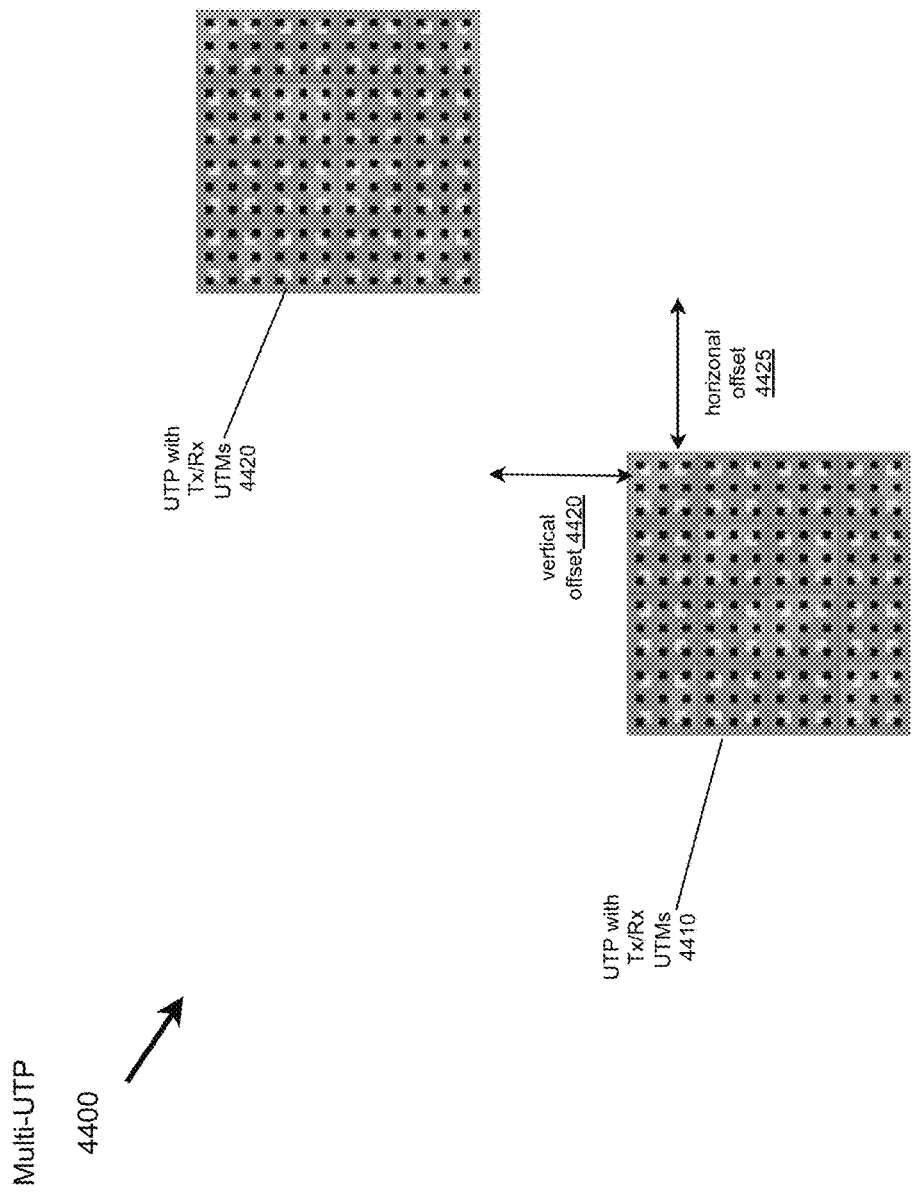
FIG. 44 depicts a multi-UTP for Improved Link Performance, according to some embodiments.

FIG. 44 depicts the use of multi-UTP, according to some embodiments. As shown, Mutli-UTP 4400 comprises UTP with Tx/Rx UTMs 4410 and UTP with Tx/Rx UTMs 4420 are spatially distributed using a vertical offset 4420 and a horizontal offset 4425.

Figure 45:
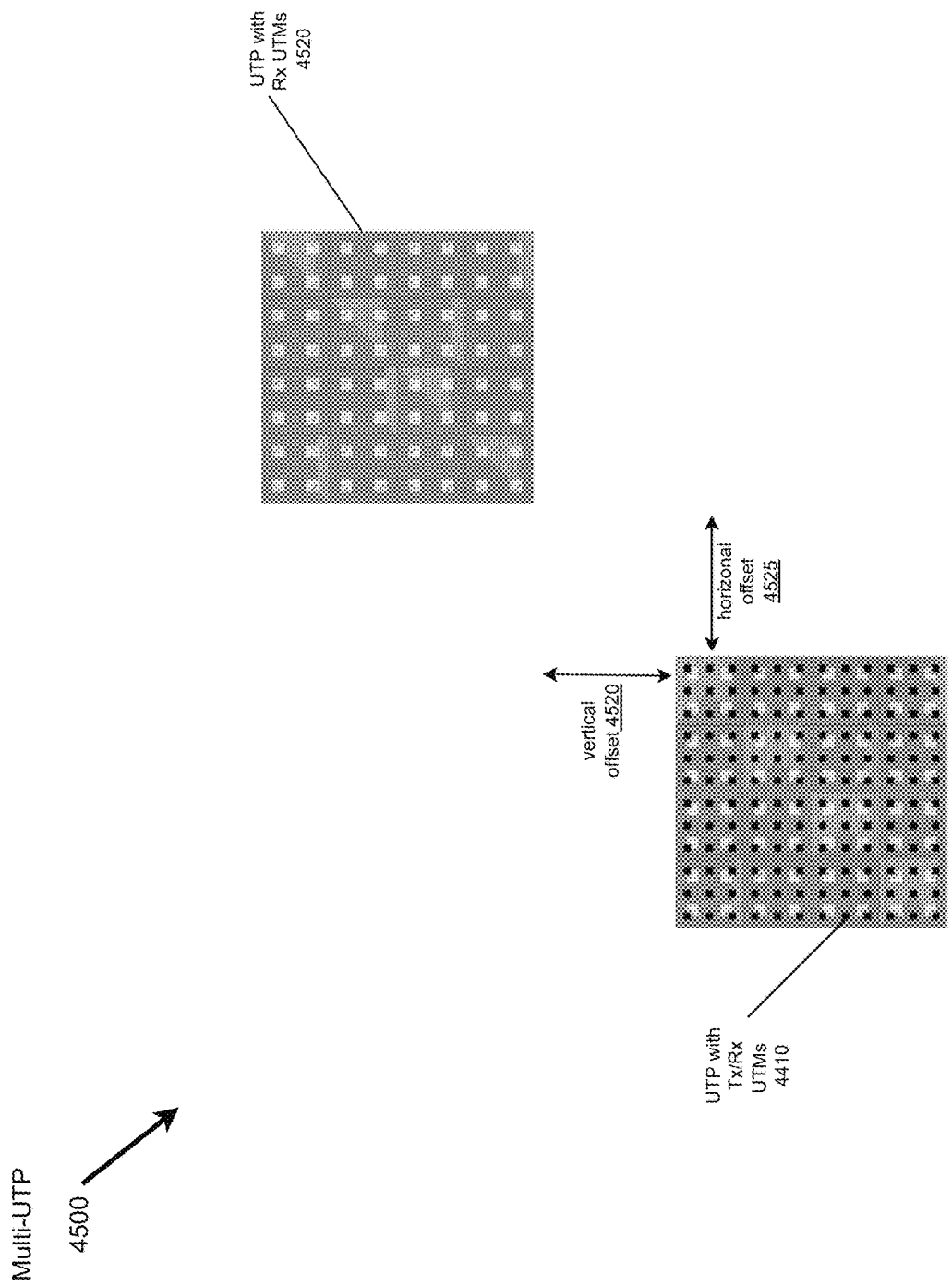
FIG. 45 depicts a multi-UTP for Improved G/T performance, according to some embodiments.

FIG. 45 depicts the use of multi-UTP, according to some embodiments. As shown, Mutli-UTP 4500 comprises UTP with Tx/Rx UTMs 4510 and UTP with Rx UTMs 4520 are spatially distributed using a vertical offset 4520 and a horizontal offset 4525.

Figure 46:
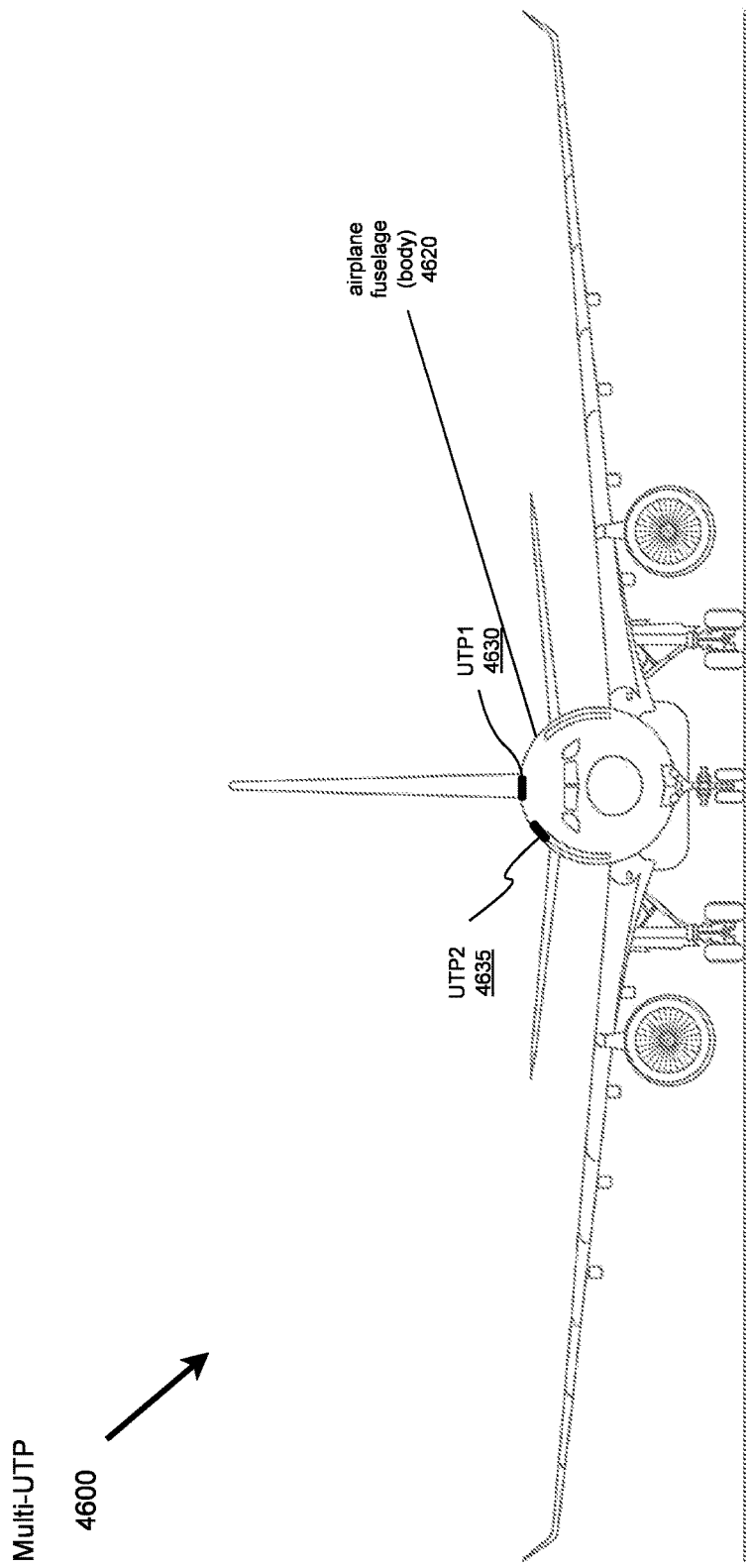
FIG. 46 depicts using multiple UTPs on an airplane fuselage, according to some embodiments.

FIG. 46 depicts using a multi-UTP 4600 on an airplane fuselage (body) 4620. As shown, UTP 4630 and UTP 4635 are placed in two different locations on the fuselage. In some embodiments, airplanes and other platforms may limit the size of a single UTP that they can host. This method of using a multi-UTP would help solve the challenge of size limitation when applied to a UTP. Furthermore, positioning UTP2 4635 at a different location than UTP1 4630 creates better scan performance at low elevation angles.

Figure 47:
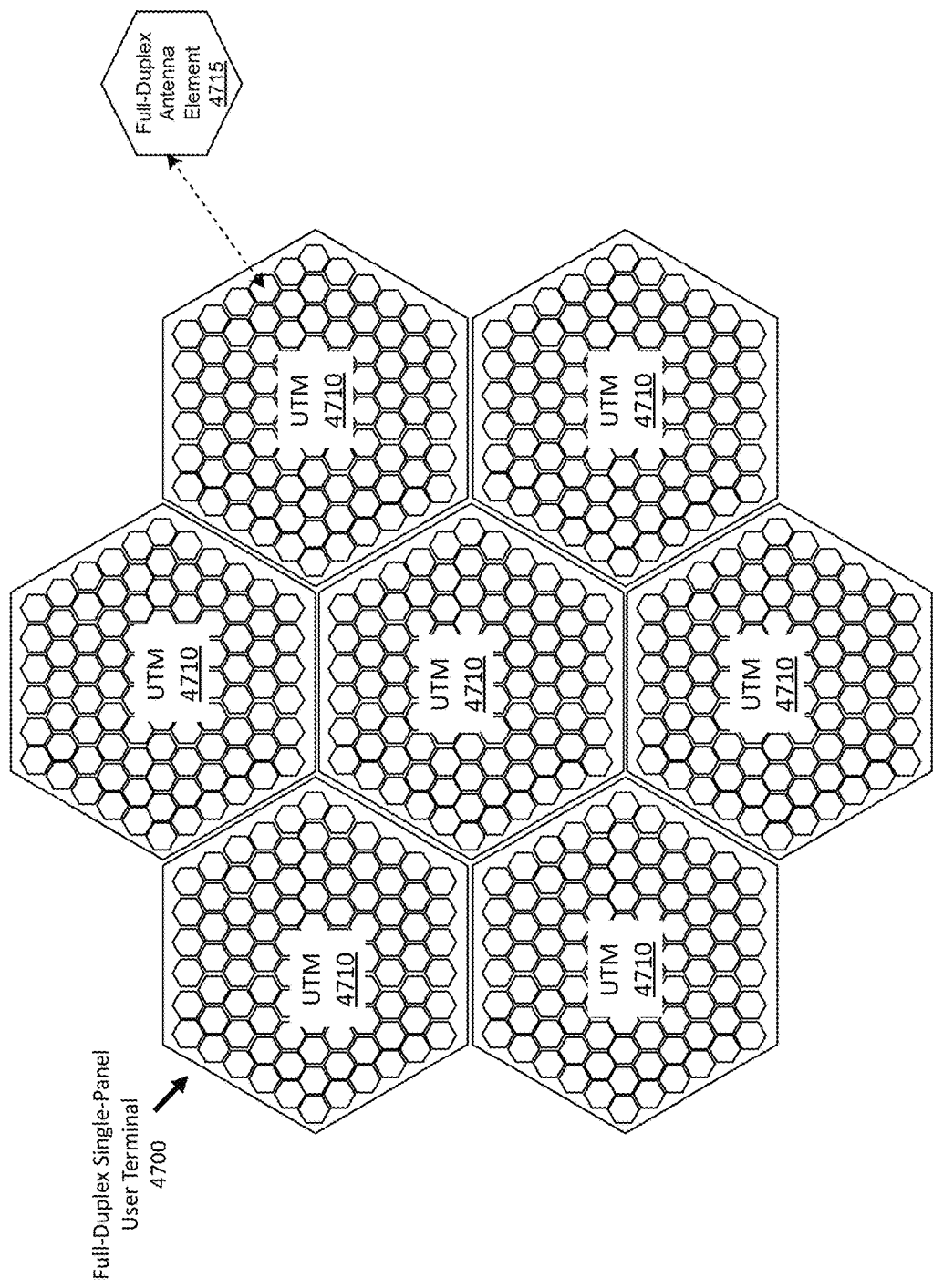
FIG. 47 depicts a block diagram illustrating an example modular architecture of a full-duplex single panel user terminal formed with multiple UTMs, according to some embodiments.

FIG. 47 depicts a block diagram illustrating an example modular architecture of an Full-Duplex Single-Panel User Terminal (or antenna system) 4700 formed with multiple UTMs 4710, according to some implementations. More specifically, the example of FIG. 47 illustrates the antenna system 4700 formed with multiple UTMs 4710. The antenna system panel 4700 can be any one of the antenna panels shown and discussed with reference to FIG. 1 (e.g., full-duplex single-panel user terminal 130), although alternative configurations are possible. Furthermore, although the UTMs 4710 are primarily shown with hexagonal form factors herein, it is appreciated that other form factors, e.g., triangular, square, rectangular, circular, etc., including combinations or variations thereof are also possible.

Figure 48:
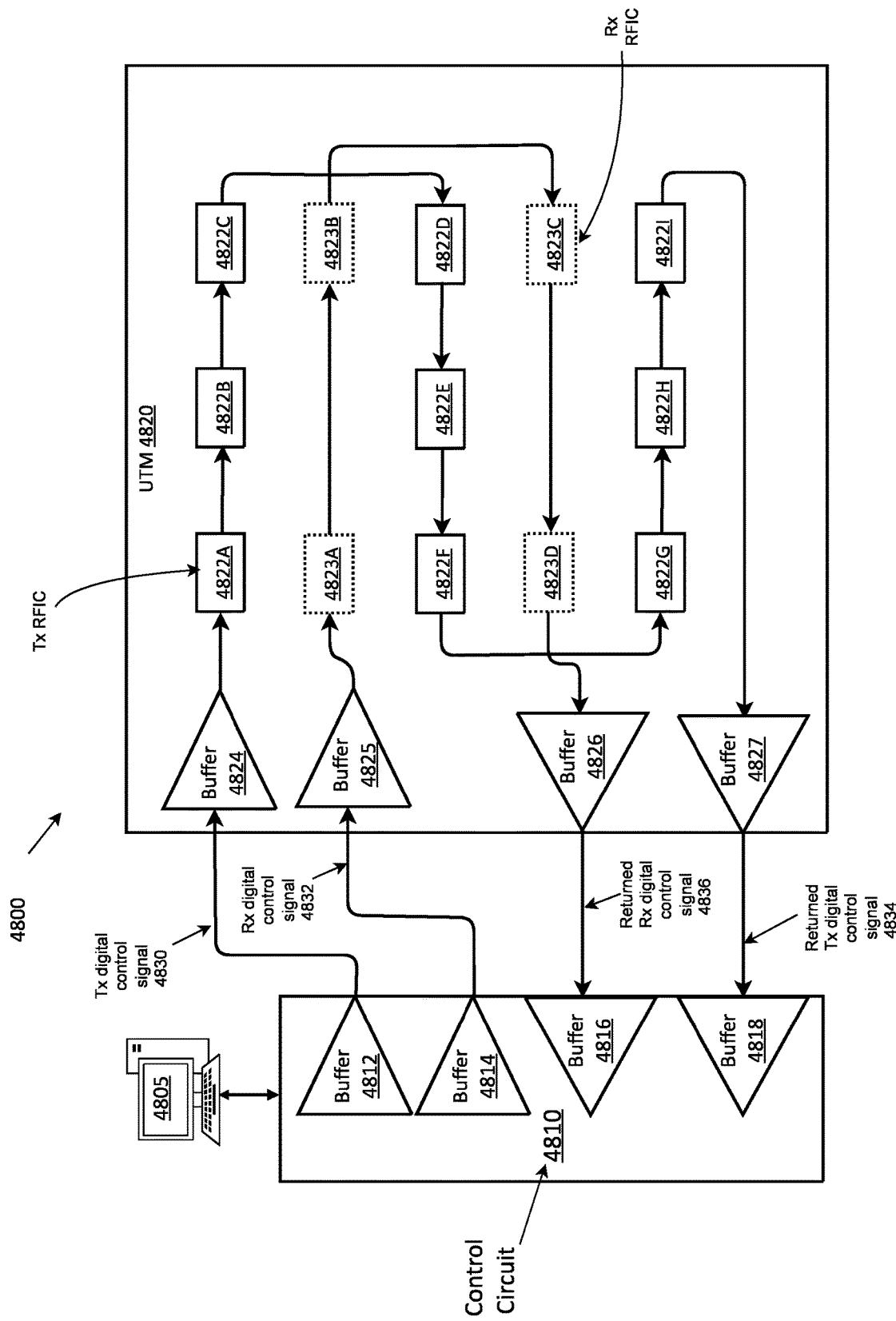
FIG. 48 depicts a block diagram illustrating an example UTM with 9 Tx RFICs connected in a daisy chain as well as 4 Rx RFICs connected in a daisy chain, and a control circuit, according to some implementations.

FIG. 48 depicts a block diagram illustrating an example UTM, control circuit, and amplitude adjustment buffers, according to some implementations. Here, control circuit 4810 is configured to send a Tx digital control signal 4830 to Tx RFICs 4822A to 48221 of UTM 4820 and to send an Rx digital control signal 4832 to Rx RFICs 4823A to 4823D. The Tx digital control signal is routed along a daisy-chain of the Tx RFICs, traveling in a serial manner from Tx RFIC 4822A to Tx RFIC 4822B, etc., and making its way to the last Tx RFIC 48221 of the UTM 4820. The Rx digital control signal is routed along a daisy-chain of the Rx RFICs, traveling in a serial manner from Rx RFIC 4823A to Rx RFIC 4823B, etc, and making its way to the last Rx RFIC 4823D of the UTM 4820. The Tx digital control signal is configured to control the Tx RFICs to alter an amplitude and phase of an outgoing signal towards a satellite. The Rx digital control signal is configured to control the Rx RFICs to alter an amplitude and phase of incoming analog signal from a satellite.

In some embodiments, the Tx digital control signal and the Rx digital control signal enables the turning ON/OFF of the Tx RFICs and Rx RFICs, respectively.

In other embodiments, not shown, the Tx digital control signal and the Rx digital control signal include: clock data, serial data, parallel data, latch, and chip select.

Some embodiments reduce costs and area required for routing by passing digital control signals along a daisy-chain of RFICs, rather than to route control signals from control circuitry to each of the RFICs. In particular, in some embodiments, digital control signals, and power are passed between modules using input and output buffers of UTM 4820, such as buffers 4824, 4825, 4826 and 4827 of FIG. 48. The buffers are configured to correct degradation of a digital control signal passed from one RFIC to another RFIC in the daisy chain. In such a scenario, system costs can be further reduced by exploiting the daisy-chain concept to use just one controller circuit to control multiple RFICs in the daisy-chain. A user device 4805 is connected to the controller circuit 4810. The user device can be a personal computer, modem, network adapter, or another form of an electronic device that controls the controller circuit.

In some embodiments, control circuit 4810 comprises control circuit output buffers 4812 and 4814 and control circuit input buffers 4816 and 4818. The control circuit output buffers are configured to correct degradation of a digital control signal passed from the control circuit to the UTM and the control input buffers are configured to correct degradation of a digital control signal passed from the UTM to the control circuit.

In some embodiments, control circuit 4810 monitors the health of the system by monitoring one or more signal characteristics of the returned Tx digital control signal 4834 and returned Rx digital control signal 4836.

UTM 4820 is an example of a UTM utilizing a square equal number of Tx antenna elements and Rx antenna elements respectively (not shown) using 9 Tx RFICs and 4 Rx RFICs, supporting a Tx frequency to Rx frequency ratio of 3:2. Note that the 9:4 ratio is that of a square configuration In some embodiments each Tx RFIC has 8 Tx channels and each Rx RF1C has 8 channels. UTM 4820 therefore can support 72 Tx channels and 32 Rx channels.

As used herein, the control circuit may also be referred to as control board or controller board.

Figure 49:
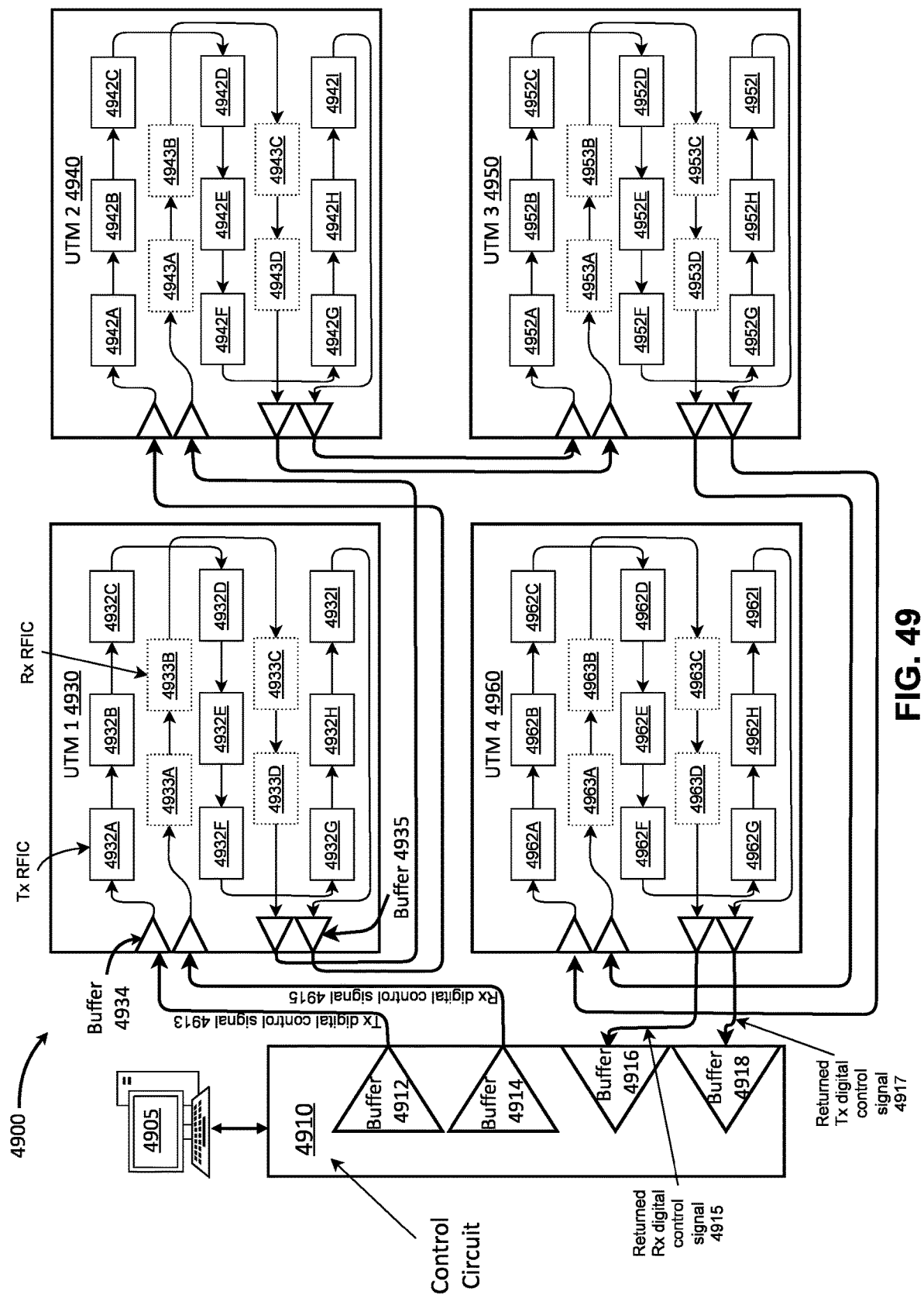
FIG. 49 depicts a block diagram illustrating an example control circuit and four UTMs connected in a daisy chain.

FIG. 49 depicts a block diagram illustrating an example control circuit and four UTMs connected in a daisy chain for sending digital control signals from one UTM to another and back to the control circuit. As shown, system 4900 includes UTM 1 4930, UTM 2 4940, UTM 3 4950, and UTM 4 4960, each of which contains a daisy chain of 9 Tx RFICs and a daisy chain of 4 Rx RFICs in the respective UTM, similar to FIG. 48. In such an embodiment, control circuit 4910 is connected to provide a Tx digital control signal 4913 to UTM 1 4930 and an Rx digital control signal 4915 to UTM 1 4930, and to receive a returned Tx digital control signal 4917 from UTM 4 4960 and an Rx returned digital control 4915 signal from UTM 4960. Also shown, each of the Tx digital control signal and Rx digital control signal, once completing a daisy chain within UTM 1, will go through a buffer at the output of UTM 1, before proceeding to an input buffer on UTM 2. The Tx digital control signal and the Rx digital control signal continue in a daisy chain of their respective Tx RFIC and Rx RFICs within UTM 2 until reaching the output buffers of UTM 2. By daisy chaining RFICs and UTMs including buffers, a digital control signal can travel any number of UTMs then return to a control circuit.

In other embodiments the Tx digital control signal and the Rx digital control signal are returned to the control circuit via the buffers of UTM1. In a similar way, UTM2 returns a separate Tx digital return signal and a separate Rx digital return signal via UTM2 buffers, and so on.

In other embodiments, UTM1, UTM2, UTM3, and UTM4 include a plurality of Tx RFICs and Rx RFICs connected in a daisy chain.

In some embodiments, the returned Tx digital control signal and the returned Rx digital control signal return monitoring data such as Tx RFIC RF power output level, Tx RFIC and Rx RFIC temperatures, and Tx RFIC and Rx RFIC register settings, enabling the controller to output such data to a user interface 4905.

It will be appreciated that the present disclosure may include any one and up to all of the following examples.

Example 1. A full-duplex User Terminal Panel (UTP) comprising: one or more User Terminal Modules (UTM)s, each UTM comprising: two or more unit cells, each unit cell comprising: a transmit (Tx) antenna element, comprising a plurality of Tx antenna element ports; a receive (Rx) antenna element, comprising a plurality of Rx antenna element ports; wherein a center of a first Tx antenna element of a first unit cell has a distance x to a center of a first Tx antenna element of a second unit cell; wherein each of the Tx antenna elements transmit via a first frequency range, and each of the Rx antenna elements receive via a second frequency range, the first frequency range being different than the second frequency range; and wherein a center of a first Rx antenna element of the first unit cell has a same distance to a center of a first Rx antenna element of the second unit cell, and wherein the distance x is a value such that a grating lobe-free scanning in an elevation plane at the second frequency range is achieved; at least one Tx radio frequency integrated circuit (RFIC) configured to transmit a radio frequency (RF) signal, the Tx RFIC comprising one or more Tx channels, each of the Tx channels connected individually to one of the plurality of Tx antenna element ports; and at least one Rx RFIC configured to receive an RF signal, the Rx RFIC comprising one or more Rx channels, each of the Rx channels connected individually to one of the plurality of Rx antenna element ports.

Example 2. The full-duplex UTP of Example 1, wherein for an nth unit cell, the center of the nth unit cell has the distance x to a center of an adjacent unit cell.

Example 3. The full-duplex UTP of any one of Examples 1-2, wherein adjacent Tx antenna elements and Rx antenna elements are positioned from each other to provide an RF isolation between the plurality of the Tx antenna ports and the plurality of the Rx antenna ports.

Example 4. The full-duplex UTP of any one of Examples 1-3, wherein the RF isolation is achieved via a Tx antenna element keepout region and a Rx antenna element keepout region, the Tx antenna element keepout region disposed about a periphery of the Tx antenna element, and the Rx antenna element keepout region disposed about a periphery of the Rx antenna element.

Example 5. The full-duplex UTP of any one of Examples 1-4, wherein the Tx antenna element keepout region comprises a buffer zone around the Tx antenna element, and wherein the Rx antenna element keepout region comprises a buffer zone around the Rx antenna element.

Example 6. The full-duplex UTP of any one of Examples 1-5, wherein an electric field of the Rx antenna element does not overlap with the keepout region of the Tx antenna element, and wherein an electric field of the Tx antenna element does not overlap with the keepout region of the Rx antenna element.

Example 7. The full-duplex UTP of any one of Examples 1-6, wherein each Tx antenna element is spaced in relationship to a neighboring Rx antenna element such that the Tx antenna element avoids signal coupling with the neighboring Rx antenna elements.

Example 8. The full-duplex UTP of any one of Examples 1-7, wherein the Tx antenna element is positioned diagonally in relationship to the Rx antenna element.

Example 9. The full-duplex UTP of any one of Examples 1-8, wherein the Tx antenna element is positioned above the Rx antenna element.

Example 10. The full-duplex UTP of any one of Examples 1-9, wherein each of the Tx antenna elements have a common Tx polarization, and each of the Rx antenna elements have a common Rx polarization, the common Tx polarization of the Tx antenna elements being orthogonal to the common Rx polarization of the Rx antenna elements.

Example 11. The full-duplex UTP of any one of Examples 1-10, wherein the Tx antenna element includes a first Tx antenna element port, and the Rx antenna element includes a first Rx antenna element port, the first Tx antenna element port and the first Rx antenna element port having a first orthogonal orientation.

Example 12. The full-duplex UTP of any one of Examples 1-11, wherein the Tx antenna element includes a second Tx antenna element port, and the Rx antenna element includes a second Rx antenna element port, the second Tx antenna element port and the second Rx antenna element port having a second orthogonal orientation different than the first orthogonal orientation.

Example 13. The full-duplex UTP of any one of Examples 1-12, further comprising: a Rx filter connected to one channel of the Rx RFIC and connected to the Rx antenna element port, wherein the Rx filter provides RF signal isolation between the Rx antenna element port and the Tx antenna element port.

Example 14. The full-duplex UTP of any one of Examples 1-13, further comprising: a Tx filter connected to one channel of the Tx RFIC and connected to the Tx antenna element port, wherein the Tx filter provides RF signal isolation between the Tx antenna element port and the Rx antenna element port.

Example 15. The full-duplex UTP of any one of Examples 1-14, wherein the Tx RFIC is configured to alter, by each of the Tx RFIC channels, a phase of an outgoing analog signal to each of the one or more Tx antenna element ports; wherein the Rx RFIC is configured to alter, by each of the Rx RFIC channels, a phase of an incoming analog signal to each of the one or more Rx antenna element ports; and wherein the altering of the phase of the outgoing analog signal and the altering of the phase of the incoming analog signal provides a polarization control of the UTP.

Example 16. The full-duplex UTP of any one of Examples 1-15, wherein the Tx antenna element has two Tx antenna element ports, each of the two Tx antenna element ports connected to a channel of the Tx RFIC, and wherein the Rx antenna element has two Rx antenna element ports, each of the two Rx antenna element ports connected to a channel of the Rx RFIC, thereby enabling full polarization control of the common Tx polarization and the common Rx polarization.

Example 17. The full-duplex of any one of Examples 1-16, wherein the Tx antenna element has one Tx antenna element port connected to a channel of the Tx RFIC and the Rx antenna element has one Rx antenna element port connected to a channel of the Rx RFIC.

Example 18. The full-duplex of any one of Examples 1-17, wherein the Tx antenna element has two Tx antenna element ports combined via a microwave combiner circuit connected to a channel of the Tx RFIC, and wherein the Rx antenna element has two Rx antenna element ports combined via a microwave combiner circuit connected to a channel of the Rx RFIC.

Example 19. The full-duplex UTP of any one of Examples 1-18, wherein the common Tx polarization is a circular polarization and the common Rx polarization is a circular polarization.

Example 20. The full-duplex UTP of any one of Examples 1-19, wherein four unit cells are configured in a quadrant such that each of the four unit cells is rotated 90 degrees from each other in a clockwise manner.

Example 21. The full-duplex UTP of any one of Examples 1-20, wherein the common Tx polarization is a Right-Hand circular polarization (RHCP) and the Rx common polarization is a Left-Hand circular polarization (LHCP).

Example 22. A full-duplex User Terminal Panel (UTP) comprising: one or more User Terminal Modules (UTM)s, each UTM comprising: a plurality of Tx antenna elements, each of the Tx antenna elements spaced apart from one another by a distance dTx; a plurality of Rx antenna elements, each of the Rx antenna elements spaced apart from one another by a distance dRx, wherein the distance dRx is greater than the distance dTx; wherein the Tx antenna elements are spaced according to a Tx lattice dTx, and the Rx antenna elements are spaced according to an Rx lattice dRx; wherein the Tx lattice dTx spacing arrangement provides grating lobe-free scanning in an elevation plane at a Tx frequency range; and wherein the Rx lattice dRx spacing arrangement provides grating lobe-free scanning in an elevation plane at a Rx frequency range; and at least one Tx radio frequency integrated circuit (RFIC) configured to transmit a radio frequency (RF) signal, the Tx RFIC comprising one or more Tx channels, each of the Tx channels connected individually to one of the plurality of Tx antenna element ports; and at least one Rx RFIC configured to receive an RF signal, the Rx RFIC comprising one or more Rx channels, each of the Rx channels connected individually to one of the plurality of Rx antenna element ports.

Example 23. The full-duplex UTP of Example 22, wherein the UTM comprises more Tx antenna elements than Rx antenna elements.

Example 24. The full-duplex UTP of any one of Examples 22-23, wherein the UTM comprises an odd number of Tx antenna elements, and an even number of Rx antenna elements.

Example 25. The full-duplex UTP of any one of Examples 22-24, wherein the UTM comprises nine Tx antenna elements, and four Rx antenna elements.

Example 26. The full-duplex UTP of any one of Examples 22-25, wherein the UTM comprises eight Tx antenna elements each having two Tx antenna element ports, and four Rx antenna elements each having two Rx antenna element ports.

Example 27. The full-duplex UTP of any one of Examples 22-26, wherein the UTM comprises two Tx RFICs each having eight Tx channels, and one Rx RFIC having eight Rx channels.

Example 28. The full-duplex UTP of any one of Examples 22-27, wherein the UTM comprises a first dielectric layer and second dielectric layer, the Tx antenna elements positioned on the first dielectric layer and the Rx antenna elements positioned on the second dielectric layer.

Example 29. The full-duplex UTP of any one of Examples 22-28, comprising: a first configuration comprised of an Rx antenna element and four Tx antenna elements; a second configuration comprised of an Rx antenna element and an overlapping Tx antenna element; and a third configuration comprised of an Rx antenna element and two Tx antenna elements.

Example 30. The full-duplex UTP of any one of Examples 22-29, wherein each of the Tx antenna elements have a common polarization, and each of the Rx antenna elements have a common polarization, the common polarization of the Tx antenna elements being orthogonal to the common polarization of the Rx antenna elements.

Example 31. The full-duplex UTP of anyone of Examples 22-30, wherein each of the Tx antenna elements have a common polarization, and each of the Rx antenna elements have a common polarization, the common polarization of the Tx antenna elements being orthogonal to the common polarization of the Rx antenna elements.

Example 32. The full-duplex UTP of anyone of Examples 22-31, wherein the Tx antenna element includes a first Tx antenna element port, and the Rx antenna element includes a first Rx antenna element port, the first Tx antenna element port and the first Rx antenna element port having a first orthogonal orientation.

Example 33. The full-duplex UTP of any one of Examples 22-32, further comprising: a Rx filter connected to one channel of the Rx RFIC and connected to the Rx antenna element port, wherein the Rx filter provides RF signal isolation between the Rx antenna element port and the Tx antenna element port.

Example 34. The full-duplex UTP of any one of Examples 22-33, further comprising: a Tx filter connected to one channel of the Tx RFIC and connected to the Tx antenna element port, wherein the Tx filter provides RF signal isolation between the Tx antenna element port and the Rx antenna element port.

Example 35. The full-duplex UTP of any one of Examples 22-34, wherein adjacent Tx antenna elements and Rx antenna elements are positioned from each other to provide an RF isolation between the plurality of the Tx antenna ports and the plurality of the Rx antenna ports; and wherein the RF isolation is achieved via a Tx antenna element keepout region and a Rx antenna element keepout region, the Tx antenna element keepout region disposed about a periphery of the Tx antenna element, and the Rx antenna element keepout region disposed about a periphery of the Rx antenna element.

Example 36. The full-duplex UTP of any one of Examples 22-35, wherein the Tx RFIC is configured to alter, by each of the Tx RFIC channels, a phase of an outgoing analog signal to each of the one or more Tx antenna element ports; wherein the Rx RFIC is configured to alter, by each of the Rx RFIC channels, a phase of an incoming analog signal to each of the one or more Rx antenna element ports; and wherein the altering of the phase of the outgoing analog signal and the altering of the phase of the incoming analog signal provides a polarization control of the UTP.

Example 37. A full-duplex User Terminal Panel (UTP) comprising: one or more UTMs, each UTM comprising 4 sub-UTMs each sub-UTM comprising: a plurality of Tx antenna elements, each of the Tx antenna elements spaced apart from one another by a distance dTx; a plurality of Rx antenna elements, each of the Rx antenna elements spaced apart from one another by a distance dRx, wherein the distance dRx is greater than the distance dTx; wherein the Tx antenna elements are spaced according to a Tx lattice dTx, and the Rx antenna elements are spaced according to an Rx lattice dRx; wherein the Tx lattice dTx spacing arrangement provides grating lobe-free scanning in an elevation plane at a Tx frequency; and wherein the Rx lattice dRx spacing arrangement provides grating lobe-free scanning in an elevation plane at a Rx frequency; and at least one Tx radio frequency integrated circuit (RFIC) configured to transmit a radio frequency (RF) signal, the Tx RFIC comprising one or more Tx channels, each of the Tx channels connected individually to one of the plurality of Tx antenna element ports; and at least one Rx RFIC configured to receive an RF signal, the Rx RFIC comprising one or more Rx channels, each of the Rx channels connected individually to one of the plurality of Rx antenna element ports; wherein the sub-UTMs are configured in a quadrant such that each sub-UTM is rotated 90 degrees from each other in a clockwise manner.

Example 38. The full-duplex UTP of Example 37, comprising multiple UTMs in at least an array of four UTMs by four UTMs.

Example 39. The full-duplex UTP of any one of Examples 37-38, wherein the sub-UTM has a square side equal to a maximum of ($M \times d_{Tx}, N \times d_{Rx}$), where M/N is a ratio of a Tx frequency to a Rx frequency.

Example 40. The full-duplex UTP of any one of Examples 37-39, comprising: a first configuration comprised of a single band Tx antenna element; and a second configuration comprised of a dual band Tx antenna element and an Rx antenna element overlapping the Tx antenna element.

Example 41. The full-duplex UTP of any one of Examples 37-40, further comprising: one or more peripheral UTMs including a plurality of only Tx antenna elements.

Example 42. The full-duplex UTP of claim 37, comprising: one or more peripheral UTMs including a plurality of only Rx antenna elements.

Example 43. The full-duplex UTP of anyone of Examples 37-41, wherein each of the Tx antenna elements have a common polarization, and each of the Rx antenna elements have a common polarization, the common polarization of the Tx antenna elements being orthogonal to the common polarization of the Rx antenna elements.

Example 44. The full-duplex UTP of anyone of Examples 37-43, wherein each of the Tx antenna elements have a common polarization, and each of the Rx antenna elements have a common polarization, the common polarization of the Tx antenna elements being orthogonal to the common polarization of the Rx antenna elements.

Example 45. The full-duplex UTP of any one of Examples 37-34, wherein the Tx antenna element includes a first Tx antenna element port, and the Rx antenna element includes a first Rx antenna element port, the first Tx antenna element port and the first Rx antenna element port having a first orthogonal orientation.

Example 46. The full-duplex UTP of any one of Examples 37-45, further comprising:
a Rx filter connected to one channel of the Rx RFIC and connected to the Rx antenna element port, wherein the Rx filter provides RF signal isolation between the Rx antenna element port and the Tx antenna element port.

Example 47. The full-duplex UTP of any one of Examples 37-46, further comprising:
a Tx filter connected to one channel of the Tx RFIC and connected to the Tx antenna element port, wherein the Tx filter provides RF signal isolation between the Tx antenna element port and the Rx antenna element port.

Example 48. The full-duplex UTP of any one of Examples 37-47, wherein adjacent Tx antenna elements and Rx antenna elements are positioned from each other to provide an RF isolation between the plurality of the Tx antenna ports and the plurality of the Rx antenna ports; and wherein the RF isolation is achieved via a Tx antenna element keepout region and a Rx antenna element keepout region, the Tx antenna element keepout region disposed about a periphery of the Tx antenna element, and the Rx antenna element keepout region disposed about a periphery of the Rx antenna element.

Example 49. The full-duplex UTP of any one of Examples 3748, wherein the Tx RFIC is configured to alter, by each of the Tx RFIC channels, a phase of an outgoing analog signal to each of the one or more Tx antenna element ports; wherein the Rx RFIC is configured to alter, by each of the Rx RFIC channels, a phase of an incoming analog signal to each of the one or more Rx antenna element ports; and wherein the altering of the phase of the outgoing analog signal and the altering of the phase of the incoming analog signal provides a polarization control of the UTP.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A full-duplex User Terminal Panel (UTP) comprising: one or more User Terminal Modules (UTM)s, each UTM comprising:
    a plurality of Tx antenna elements, each of the plurality of Tx antenna elements spaced apart from one another by a distance dTx;
    a plurality of Rx antenna elements, each of the plurality of Rx antenna elements spaced apart from one another by a distance dRx, wherein the distance dRx is greater than the distance dTx;
    wherein the plurality of Tx antenna elements are spaced according to a Tx lattice dTx, and the plurality of Rx antenna elements are spaced according to an Rx lattice dRx;
    wherein the Tx lattice dTx spacing arrangement provides grating lobe-free scanning in an elevation plane at a Tx frequency range; and
    wherein the Rx lattice dRx spacing arrangement provides grating lobe-free scanning in an elevation plane at a Rx frequency range; and
    at least one Tx radio frequency integrated circuit (RFIC) configured to transmit a radio frequency (RF) signal, the Tx RFIC comprising one or more Tx channels, each of the one or more Tx channels connected individually to one or more of plurality of Tx antenna element ports; and
    at least one Rx RFIC configured to receive an RF signal, the Rx RFIC comprising one or more Rx channels, each of the Rx channels connected individually to one or more of a plurality of Rx antenna element ports.

2. The full-duplex UTP of claim 1, wherein the UTM comprises more Tx antenna elements than Rx antenna elements.

3. The full-duplex UTP of claim 1, wherein the UTM comprises an odd number of Tx antenna elements, and an even number of Rx antenna elements.

4. The full-duplex UTP of claim 1, wherein the UTM comprises nine Tx antenna elements, and four Rx antenna elements.

5. The full-duplex UTP of claim 1, wherein the UTM comprises eight Tx antenna elements each having two Tx antenna element ports, and four Rx antenna elements each having two Rx antenna element ports.

6. The full-duplex UTP of claim 5, wherein the UTM comprises two Tx RFICs each having eight Tx channels, and one Rx RFIC having eight Rx channels.

7. The full-duplex UTP of claim 1, wherein the UTM comprises a first dielectric layer and second dielectric layer, the Tx antenna elements positioned on the first dielectric layer and the Rx antenna elements positioned on the second dielectric layer.

8. The full-duplex UTP of claim 7, comprising:
    a first configuration comprised of an Rx antenna element and four Tx antenna elements;
    a second configuration comprised of an Rx antenna element and an overlapping Tx antenna element; and
    a third configuration comprised of an Rx antenna element and two Tx antenna elements.

9. The full-duplex UTP of claim 1, wherein each of the Tx antenna elements have a common polarization, and each of the Rx antenna elements have a common polarization, the common polarization of the Tx antenna elements being orthogonal to the common polarization of the Rx antenna elements.

10. The full-duplex UTP of claim 1, wherein each of the Tx antenna elements have a common polarization, and each of the Rx antenna elements have a common polarization, the common polarization of the Tx antenna elements being orthogonal to the common polarization of the Rx antenna elements.

11. The full-duplex UTP of claim 1, wherein the Tx antenna element includes a first Tx antenna element port, and the Rx antenna element includes a first Rx antenna element port, the first Tx antenna element port and the first Rx antenna element port having a first orthogonal orientation.

12. The full-duplex UTP of claim 1, further comprising:
    a Rx filter connected to one channel of the Rx RFIC and connected to the Rx antenna element port, wherein the Rx filter provides RF signal isolation between the Rx antenna element port and the Tx antenna element port.

13. The full-duplex UTP of claim 1, further comprising:
    a Tx filter connected to one channel of the Tx RFIC and connected to the Tx antenna element port, wherein the Tx filter provides RF signal isolation between the Tx antenna element port and the Rx antenna element port.

14. The full-duplex UTP of claim 1, wherein adjacent Tx antenna elements and Rx antenna elements are positioned from each other to provide an RF isolation between the plurality of the Tx antenna ports and the plurality of the Rx antenna ports; and
    wherein the RF isolation is achieved via a Tx antenna element keepout region and a Rx antenna element keepout region, the Tx antenna element keepout region disposed about a periphery of the Tx antenna element, and the Rx antenna element keepout region disposed about a periphery of the Rx antenna element.

15. The full-duplex UTP of claim 1, wherein the Tx RFIC is configured to alter, by each of the Tx RFIC channels, a phase of an outgoing analog signal to each of the one or more Tx antenna element ports;

wherein the Rx RFIC is configured to alter, by each of the Rx RFIC channels, a phase of an incoming analog signal to each of the one or more Rx antenna element ports; and wherein the altering of the phase of the outgoing analog signal and the altering of the phase of the incoming analog signal provides a polarization control of the UTP.

16. A full-duplex User Terminal Panel (UTP) comprising: one or more UTMs, each UTM comprising 4 sub-UTMs each sub-UTM comprising:
- a plurality of Tx antenna elements, each of the plurality of Tx antenna elements spaced apart from one another by a distance dTx;
- a plurality of Rx antenna elements, each of the plurality of Rx antenna elements spaced apart from one another by a distance dRx, wherein the distance dRx is greater than the distance dTx;
- wherein the plurality of Tx antenna elements are spaced according to a Tx lattice dTx, and the plurality of Rx antenna elements are spaced according to an Rx lattice dRx;
- wherein the Tx lattice dTx spacing arrangement provides grating lobe-free scanning in an elevation plane at a Tx frequency; and
- wherein the Rx lattice dRx spacing arrangement provides grating lobe-free scanning in an elevation plane at a Rx frequency; and
- at least one Tx radio frequency integrated circuit (RFIC) configured to transmit a radio frequency (RF) signal, the Tx RFIC comprising one or more Tx channels, each of the one or more Tx channels connected individually to one or more of a plurality of Tx antenna element ports; and
- at least one Rx RFIC configured to receive an RF signal, the Rx RFIC comprising one or more Rx channels, each of the one or more Rx channels connected individually to one or more of a plurality of Rx antenna element ports;
- wherein the sub-UTMs are configured in a quadrant such that each sub-UTM is rotated 90 degrees from each other in a clockwise manner.

17. The full-duplex UTP of claim 16, comprising multiple UTMs in at least an array of four UTMs by four UTMs.

18. The full-duplex UTP of claim 16, wherein the sub-UTM has a square side equal to a maximum of (M× dTx,N×dRx), where M/N is a ratio of a Tx frequency to a Rx frequency.

19. The full-duplex UTP of claim 18, comprising:
- a first configuration comprised of a single band Tx antenna element; and
- a second configuration comprised of a dual band Tx antenna element and an Rx antenna element overlapping the Tx antenna element.

20. The full-duplex UTP of claim 16, further comprising: one or more peripheral UTMs including a plurality of only Tx antenna elements.

21. The full-duplex UTP of claim 16, comprising: one or more peripheral UTMs including a plurality of only Rx antenna elements.

22. The full-duplex UTP of claim 16, wherein each of the Tx antenna elements have a common polarization, and each of the Rx antenna elements have a common polarization, the common polarization of the Tx antenna elements being orthogonal to the common polarization of the Rx antenna elements.

23. The full-duplex UTP of claim 16, wherein each of the Tx antenna elements have a common polarization, and each of the Rx antenna elements have a common polarization, the common polarization of the Tx antenna elements being orthogonal to the common polarization of the Rx antenna elements.

24. The full-duplex UTP of claim 16, wherein the Tx antenna element includes a first Tx antenna element port, and the Rx antenna element includes a first Rx antenna element port, the first Tx antenna element port and the first Rx antenna element port having a first orthogonal orientation.

25. The full-duplex UTP of claim 16, further comprising:
- a Rx filter connected to one channel of the Rx RFIC and connected to the Rx antenna element port, wherein the Rx filter provides RF signal isolation between the Rx antenna element port and the Tx antenna element port.

26. The full-duplex UTP of claim 16, further comprising:
- a Tx filter connected to one channel of the Tx RFIC and connected to the Tx antenna element port, wherein the Tx filter provides RF signal isolation between the Tx antenna element port and the Rx antenna element port.

27. The full-duplex UTP of claim 16, wherein adjacent Tx antenna elements and Rx antenna elements are positioned from each other to provide an RF isolation between the plurality of the Tx antenna ports and the plurality of the Rx antenna ports; and
- wherein the RF isolation is achieved via a Tx antenna element keepout region and a Rx antenna element keepout region, the Tx antenna element keepout region disposed about a periphery of the Tx antenna element, and the Rx antenna element keepout region disposed about a periphery of the Rx antenna element.

28. The full-duplex UTP of claim 16, wherein the Tx RFIC is configured to alter, by each of the Tx RFIC channels, a phase of an outgoing analog signal to each of the one or more Tx antenna element ports;
- wherein the Rx RFIC is configured to alter, by each of the Rx RFIC channels, a phase of an incoming analog signal to each of the one or more Rx antenna element ports; and
- wherein the altering of the phase of the outgoing analog signal and the altering of the phase of the incoming analog signal provides a polarization control of the UTP.

* * * * *